(12) United States Patent
Yi

(10) Patent No.: US 12,401,888 B2
(45) Date of Patent: Aug. 26, 2025

(54) VIDEO RECORDING METHOD AND ELECTRONIC DEVICE

(71) Applicant: HONOR DEVICE CO., LTD., Shenzhen (CN)

(72) Inventor: Jie Yi, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/277,344

(22) PCT Filed: May 5, 2022

(86) PCT No.: PCT/CN2022/091014
§ 371 (c)(1),
(2) Date: Aug. 15, 2023

(87) PCT Pub. No.: WO2022/257655
PCT Pub. Date: Dec. 15, 2022

(65) Prior Publication Data
US 2024/0129621 A1    Apr. 18, 2024

(30) Foreign Application Priority Data

Jun. 11, 2021 (CN) .......................... 202110654123.7

(51) Int. Cl.
*H04N 23/63* (2023.01)
*H04N 5/77* (2006.01)
(Continued)

(52) U.S. Cl.
CPC ........... *H04N 23/632* (2023.01); *H04N 5/772* (2013.01); *H04N 23/667* (2023.01); *H04N 23/69* (2023.01)

(58) Field of Classification Search
CPC .... H04N 23/632; H04N 5/772; H04N 23/667; H04N 23/69; H04N 23/631; H04N 23/90;
(Continued)

(56) References Cited

U.S. PATENT DOCUMENTS 11,016,645 B2    5/2021    Luo et al.
11,115,591 B2    9/2021    Wei
(Continued)

FOREIGN PATENT DOCUMENTS

CN    104503682 A    4/2015
CN    105744161 A    7/2016
(Continued)

*Primary Examiner* — Christopher K Peterson
(74) *Attorney, Agent, or Firm* — WOMBLE BOND DICKINSON (US) LLP

(57) ABSTRACT

A video recording method, which comprises: displaying a first interface, where the first interface includes a first image captured by a first camera, and the first image is displayed in a full-screen mode on the first interface; displaying a first control on the first interface in response to a first operation performed by a user on a first edge of the first interface; displaying a second interface in response to a first drag-and-drop operation performed by the user on the first control, where on the second interface, a first location of the first control and a size of the first window change with a real-time touch location of the first drag-and-drop operation; displaying a third interface in response to an end of the first drag-and-drop operation, where the third interface includes a second image captured by the first camera and a third image captured by a second camera.

20 Claims, 39 Drawing Sheets

(51) Int. Cl.
*H04N 23/667* (2023.01)
*H04N 23/69* (2023.01)

(58) Field of Classification Search
CPC .............. G06F 3/0481; G06F 3/04817; G06F 3/04842; G06F 3/04845; G06F 3/0486; G06F 3/04883; G06F 3/04886; G06F 2203/04803; G06F 2203/04806; G06F 2203/04808; H04M 1/72469; H04M 2250/52; H04M 1/72403; H04M 1/72439
See application file for complete search history.

(56) References Cited

U.S. PATENT DOCUMENTS

| | | | |
|---|---|---|---|
| 2007/0279482 A1* | 12/2007 | Oswald | H04N 7/142 348/14.02 |
| 2012/0120186 A1 | 5/2012 | Diaz et al. | |
| 2014/0192245 A1* | 7/2014 | Lee | H04N 1/00381 348/333.05 |
| 2016/0132188 A1 | 5/2016 | Li et al. | |
| 2017/0289462 A1* | 10/2017 | Eum | H04N 23/667 |
| 2022/0159183 A1* | 5/2022 | Li | H04N 23/635 |
| 2022/0318036 A1 | 10/2022 | Zhang et al. | |

FOREIGN PATENT DOCUMENTS

| | | |
|---|---|---|
| CN | 105847935 A | 8/2016 |
| CN | 105959553 A | 9/2016 |
| CN | 107395969 A | 11/2017 |
| CN | 108234891 A | 6/2018 |
| CN | 108289167 A | 7/2018 |
| CN | 109062466 A | 12/2018 |
| CN | 109753215 A | 5/2019 |
| CN | 110072070 A | 7/2019 |
| CN | 111176506 A | 5/2020 |
| CN | 111541845 A | 8/2020 |
| CN | 111966252 A | 11/2020 |

\* cited by examiner (Touch-and-hold operation)

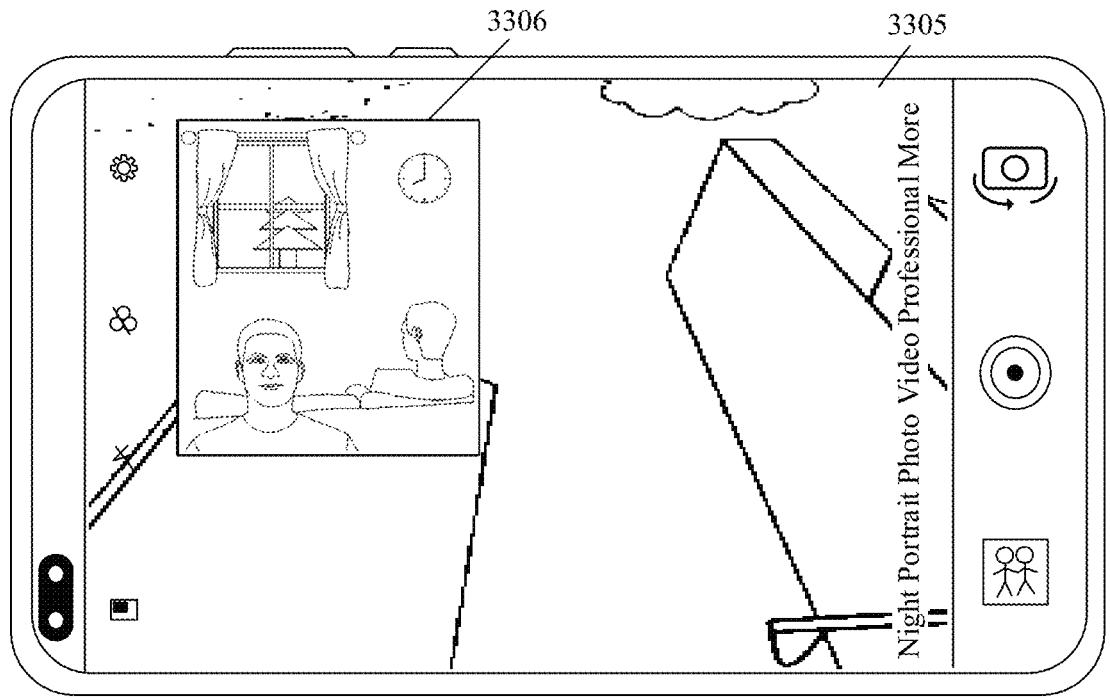

FIG. 33B

| |
|---|
| A mobile phone displays an interface a, where the interface a is a viewfinder interface for video recording by the mobile phone, the interface a includes a first preview image captured by a camera a and a second preview image captured by a camera b, the first preview image is displayed in a first window, and the second preview image is displayed in a second window, and the first preview image and the second preview image are displayed in a picture-in-picture mode on the interface a |
| The mobile phone displays a first window in a preset state on the interface a in response to an operation a performed by a user on the first window, where the operation a is a tap operation or a touch-and-hold operation, and the preset state is used for indicating that the first window is editable |
| The mobile phone displays the first window at a location a on the interface a in response to a moving operation performed by the user on the first window, where the location a changes with a real-time touch location of the moving operation |
| In response to an end event of the moving operation, if the location a of the first window at an end of the moving operation is within a seventh range, the mobile phone displays an interface b, where the interface b is a viewfinder interface for video recording by the mobile phone, and the interface b includes a second window, a third preview image captured by the camera b is displayed in the second window, and the third preview image is displayed in a full-screen mode on the interface b |

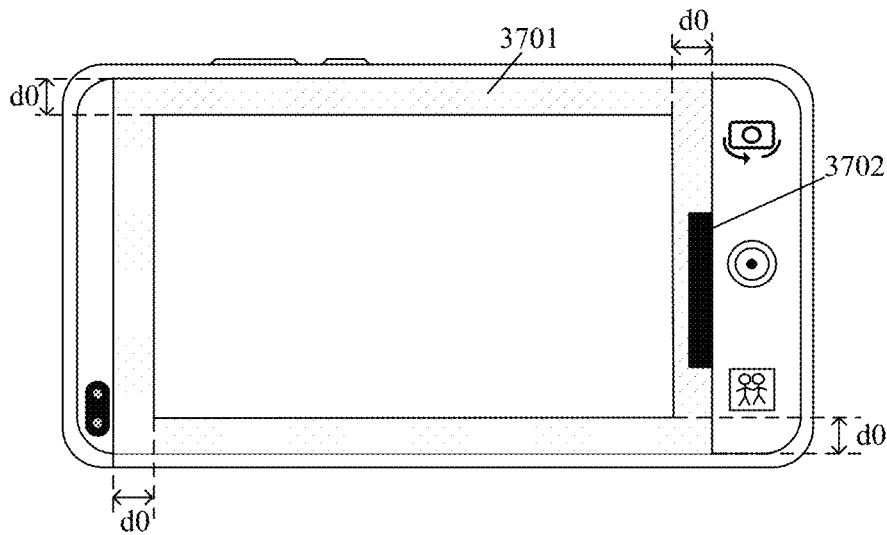

FIG. 37

| | |
|---|---|
| A mobile phone displays an interface a, where the interface a is a viewfinder interface for video recording by the mobile phone, the interface a includes a first preview image captured by a camera a and a second preview image captured by a camera b, the first preview image is displayed in a first window, and the second preview image is displayed in a second window, and the first preview image and the second preview image are displayed in a picture-in-picture mode on the interface a | S3401 |
| The mobile phone displays a first window in a preset state on the interface a in response to an operation a performed by a user on the first window, where the operation a is a tap operation or a touch-and-hold operation, and the preset state is used for indicating that the first window is editable | S3402 |
| The mobile phone displays the first window at a location a on the interface a in response to a moving operation performed by the user on the first window, where the location a changes with a real-time touch location of the moving operation | S3403 |
| In response to an end event of the moving operation, if the location a of the first window at an end of the moving operation is within a seventh range, the mobile phone displays an interface b, where the interface b is a viewfinder interface for video recording by the mobile phone, and the interface b includes a second window, a third preview image captured by the camera b is displayed in the second window, and the third preview image is displayed in a full-screen mode on the interface b | S3404 |
| The mobile phone displays an interface c in response to an operation b performed by the user on the interface b, where the interface c includes a preview image a and a preview image b, the preview image a and the preview image b are displayed in a picture-in-picture layout on the interface c, and the preview image a is displayed in a small window on the interface a | S3801 |

FIG. 38

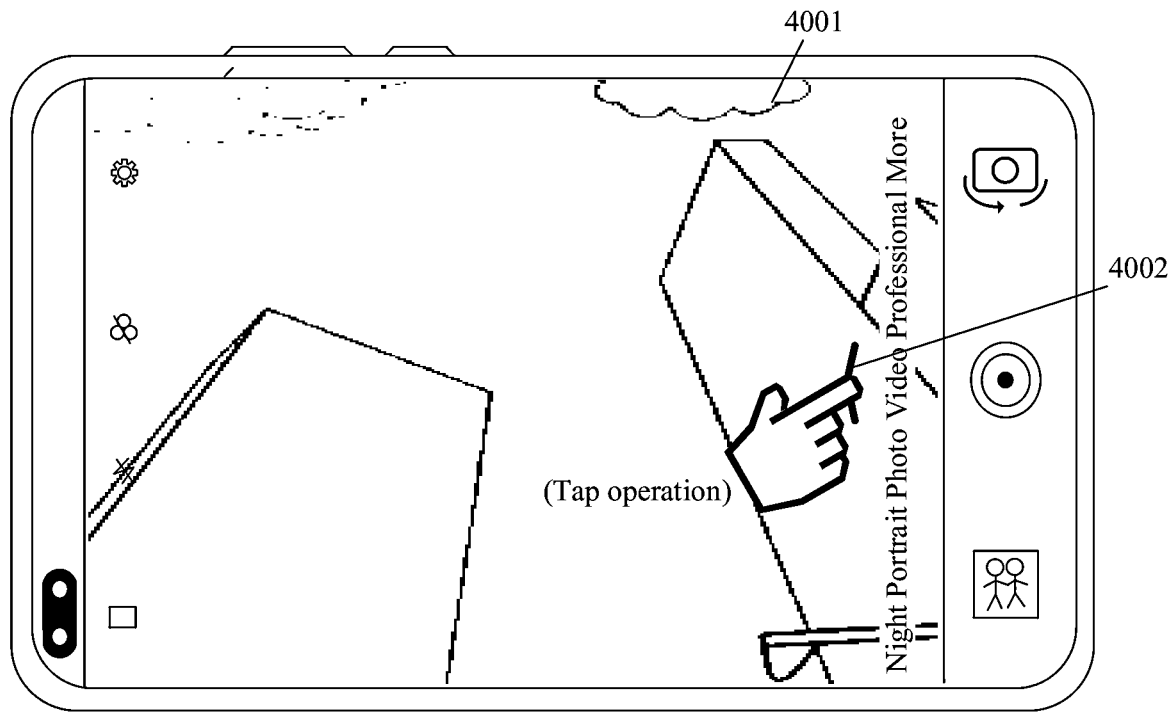

FIG. 40

| A mobile phone displays an interface a, where the interface a is a viewfinder interface for video recording by the mobile phone, the interface a includes a first preview image captured by a camera a and a second preview image captured by a camera b, the first preview image is displayed in a first window, and the second preview image is displayed in a second window, and the first preview image and the second preview image are displayed in a picture-in-picture mode on the interface a | S4101 |

| The mobile phone displays a first window in a preset state on the interface a in response to an operation a performed by a user on the first window, where the operation a is a tap operation or a touch-and-hold operation, and the preset state is used for indicating that the first window is editable | S4102 |

| The mobile phone adjusts a size of the first window in response to a zoom operation performed by the user on the first window, and displays the first window with an adjusted size on the interface a, where the size of the first window changes with a real-time touch location of the zoom operation, and if a size of the adjusted first window reaches a preset size a, displays an interface d, where the interface d is a viewfinder interface for video recording by the mobile phone, the interface d includes a sixth preview image captured by the camera a and a seventh preview image captured by the camera b, and the sixth preview image and the seventh preview image are displayed in a split-screen mode on the interface d | S4103 |

FIG. 41

VIDEO RECORDING METHOD AND ELECTRONIC DEVICE

CROSS-REFERENCE TO RELATED APPLICATIONS

This application is a national stage of International Application No. PCT/CN2022/091014, filed on May 5, 2022, which claims priority to Chinese Patent Application No. 202110654123.7, filed on Jun. 11, 2021. The disclosures of both of the aforementioned applications are hereby incorporated by reference in their entireties.

TECHNICAL FIELD

This application relates to the field of photographing technologies, and in particular, to a video recording method and an electronic device.

BACKGROUND

An electronic device such as a mobile phone usually provides a video recording function, so that a camera of the electronic device can be used for recording a video. However, in a scene with a plurality of photographed objects, for example, in a party or parent-child interaction, if the foregoing video recording function is used, it is quite likely that the plurality of photographed objects cannot be photographed at a time. Alternatively, at a site of an activity such as a concert, there are both a distant photographing requirement and a close photographing requirement. If the foregoing video recording function is used, it is quite likely that not all of a plurality of photographing requirements of a user can be met. To resolve the foregoing problems, some electronic devices further provide a dual-scene video recording function.

Dual-scene video recording is a function of turning on two cameras at one moment to capture a preview image. For example, a front-facing camera and a rear-facing camera are simultaneously turned on to capture a preview image (this is referred to as a front/rear dual-scene mode), so that a plurality of photographed objects can be photographed at a time. Alternatively, a rear-facing telephoto camera and a rear-facing wide-angle camera are simultaneously turned on to capture a preview image (this is referred to as a rear/rear dual-scene mode), so that a distant photographing requirement and a close photographing requirement can be met.

However, in a conventional dual-scene video recording function, a photographing mode cannot be conveniently switched, and therefore cannot be flexibly switched to a required photographing mode.

SUMMARY

This application provides a video recording method and an electronic device, to flexibly switch a photographing mode before video recording starts or during video recording.

According to a first aspect, this application provides a video recording method, applied to an electronic device. The electronic device displays a first interface, where the first interface a viewfinder interface for video recording by the electronic device, the first interface includes a first window, a first image captured by a first camera is displayed in the first window, and the first image is displayed in a full-screen mode on the first interface, that is, the first interface is a viewfinder interface for single-camera video recording. The electronic device displays a first control on the first interface in response to a first operation performed by a user on a first edge of the first interface, where the first control is configured to trigger the electronic device to adjust a size of the first window. The electronic device displays a second interface in response to a first drag-and-drop operation performed by the user on the first control, where on the second interface, a first location of the first control changes with a real-time touch location of the first drag-and-drop operation, and the size of the first window changes with the real-time touch location of the first drag-and-drop operation. The electronic device displays a third interface in response to an end of the first drag-and-drop operation, where the third interface is a viewfinder interface for video recording by the electronic device, the third interface includes the first window and a second window, a second image captured by the first camera is displayed in the first window, a third image captured by a second camera is displayed in the second window, and the second image and the third image are displayed in a split-screen or picture-in-picture mode on the third interface.

To sum up, in the method in this embodiment of this application, before video recording starts or during video recording, the electronic device may display the first control in response to the first operation (for example, a touch-and-hold operation) performed by the user on a viewfinder interface in a single-scene mode, to trigger the mobile phone to switch a photographing mode. In this way, no control that is always displayed needs to be set for the user to trigger switching of a photographing mode, so that interface elements are simplified. Then the mobile phone may switch to a split-screen photographing mode (for example, a front/rear dual-scene mode) or a picture-in-picture photographing mode (for example, a picture-in-picture dual-scene mode) in response to the drag-and-drop operation performed by the user on the first control. In this way, the single-scene mode can be switched to the front/rear dual-scene mode or the picture-in-picture mode only through the first operation and the drag-and-drop operation. Therefore, the photographing mode can be conveniently switched.

In another possible design manner of the first aspect, the first camera is a front-facing camera, and the second camera is a rear-facing camera; or the first camera is a rear-facing camera, and the second camera is a front-facing camera.

That is, in the method in this embodiment of this application, in the single-scene mode, switching may be performed to a photographing mode in which a front-facing camera and a rear-facing camera are used by default. This can meet most dual-scene video recording requirements, and reduce a quantity of times of switching performed by the user.

In another possible design manner of the first aspect, the first operation includes a single-tap operation, a double-tap operation, a touch-and-hold operation, or a sliding operation.

In another possible design manner of the first aspect, when the electronic device is in a landscape state, the first interface is a landscape-mode interface, and the first edge of the first interface includes a left edge of the landscape-mode interface or a right edge of the landscape-mode interface; or when the electronic device is in a landscape state, the first interface is a portrait-mode interface, and the first edge of the first interface includes an upper edge of the portrait-mode interface or a lower edge of the portrait-mode interface.

That is, in the method in this embodiment of this application, based on the first operation performed on a short edge of the viewfinder interface, the first control may be displayed at an edge corresponding to the short edge, to switch the photographing mode through dragging inward from the short edge. This can improve appropriateness of switching. For example, the electronic device switches to a left/right split-screen mode in the landscape state, and switches to an up/down split-screen mode in the portrait state.

In another possible design manner of the first aspect, when a touch location at the end of the first drag-and-drop operation is within a first range of a display of the electronic device, the second image and the third image are displayed in the split-screen mode on the third interface; or when a touch location at the end of the first drag-and-drop operation is within a second range of the display, the second image and the third image are displayed in the picture-in-picture mode on the third interface.

That is, in the method in this embodiment of this application, the second image and the third image may be displayed in a corresponding layout manner based on a range to which the touch location at the end of the drag-and-drop operation belongs. In this way, switching to different photographing modes can be triggered through a same operation. For example, if the touch location at the end of the drag-and-drop operation belongs to the first range, the single-scene mode may be switched to the front/rear dual-scene mode; or if the touch location at the end of the drag-and-drop operation belongs to the second range, the single-scene mode may be switched to the picture-in-picture dual-scene mode.

In another possible design manner of the first aspect, the first range is adjacent to the second range; the first range includes a range, on the display, within which a vertical distance from the first edge is greater than a first distance value and less than a second distance value; and the second range includes a range, on the display, within which a vertical distance from the first edge is greater than the second distance value.

That is, in the method in this embodiment of this application, when a moving distance of the drag-and-drop operation in a direction perpendicular to the first edge is short, switching is performed to the split-screen mode; or when a moving distance of the drag-and-drop operation in a direction perpendicular to the first edge is short, switching is performed to the picture-in-picture mode. This can flexibly meet requirements for using different modes.

In another possible design manner of the first aspect, when the touch location at the end of the first drag-and-drop operation is within a third range of the display of the electronic device, the electronic device displays the first interface, where the third range includes a range, on the display, within which a vertical distance from the first edge is less than the first distance value.

That is, in the method in this embodiment of this application, whether the touch location at the end of the drag-and-drop operation is within the third range is determined before the third interface is displayed. If the touch location is within the third range, it indicates that the drag-and-drop operation is misoperation performed by the user. In this case, the user does not have a switching requirement, and the first interface is still displayed, without switching the photographing mode. The third interface is displayed, that is, the photographing mode is switched, only when the touch location is not within the third range. In this way, switching of the photographing mode can accurately meet a user requirement.

In another possible design manner of the first aspect, the second image and the third image are displayed in the split-screen mode on the third interface; and after the displaying, by the electronic device, a third interface in response to an end of the drag-and-drop operation, the method further includes: displaying, by the electronic device, a second control on the third interface in response to a second operation performed by the user on a boundary region between the first window and the second window on the third interface, where the second control is configured to trigger the electronic device to adjust the size of the first window and a size of the second window; displaying, by the electronic device, a fourth interface in response to a second drag-and-drop operation performed by the user on the second control, where on the fourth interface, a second location of the second control changes with a real-time touch location of the second drag-and-drop operation, and the size of the first window and the size of the second window change with the real-time touch location of the second drag-and-drop operation; and displaying, by the electronic device, a fifth interface in response to an end of the second drag-and-drop operation, where the fifth interface is a viewfinder interface for video recording by the electronic device; the fifth interface includes a fourth image captured by the first camera and a fifth image captured by the second camera, and the fourth image and the fifth image are displayed in a picture-in-picture mode on the fifth interface; or the fifth interface includes the fourth image, and the fourth image is displayed in a full-screen mode on the fifth interface; or the fifth interface includes the fifth image, and the fifth image is displayed in a full-screen mode on the fifth interface.

That is, in the method in this embodiment of this application, after the single-scene mode is switched to the split-screen mode, the second control may be further displayed in response to the second operation performed by the user on the boundary region between the first window and the second window on the viewfinder interface in the front/rear dual-scene (or rear/rear dual-scene) mode, to trigger the mobile phone to switch the photographing mode. In this way, no control that is always displayed needs to be set for the user to trigger switching of a photographing mode, so that interface elements are simplified. The electronic device may switch to the picture-in-picture dual-scene mode or the single-scene mode in response to the drag-and-drop operation performed by the user on the second control. In this way, the front/rear dual-scene (or rear/rear dual-scene) mode can be switched to the picture-in-picture mode or the single-scene mode only through the second operation and the drag-and-drop operation. Therefore, the photographing mode can be conveniently switched.

In another possible design manner of the first aspect, the second operation includes a single-tap operation, a double-tap operation, a touch-and-hold operation, or a sliding operation.

In another possible design manner of the first aspect, the displaying, by the electronic device, a fifth interface in response to an end of the second drag-and-drop operation includes: when a touch location at the end of the second drag-and-drop operation is within a fourth range of the display, displaying the fourth image and the fifth image in the picture-in-picture mode on the fifth interface; or when a touch location at the end of the second drag-and-drop operation is within a fifth range of the display, displaying the fourth image or the fifth image in the full-screen mode on the fifth interface.

That is, in the method in this embodiment of this application, the fourth image and the fifth image may be displayed in a corresponding layout manner based on a range to which the touch location at the end of the drag-and-drop operation belongs. In this way, switching to different photographing modes can be triggered through a same operation. For example, if the touch location at the end of the drag-and-drop operation belongs to the fourth range, the front/rear dual-scene mode may be switched to the picture-in-picture dual-scene mode; or if the touch location at the end of the drag-and-drop operation belongs to the fifth range, the front/rear dual-scene mode may be switched to the single-scene mode.

In another possible design manner of the first aspect, when the electronic device is in the landscape state, the fourth range includes a range, on the display, within which a distance from the left edge or the right edge of the display is greater than a third distance value and less than a fourth distance value, and the fifth range includes a range, on the display, within which a distance from the left edge or the right edge of the display is less than the third distance value; or when the electronic device is in the portrait state, the fourth range includes a range, on the display, within which a distance from the upper edge or the upper edge of the display is greater than a third distance value and less than a fourth distance value, and the fifth range includes a range, on the display, within which a distance from the upper edge or the upper edge of the display is less than the third distance value.

That is, in the method in this embodiment of this application, when the touch location at the end of the drag-and-drop operation is close to a boundary line between the first window and the second window, switching is performed to the picture-in-picture mode; or when the touch location at the end of the drag-and-drop operation is far from the boundary line between the first window and the second window, for example, in the case of dragging to the edge of the interface, switching is performed to the single-scene mode. This can flexibly meet requirements for using different modes.

In another possible design manner of the first aspect, when the touch location at the end of the second drag-and-drop operation is within a sixth range of the display, the electronic device displays the third interface, where when the electronic device is in the landscape state, the sixth range includes a range, on the display, within which a distance from the left edge or the right edge of the display is greater than the fourth distance value; or when the electronic device is in the portrait state, the sixth range includes a range, on the display, within which a distance from the upper edge or the upper edge of the display is greater than the fourth distance value.

That is, in the method in this embodiment of this application, whether the touch location at the end of the drag-and-drop operation is within the sixth range is determined before the fifth interface is displayed. If the touch location is within the sixth range, it indicates that the drag-and-drop operation is misoperation performed by the user. In this case, the user does not have a switching requirement, and the photographing mode is not switched. The fifth interface is displayed for switching the photographing mode only when the touch location is not within the sixth range. In this way, switching of the photographing mode can accurately meet a user requirement.

In another possible design manner of the first aspect, the second image and the third image are displayed in the picture-in-picture mode on the third interface; and after the displaying, by the electronic device, a third interface in response to an end of the first drag-and-drop operation, the method further includes: displaying, by the electronic device, a first window in a preset state on the third interface in response to a third operation performed by the user on the first window on the third interface, where the preset state is used for indicating that the first window is editable; displaying, by the electronic device, the first window at a third location on the third interface in response to a moving operation performed by the user on the first window, where the third location changes with a real-time touch location of the moving operation; and displaying, by the electronic device, a sixth interface in response to an end of the moving operation if the third location at the end of the moving operation belongs to a seventh range, where the sixth interface is a viewfinder interface for video recording by the electronic device, the sixth interface includes the second window, a sixth image captured by the second camera is displayed in the second window, and the sixth image is displayed in a full-screen mode on the sixth interface.

That is, in the method in this embodiment of this application, after the single-scene mode is switched to the picture-in-picture mode, a small window may be further displayed in an editable state in response to a third operation performed by the user on the small window on the viewfinder interface in the picture-in-picture dual-scene mode, to facilitate an operation on the small window. Then the small window can be moved. This can avoid misoperation by the user. In addition, if the small window is moved to the seventh range and then movement stops, the small window may be moved out of the interface. Therefore, the picture-in-picture dual-scene mode is switched to single-scene mode. In this way, the picture-in-picture mode is flexibly switched to the single-scene mode.

In another possible design manner of the first aspect, the seventh range includes a range, on the display of the electronic device, within which a distance from the upper edge, the lower edge, the left edge, or the right edge of the display is less than the fifth distance value.

That is, in the method in this embodiment of this application, switching may be performed to the single-scene mode when the user moves the small window in any direction and the small window reaches the seventh range. This avoids missing a switching requirement of the user.

In another possible design manner of the first aspect, after the displaying, by the electronic device, a sixth interface, the method further includes: displaying, by the electronic device, a seventh interface in response to a fourth operation performed by the user on the sixth interface, where the fourth operation is used for triggering the electronic device to add a preview window to the viewfinder interface, the seventh interface is a viewfinder interface for video recording by the electronic device, the seventh interface includes the first window and the second window, the first window is the added preview window, a seventh image captured by the first camera is displayed in the first window, an eighth image captured by the second camera is displayed in the second window, and the seventh image and the eighth image are displayed in a picture-in-picture mode on the seventh interface.

That is, in the method in this embodiment of this application, after the first window is moved out of the viewfinder interface, the first window can be quickly dragged back to the viewfinder interface, to implement quick recovery from the single-scene mode to the picture-in-picture mode.

In another possible design manner of the first aspect, the second image and the third image are displayed in the picture-in-picture mode on the third interface; and after the displaying, by the electronic device, a third interface in response to an end of the first drag-and-drop operation, the method further includes: displaying, by the electronic device, a first window in a preset state on the third interface in response to a third operation performed by the user on the first window on the third interface, where the preset state is used for indicating that the first window is editable; displaying, by the electronic device, the first window with an adjusted size on the third interface in response to a zoom operation performed by the user on the first window, where the size of the first window changes with a real-time touch location of the zoom operation; and if the size of the first window reaches a first preset size, displaying, by the electronic device, an eighth interface, where the eighth interface is a viewfinder interface for video recording by the electronic device, the eighth interface includes a ninth image captured by the first camera and a tenth image captured by the second camera, and the ninth image and the tenth image are displayed in a split-screen mode on the eighth interface.

That is, in the method in this embodiment of this application, after the single-scene mode is switched to the picture-in-picture mode, the small window may be further activated in response to the third operation performed by the user on the small window, so that the small window is in an editable state. Then the small window can be zoomed. This can avoid misoperation by the user. In addition, if a size of the small window after zooming reaches the first preset size, switching may be performed to the split-screen photographing mode (for example, the front/rear dual-scene mode or the rear/rear dual-scene mode). In this way, the picture-in-picture mode is flexibly switched to split-screen mode.

In another possible design manner of the first aspect, the zoom operation includes a preset zoom gesture or a drag operation performed on an edge of the first window.

In another possible design manner of the first aspect, the first window in the preset state includes a highlighted edge line first window.

That is, in the method in this embodiment of this application, the edge line of the small window is highlighted to indicate that the small window is in an editable state. This can better prompt the user to perform an operation on the small window.

In another possible design manner of the first aspect, the third operation includes a single-tap operation, a double-tap operation, or a touch-and-hold operation.

In another possible design manner of the first aspect, the viewfinder interface for video recording by the electronic device is a viewfinder interface for video recording that is displayed before the electronic device starts video recording, or the viewfinder interface for video recording by the electronic device is a viewfinder interface displayed during video recording by the electronic device.

That is, in the method in this embodiment of this application, the photographing mode may be switched before video recording starts or during video recording.

In another possible design manner of the first aspect, the second interface further includes the first window and the second window, the first window is located on a first side of the first control, and the second window is located on a second side of the first control; an eleventh image is displayed in the first window, and a twelfth image is displayed in the second window; and the eleventh image is a real-time image captured by the first camera, and the twelfth image is a real-time image captured by the second camera; or the eleventh image is a preset first blurred image, and the twelfth image is a preset second blurred image.

That is, in the method in this embodiment of this application, in a transition process of switching from the single-scene mode to the split-screen or picture-in-picture mode, two transition images may be displayed on the viewfinder interface for smooth transition. When an image captured by the camera in real time is used as a transition image, a real-time view is displayed in the transition process, thereby ensuring authenticity of content on the viewfinder interface. In addition, the user can accurately select a photographing mode based on the real-time view. When a preset blurred image is used, the switching transition process can be vividly simulated through blurred transition effect, and power consumption of the mobile phone in the transition process can also be reduced.

In another possible design manner of the first aspect, the fourth interface further includes the first window and the second window, the first window is located on a first side of the second control, and the second window is located on a second side of the second control; a thirteenth image is displayed in the first window, and a fourteenth image is displayed in the second window; and the thirteenth image is a real-time image captured by the first camera, and the fourteenth image is a real-time image captured by the second camera; or the thirteenth image is a preset third blurred image, and the fourteenth image is a preset fourth blurred image.

That is, in the method in this embodiment of this application, in a transition process of switching from the split-screen mode to the single-scene or picture-in-picture mode, two transition images may also be displayed on the viewfinder interface for smooth transition. Similarly, the transition images may be real-time preview images or preset blurred images. When an image captured by the camera in real time is used as a transition image, a real-time view is displayed in the transition process, thereby ensuring authenticity of content on the viewfinder interface. In addition, the user can accurately select a photographing mode based on the real-time view. When a preset blurred image is used, the switching transition process can be vividly simulated through blurred transition effect, and power consumption of the mobile phone in the transition process can also be reduced.

In another possible design manner of the first aspect, when the electronic device is in the landscape state, the first side is a left side, and the second side is a right side; or the first side is a right side, and the second side is a left side; or when the electronic device is in the portrait state, the first side is an upper side, and the second side is a lower side; or the first side is a lower side, and the second side is an upper side.

That is, in the method in this embodiment of this application, the transition images are respectively displayed on two sides of the control, so that a size change of a window in the transition process can be simulated.

According to a second aspect, an embodiment of this application further provides an electronic device, where the electronic device includes a plurality of cameras, and the electronic device further includes a display, a memory, and one or more processors. The plurality of cameras, the display, and the memory are coupled to the processor. The memory is configured to store computer program code. The computer program code includes computer instructions. When the computer instructions are executed by the processor, the electronic device is enabled to perform the method according to any one of the first aspect or the possible design manners of the first aspect.

According to a third aspect, an embodiment of this application provides a chip system, where the chip system is applied to an electronic device including a display and a memory. The chip system includes one or more interface circuits and one or more processors. The interface circuit and the processor are interconnected through a line. The interface circuit is configured to receive a signal from the memory of the electronic device, and send the signal to the processor. The signal includes computer instructions stored in the memory. When the processor executes the computer instructions, the electronic device performs the method according to any one of the first aspect or the possible design manners of the first aspect.

According to a fourth aspect, this application provides a computer storage medium. The computer storage medium includes computer instructions. When the computer instructions run on an electronic device, the electronic device is enabled to perform the method according to any one of the first aspect or the possible design manners of the first aspect.

According to a fifth aspect, this application provides a computer program product. When the computer program product runs on a computer, the computer is enabled to perform the method according to any one of the first aspect or the possible design manners of the first aspect.

It can be understood that, for beneficial effect that can be achieved by the electronic device according to the second aspect, the chip system according to the third aspect, the computer storage medium according to the fourth aspect, and the computer program product according to the fifth aspect, reference may be made to the beneficial effect in any one of the first aspect or the possible design manners of the first aspect. Details are not described herein again.

BRIEF DESCRIPTION OF DRAWINGS

FIG. 33A and FIG. 33B are a schematic diagram of a viewfinder interface for dual-scene video recording in another landscape scenario according to an embodiment of this application;

FIG. 34 is a flowchart of another video recording method according to an embodiment of this application;

FIG. 37 is a schematic diagram of another location range according to an embodiment of this application;

FIG. 38 is a flowchart of another video recording method according to an embodiment of this application;

FIG. 40 is a schematic diagram of a viewfinder interface for dual-scene video recording in another landscape scenario according to an embodiment of this application;

FIG. 41 is a flowchart of another video recording method according to an embodiment of this application;

DESCRIPTION OF EMBODIMENTS

The terms "first" and "second" mentioned below are used merely for the purpose of description, and shall not be construed as indicating or implying relative importance or implying a quantity of indicated technical features. Therefore, a feature limited by "first" or "second" may explicitly or implicitly include one or more of the features. In descriptions of the embodiments, unless otherwise stated, "a plurality of" means two or more.

The following describes implementations of the embodiments of this application in detail with reference to the accompanying drawings. A video recording method provided in the embodiments of this application may be applied to a dual-scene video recording scenario. Dual-scene video recording is a manner of turning on two cameras at one moment to record a video. In the dual-scene video recording scenario, a viewfinder interface displayed on an electronic device includes preview images captured by two cameras.

Figure 1:
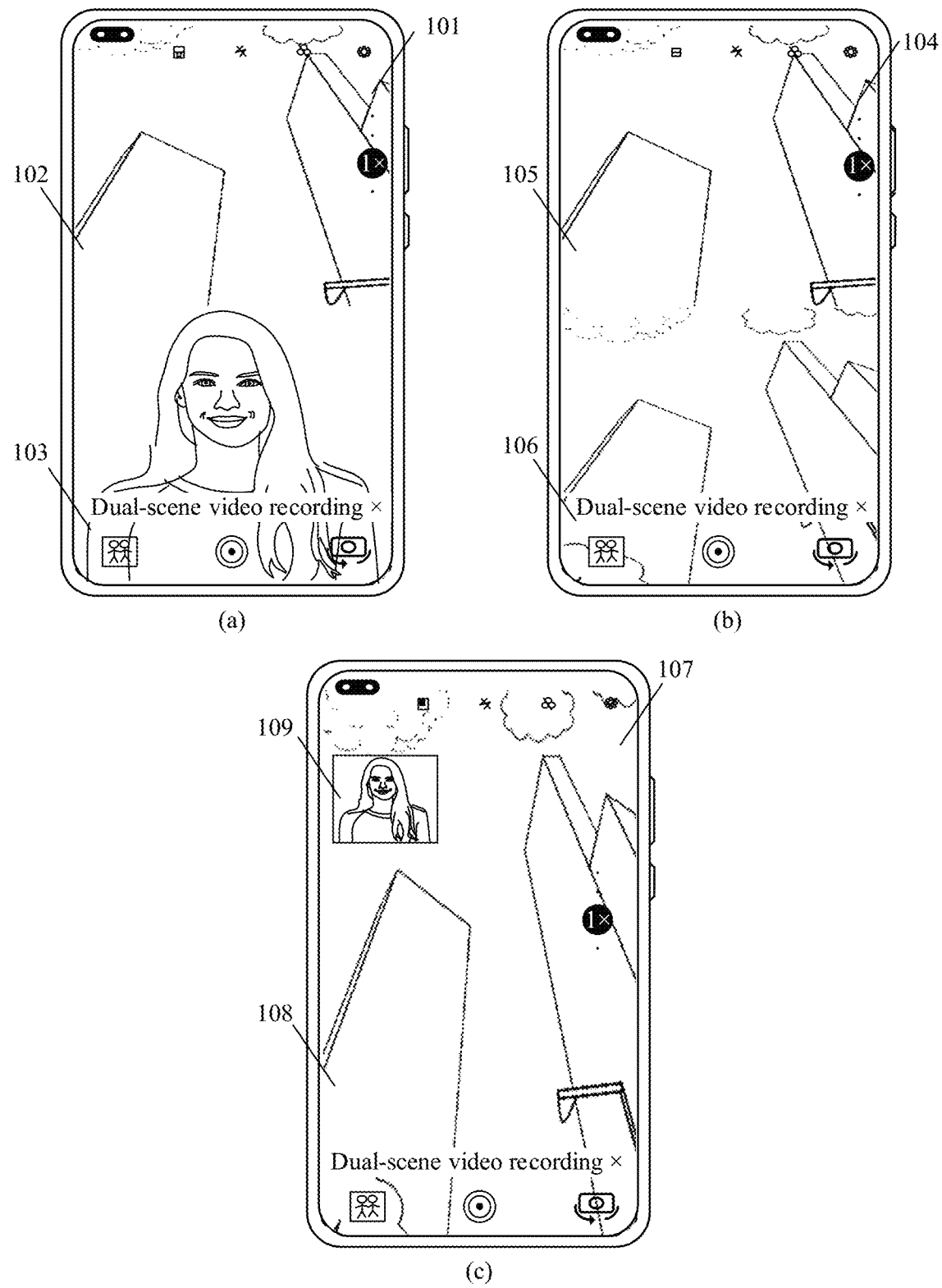
FIG. 1 is a schematic diagram of a viewfinder interface for dual-scene video recording in a portrait scenario according to an embodiment of this application.
Figure 2:
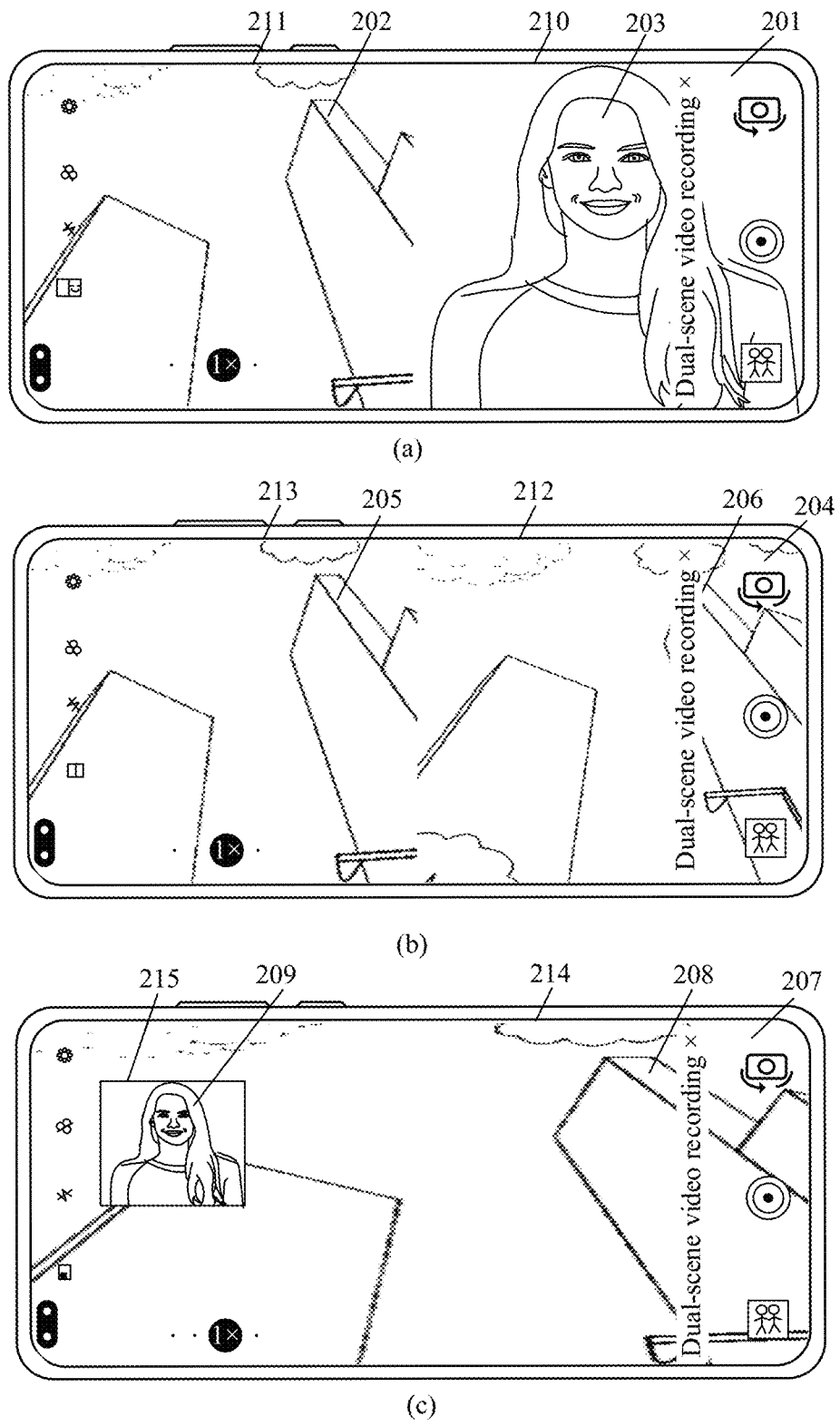
FIG. 2 is a schematic diagram of a viewfinder interface for dual-scene video recording in a landscape scenario according to an embodiment of this application.

For ease of understanding the embodiments of this application, an example is which the electronic device is a mobile phone is used for description with reference to a dual-scene video recording scenario in FIG. 1 and FIG. 2.

The mobile phone may display a viewfinder interface 101 shown in (a) in FIG. 1. The viewfinder interface 101 includes a preview image 102 captured by a camera 1 (for example, a rear-facing primary camera) and a preview image 103 captured by a camera 2 (for example, a front-facing camera), and the preview image 102 and the preview image 103 are displayed in an up-down split-screen layout. In this specification, the photographing mode shown in (a) in FIG. 1 is referred to as a front/rear dual-scene mode. Alternatively, the mobile phone may display a viewfinder interface 104 shown in (b) in FIG. 1. The viewfinder interface 104 includes a preview image 105 captured by a camera 1 (for example, a rear-facing telephoto camera) and a preview image 106 captured by a camera 2 (for example, a rear-facing wide-angle camera), and the preview image 105 and the preview image 106 are displayed in an up-down split-screen layout. In this specification, the photographing mode shown in (b) in FIG. 1 is referred to as a rear/rear dual-scene mode. Alternatively, the mobile phone may display a viewfinder interface 107 shown in (c) in FIG. 1. The viewfinder interface 107 includes a preview image 108 captured by a camera 1 (for example, a rear-facing primary camera) and a preview image 109 captured by a camera 2 (for example, a front-facing camera), and the preview image 108 and the preview image 109 are displayed in a picture-in-picture layout. In this specification, the photographing mode shown in (c) in FIG. 1 is referred to as a picture-in-picture dual-scene mode.

The viewfinder interface 101 shown in (a) in FIG. 1, the viewfinder interface 104 shown in (b) in FIG. 1, and the viewfinder interface 107 shown in (c) in FIG. 1 are all viewfinder interfaces in a portrait mode.

In some embodiments, the mobile phone may alternatively implement dual-scene video recording when the mobile phone is in a landscape state. For example, the mobile phone may display a viewfinder interface 201 shown in (a) in FIG. 2. The viewfinder interface 201 includes a preview image 202 captured by a camera 1 (for example, a rear-facing primary camera) and a preview image 203 captured by a camera 2 (for example, a front-facing camera), and the preview image 202 and the preview image 203 are displayed in a left-right split-screen layout. In this specification, the photographing mode shown in (a) in FIG. 2 is also referred to as a front/rear dual-scene mode. Alternatively, the mobile phone may display a viewfinder interface 204 shown in (b) in FIG. 2. The viewfinder interface 204 includes a preview image 205 captured by a camera 1 (for example, a rear-facing telephoto camera) and a preview image 206 captured by a camera 2 (for example, a rear-facing wide-angle camera), and the preview image 205 and the preview image 206 are displayed in a left-right split-screen layout. In this specification, the photographing mode shown in (b) in FIG. 2 is also referred to as a rear/rear dual-scene mode. Alternatively, the mobile phone may display a viewfinder interface 207 shown in (c) in FIG. 2. The viewfinder interface 207 includes a preview image 208 captured by a camera 1 (for example, a rear-facing primary camera) and a preview image 209 captured by a camera 2 (for example, a front-facing camera), and the preview image 208 and the preview image 209 are displayed in a picture-in-picture layout. In this specification, the photographing mode shown in (c) in FIG. 2 is also referred to as a picture-in-picture dual-scene mode.

It should be understood that different preview images are displayed in different windows on the viewfinder interface. For example, the viewfinder interface 201 in the front/rear dual-scene mode that is shown in (a) in FIG. 2 includes a window 210 and a window 211. The preview image 203 is displayed in the window 210, and the preview image 202 is displayed in the window 211. The viewfinder interface 204 in the rear/rear dual-scene mode that is shown in (b) in FIG. 2 includes a window 212 and a window 213. The preview image 206 is displayed in the window 212, and the preview image 205 is displayed in the window 213. The viewfinder interface 207 in the picture-in-picture dual-scene mode that is shown in (c) in FIG. 2 includes a window 214 and a window 215. The preview image 208 is displayed in the window 214, and the preview image 209 is displayed in the window 215. The window 215 may also be referred to as a small window, and the window 214 may also be referred to as a large window.

The solutions of this application may be applied to the dual-scene video recording in the landscape scenario and the dual-scene video recording in the portrait scenario. However, in the following embodiments, the solutions of this application are mainly described based on the landscape scenario. For specific implementation of the portrait scenario, refer to related descriptions of the landscape scenario.

Herein, it should be noted that the foregoing describes only three photographing modes for dual-scene video recording: the front/rear dual-scene mode, the rear/rear dual-scene mode, and the picture-in-picture dual-scene mode. However, in specific implementation, a photographing mode for dual-scene video recording is not limited thereto. For example, the photographing mode for dual-scene video recording may further include a mobile in which a front-facing camera is combined with each rear-facing camera. In the following embodiments, the three photographing modes, that is, the front/rear dual-scene mode, the rear/rear dual-scene mode, and the picture-in-picture dual-scene mode, are mainly used for description.

In the conventional technology, flexible switching between the foregoing plurality of photographing modes and/or between the foregoing plurality of photographing modes and a photographing mode for single-scene photographing (referred to as a single-scene mode) is impossible. The single-scene mode includes a front-facing single-scene mode or a rear-facing single-scene mode. The front-facing single-scene mode is a mode in which an image is captured by using only one front-facing camera and is displayed in a full-screen mode. The rear-facing single-scene mode is a mode in which an image is captured by using only one rear-facing camera and is displayed in a full-screen mode.

The embodiments of this application provides a video recording method. The method is applied to an electronic device including a camera. The electronic device may provide a dual-scene video recording function. Before video recording starts or during video recording, the electronic device may switch a photographing mode in response to a preset gesture input by a user on a current viewfinder interface. In addition, the electronic device may switch to different photographing modes based on the current viewfinder interface and a parameter of the preset gesture, so as to flexibly switch from a current photographing mode to another photographing mode.

For example, the electronic device in the embodiments of this application may be a device including a foldable screen, for example, a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), or an augmented reality (augmented reality, AR)/virtual reality (virtual reality, VR) device. A specific form of the electronic device is not particularly limited in the embodiments of this application.

The following describes implementations of the embodiments of this application in detail with reference to the accompanying drawings.

Figure 3:
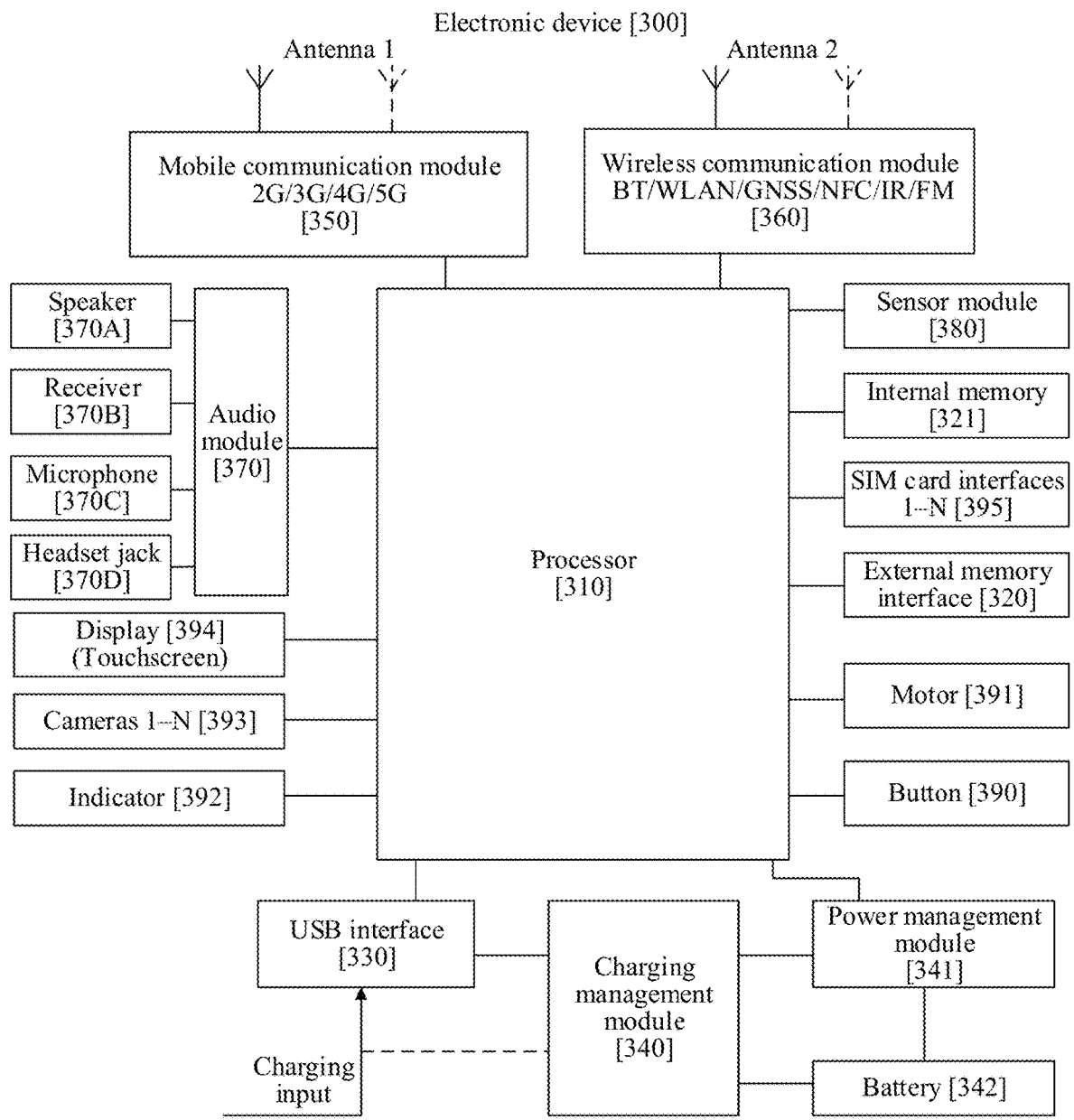
FIG. 3 is a schematic diagram of a hardware structure of an electronic device according to an embodiment of this application.

FIG. 3 is a schematic structural diagram of an electronic device 300 according to an embodiment of this application. As shown in FIG. 3, the electronic device 300 may include a processor 310, an external memory interface 320, an internal memory 321, a universal serial bus (universal serial bus, USB) interface 330, a charging management module 340, a power management module 341, a battery 342, an antenna 1, an antenna 2, a mobile communication module 350, a wireless communication module 360, an audio module 370, a speaker 370A, a receiver 370B, a microphone 370C, a headset jack 370D, a sensor module 380, a button 390, a motor 391, an indicator 392, a camera 393, a display 394, a subscriber identification module (subscriber identification module, SIM) card interface 395, and the like.

It can be understood that the schematic structure in this embodiment does not constitute a specific limitation on the electronic device 300. In some other embodiments, the electronic device 300 may include more or fewer components than those shown in the figure, or some components may be combined, or some components may be split, or components may be arranged in different manners. The components shown in the figure may be implemented by hardware, software, or a combination of software and hardware.

The processor 310 may include one or more processing units. For example, the processor 310 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate devices, or may be integrated into one or more processors.

The controller may be a nerve center and a command center of the electronic device 300. The controller may generate an operation control signal based on an instruction operation code and a time sequence signal, to control instruction fetching and instruction execution. A memory may be further disposed in the processor 310 to store instructions and data. In some embodiments, the memory in the processor 310 is a cache memory. The memory may store instructions or data recently used or cyclically used by the processor 310. If the processor 310 needs to use the instructions or the data again, the processor 310 may directly call the instructions or the data from the memory. This avoids repeated access, reduces waiting time of the processor 310, and improves system efficiency.

The charging management module 340 is configured to receive charging input from a charger. The charger may be a wireless charger or a wired charger. In some embodiments of wired charging, the charging management module 340 may receive charging input from a wired charger through the USB interface 330. In some embodiments of wireless charging, the charging management module 340 may receive wireless charge input through a wireless charging coil of the electronic device 300. While the charging management module 340 charges the battery 342, the power management module 341 may further supply power to the electronic device.

The power management module 341 is connected to the battery 342, the charging management module 340, and the processor 310. The power management module 341 receives input from the battery 342 and/or the charging management module 340, and supplies power to the processor 310, the internal memory 321, an external memory, the display 394, the camera 393, the wireless communication module 360, and the like. The power management module 341 may be further configured to monitor parameters such as a battery capacity, a battery cycle count, and a battery state of health (electric leakage and impedance). In some other embodiments, the power management module 341 may alternatively be disposed in the processor 310. In some other embodiments, the power management module 341 and the charging management module 340 may alternatively be disposed in a same device.

A wireless communication function of the electronic device 300 may be implemented by the antenna 1, the antenna 2, the mobile communication module 350, the wireless communication module 360, the modem processor, the baseband processor, and the like.

The electronic device 300 implements a display function through the GPU, the display 394, the application processor, and the like. The GPU is a microprocessor for image processing, and is connected to the display 394 and the application processor. The GPU is configured to perform mathematical and geometric computation, and render an image. The processor 310 may include one or more GPUs that execute program instructions to generate or change display information.

The display 394 is configured to display an image, a video, and the like. The display 394 is the foregoing foldable screen (for example, a flexible foldable screen or a multi-screen foldable screen). The display 394 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a Micro-OLED, a quantum dot light emitting diode (quantum dot light emitting diodes, QLED), or the like.

The electronic device 300 may implement a photographing function by using the ISP, the camera 393, the video codec, the GPU, the display 394, the application processor, and the like.

The external memory interface 320 may be used for connecting an external storage card such as a micro SD card, to expand a storage capability of the electronic device 300. The external storage card communicates with the processor 310 through the external memory interface 320, to implement a data storage function. For example, files such as music and videos are stored in the external storage card.

The internal memory 321 may be configured to store computer-executable program code. The executable program code includes instructions. The processor 310 runs the instructions stored in the internal memory 321, to implement various functional applications and data processing of the electronic device 300. For example, in this embodiment of this application, the processor 310 may detect a folding angle (namely, an included angle between adjacent screens) of the display 394 (namely, the foldable screen) by executing the instructions stored in the internal memory 321, and in response to a change of the included angle, display content (namely, an image) corresponding to the included angle. The internal memory 321 may include a program storage area and a data storage area. The program storage area may store an operating system, an application required by at least one function (for example, a sound playing function or an image playing function), and the like. The data storage area may store data (for example, audio data and an address book) created during use of the electronic device 300, and the like. In addition, the internal memory 321 may include a high-speed random access memory, or may include a non-volatile memory such as at least one magnetic disk memory, a flash memory, or a universal flash storage (universal flash storage, UFS).

The electronic device 300 may implement an audio function such as music playing or recording by using the audio module 370, the speaker 370A, the receiver 370B, the microphone 370C, the headset jack 370D, the application processor, and the like.

The button 390 includes a power button, a volume button, and the like. The button 390 may be a mechanical button or a touch button. The electronic device 300 may receive input on the button, and generate button signal input related to user settings and function control of the electronic device 300.

The motor 391 may generate a vibration prompt. The motor 391 may be configured to provide an incoming call vibration prompt or a touch vibration feedback. For example, touch operations performed on different applications (for example, photographing and audio playing) may correspond to different vibration feedback effect. The motor 391 may also correspond to different vibration feedback effect for touch operations performed on different regions of the display 394. Different application scenarios (for example, a time reminder, information receiving, an alarm clock, and a game) may also correspond to different vibration feedback effect. Touch vibration feedback effect may be further customized.

The indicator 392 may be an indicator light, and may be configured to indicate a charging status and a battery level change, or may be configured to indicate a message, a missed call, a notification, and the like.

The SIM card interface 395 is used for connecting a SIM card. The SIM card may be inserted into the SIM card interface 395 or removed from the SIM card interface 395, to implement contact with or separation from the electronic device 300. The electronic device 300 may support one or N SIM card interfaces, where N is a positive integer greater than 1. The SIM card interface 395 may support a nano-SIM card, a micro-SIM card, a SIM card, and the like. A plurality of cards may be inserted into a same SIM card interface 395 at the same time. The plurality of cards may be of a same type or different types. The SIM card interface 395 is also compatible with different types of SIM cards. The SIM card interface 395 is also compatible with an external storage card. The electronic device 300 interacts with a network through the SIM card, to implement functions such as calling and data communication. In some embodiments, the electronic device 300 uses an eSIM, that is, an embedded SIM card. The eSIM card may be embedded into the electronic device 300, and cannot be separated from the electronic device 300.

Methods in the following embodiments may all be implemented in the electronic device 300 having the foregoing hardware structure. The following describes the methods in the embodiments of this application by using an example in which the electronic device 300 is a mobile phone.

In the video recording method provided in the embodiments of this application, before video recording starts or during video recording, the mobile phone may switch a photographing mode in response to a preset gesture input by a user on a current viewfinder interface. The video recording method provided in the embodiments of this application is described in scenarios in which a current viewfinder interface is a viewfinder interface in a single-scene mode (for example, in a scenario 1), a viewfinder interface in a front/rear dual-scene (or rear/rear dual-scene) mode (for example, in a scenario 2), and a viewfinder interface in a picture-in-picture dual-scene mode (for example, in a scenario 3).

Scenario 1: A current viewfinder interface is a viewfinder interface in a single-scene mode. In the scenario 1, the viewfinder interface in the single-scene mode is referred to as an interface a.

The viewfinder interface in the single-scene mode includes a preview image captured by a single front-facing camera or a preview image captured by a single rear-facing camera.

Figure 4A:
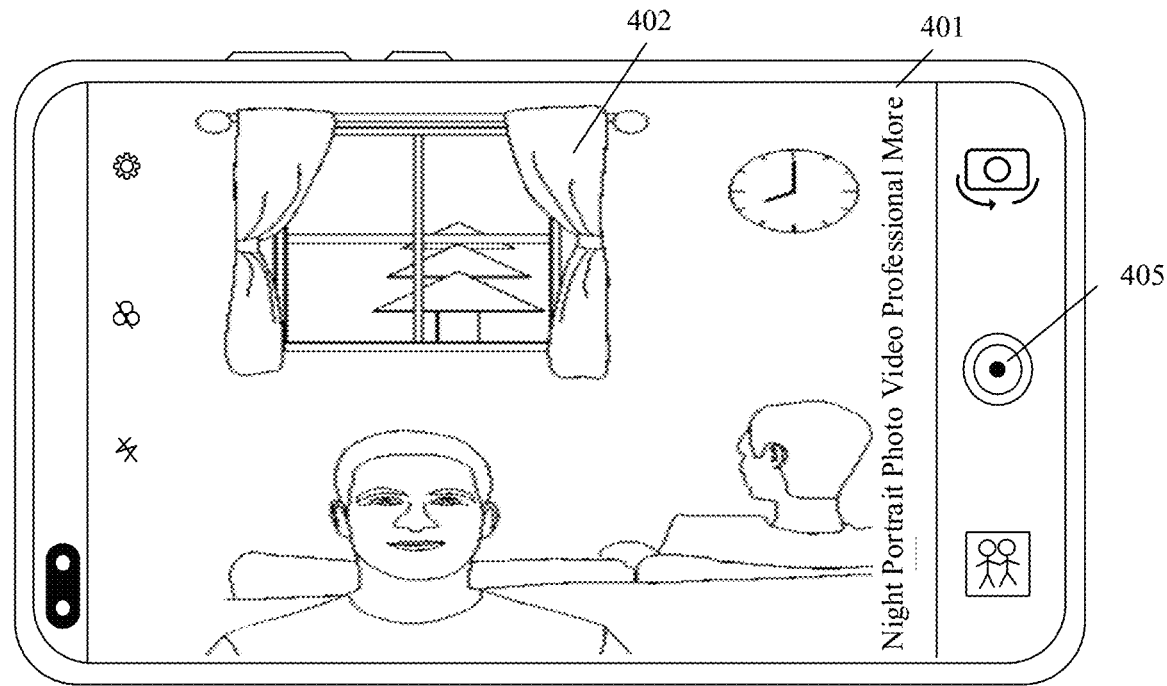
FIG. 4A and FIG. 4B are a schematic diagram of a viewfinder interface for dual-scene video recording in another landscape scenario according to an embodiment of this application.

For example, the current viewfinder interface is an interface a 401 shown in FIG. 4A. The interface a 401 includes a preview image 402. Assuming that the preview image 402 is a preview image captured by a front-facing camera, the interface a 401 is a viewfinder interface in a front-facing single-scene mode.

Figure 4B:
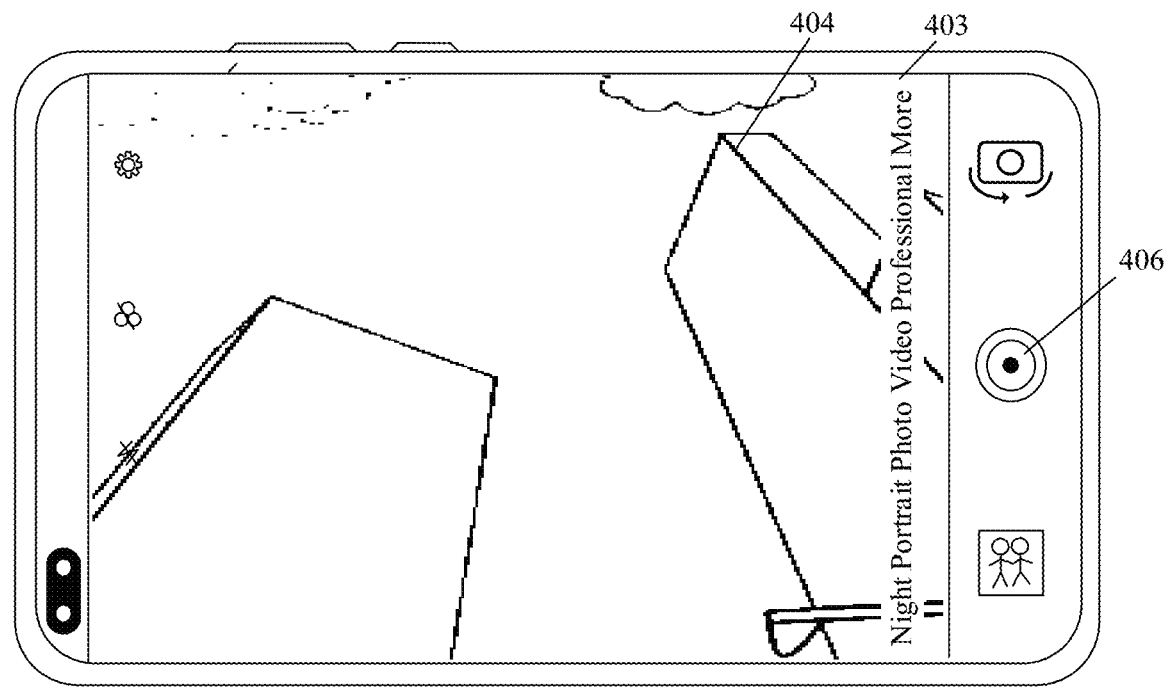

For another example, the current viewfinder interface is an interface a 403 shown in FIG. 4B. The interface b 403 includes a preview image 404. Assuming that the preview image 404 is a preview image captured by a rear-facing primary camera, the interface a 403 is a viewfinder interface in a rear-facing single-scene mode.

It should be noted that, in the accompanying figures of this specification, although only several fixed preview images are shown, a person skilled in the art should understand that a preview image in this specification is a real-time image captured by a corresponding camera, but not a preset image or a fixed image captured at a specific moment.

Figure 5:
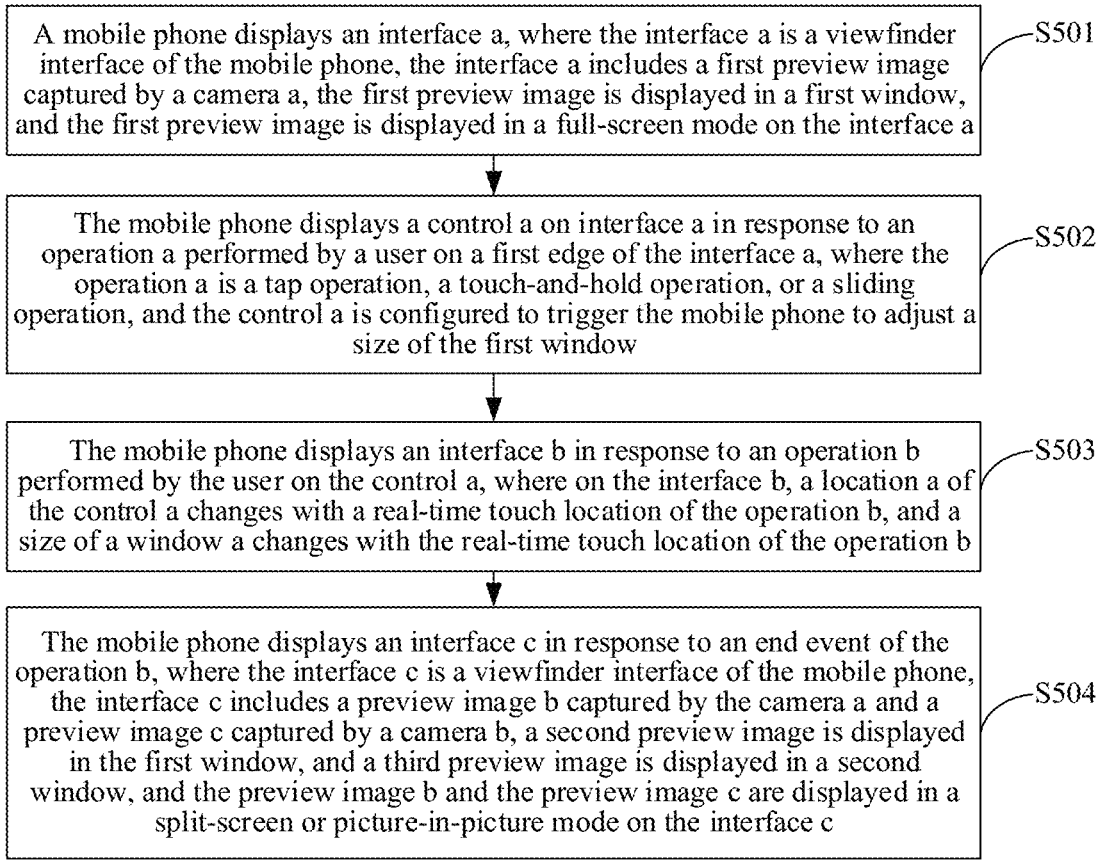
FIG. 5 is a flowchart of a video recording method according to an embodiment of this application.

An embodiment of this application provides a video recording method, applied to a mobile phone including a plurality of cameras. In addition, the mobile phone may provide a dual-scene video recording function. As shown in FIG. 5, the method includes S501 to S504.

S501: The mobile phone displays an interface a, where the interface a is a viewfinder interface for video recording by the mobile phone, the interface a includes a first preview image captured by a camera a, the first preview image is displayed in a first window, and the first preview image is displayed in a full-screen mode on the interface a.

In the scenario 1, the interface a may also be referred to as a first interface, the camera a may also be referred to as a first camera, and the first preview image may also be referred to as a first image.

Figure 6:
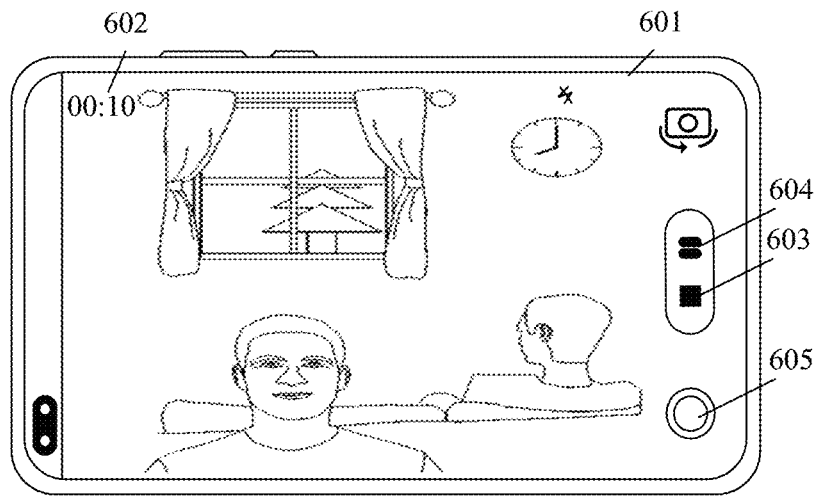
FIG. 6 is a schematic diagram of a viewfinder interface for dual-scene video recording in another landscape scenario according to an embodiment of this application.

In this embodiment of this application, a photographing mode may be switched before video recording starts or during video recording. Correspondingly, the interface a may be a viewfinder interface for video recording before the mobile phone starts video recording. For example, the interface a 401 shown in FIG. 4A includes a control 405 for starting video recording. In this case, the interface a 401 is a viewfinder interface for video recording before video recording starts. Similarly, the interface a 403 shown in FIG. 4B includes a control 406 for starting video recording. In this case, the interface a 403 is a viewfinder interface for video recording before video recording starts. Alternatively, the interface a may be a viewfinder interface during video recording. For example, an interface a 601 shown in FIG. 6 includes icons indicating that video recording is ongoing, for example, a video recording timer 602, a control 603 for stopping video recording, a control 604 for pausing video recording, and a screenshot control 605. In this case, the interface a 601 is a viewfinder interface during video recording.

First, it should be noted herein that, in the scenario 1, a switching process is described mainly by using an example in which the interface a is a viewfinder interface before video recording starts.

The interface a includes a preview image captured by a single camera a. The camera a may be any one of the plurality of cameras included in the mobile phone. For example, the camera a is any one of a front-facing camera, a rear-facing primary camera, a rear-facing telephoto camera, a rear-facing wide-angle camera, and a rear-facing ultra-wide-angle camera.

S502: The mobile phone displays a control a on the interface a in response to an operation performed by a user on a first edge of the interface a, where the operation a is a tap operation, a touch-and-hold operation, or a sliding operation, and the control a is configured to trigger the mobile phone to adjust a size of the first window.

In the scenario 1, the operation a may also be referred to as a first operation, and the control a may also be referred to as a first control.

Before S502, the mobile phone may receive the operation a performed by the user on the first edge of the interface a. The operation a is used for triggering the mobile phone to activate the control a, so as to trigger switching of a photographing mode through the control a.

When the mobile phone is in a landscape state, the first interface is a landscape-mode interface, and the first edge may be a left edge or a right edge of the landscape-mode interface. When the mobile phone is in a portrait state, the first interface is a portrait-mode interface, and the first edge may be an upper edge or a lower edge of the portrait-mode interface. In this embodiment of this specification, the landscape mode is mainly used for description. In this case, the first edge is the left edge and the right edge.

The operation a may be a tap operation (for example, a single-tap operation or a double-tap operation) or a touch-and-hold operation. For example, the operation a may be a touch-and-hold operation performed on a region near a left edge line 702 of an interface a 701 shown in FIG. 7A. That is, the first edge is the left edge, and is specifically the region near the left edge line 702.

Alternatively, the operation a may be a sliding operation. The sliding operation may be an inward sliding operation from the left edge or the right edge. For example, the operation a is an inward sliding operation performed by the user from a region near a right edge line 704 of an interface a 703 shown in FIG. 7B. That is, the first edge is the right edge, and is specifically the region near the right edge line 704.

The sliding operation may alternatively be a bottom-up sliding operation at the left edge or the right edge, or a top-down sliding operation at the left edge or the right edge. For example, the operation a may be a bottom-up sliding operation performed by the user on a region near a right edge line 706 of an interface a 705 shown in FIG. 7C.

In the following embodiments, the solutions of this application are mainly described by using an example in which the operation a is a touch-and-hold operation performed on the left edge of the interface a.

In S502, the mobile phone displays the control a on the interface a in response to the operation a. The control a is displayed at the first edge at which the user inputs the operation a. That is, when the user inputs the operation a on the left edge of the interface a, the control a is displayed at the left edge. When the user inputs the operation a on the right edge of the interface a, the control a is displayed at the right edge.

Figure 7A:
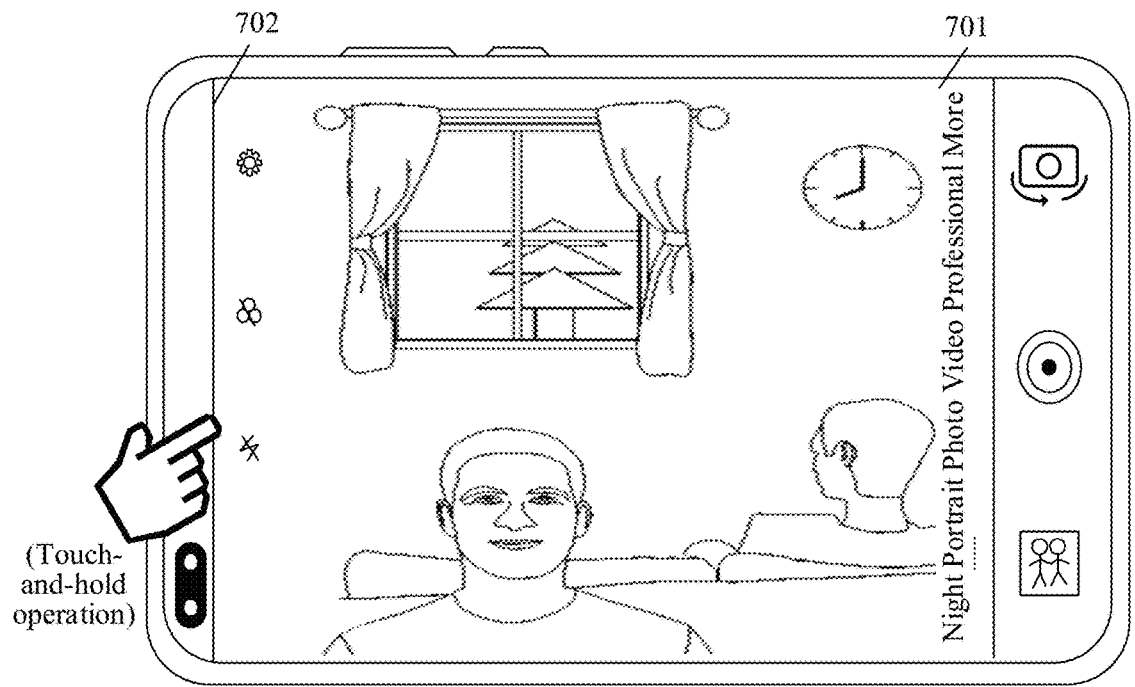
FIG. 7A, FIG. 7B, and FIG. 7C are a schematic diagram of a viewfinder interface for dual-scene video recording in another landscape scenario according to an embodiment of this application.
Figure 7B:
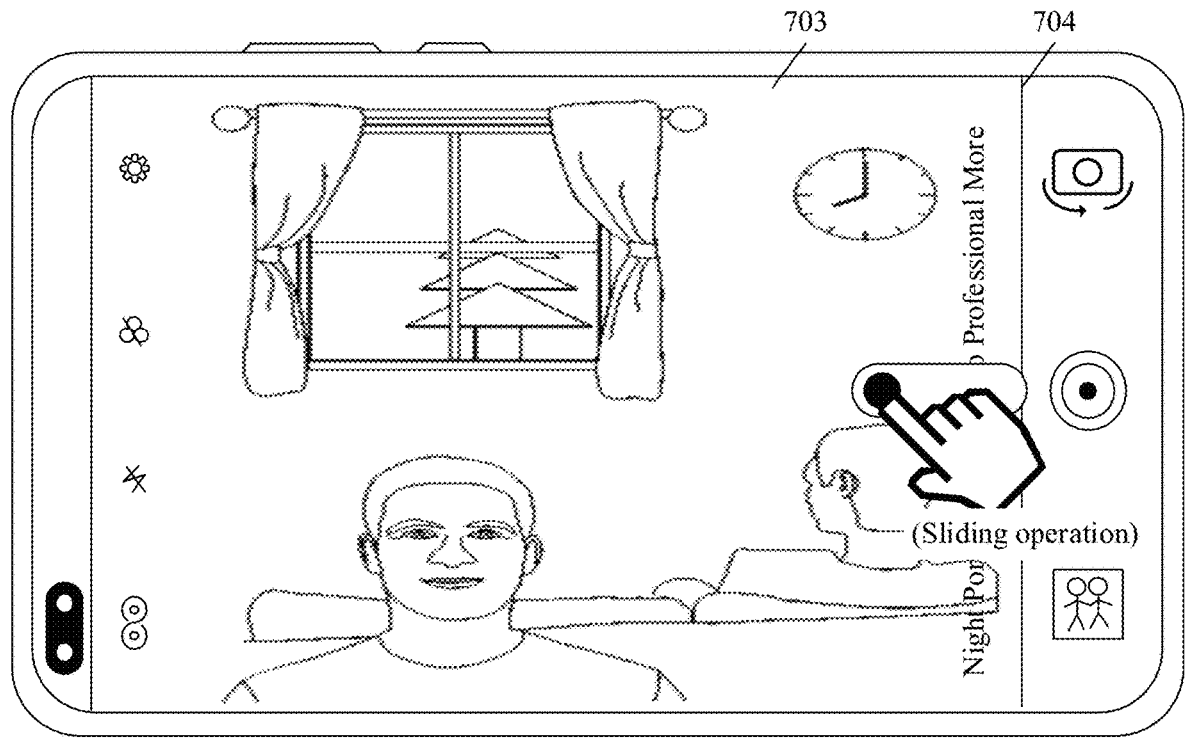
Figure 7C:
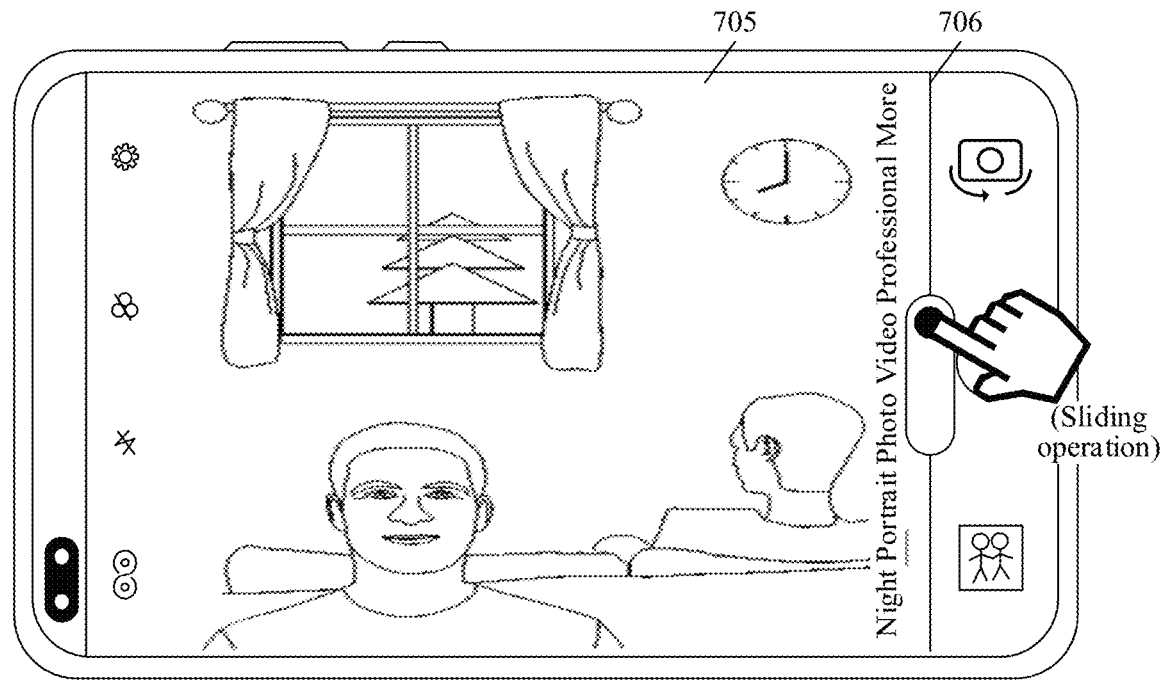

For example, the mobile phone receives the touch-and-hold operation performed by the user on the region near the left edge line 702 of the interface a 701 shown in FIG. 7A. In response to the touch-and-hold operation, the mobile phone may display an interface a 801 shown in FIG. 8. The interface a 801 includes a control a 802. The control a 802 is displayed in a region near a left edge line of the interface a 801.

Figure 8:
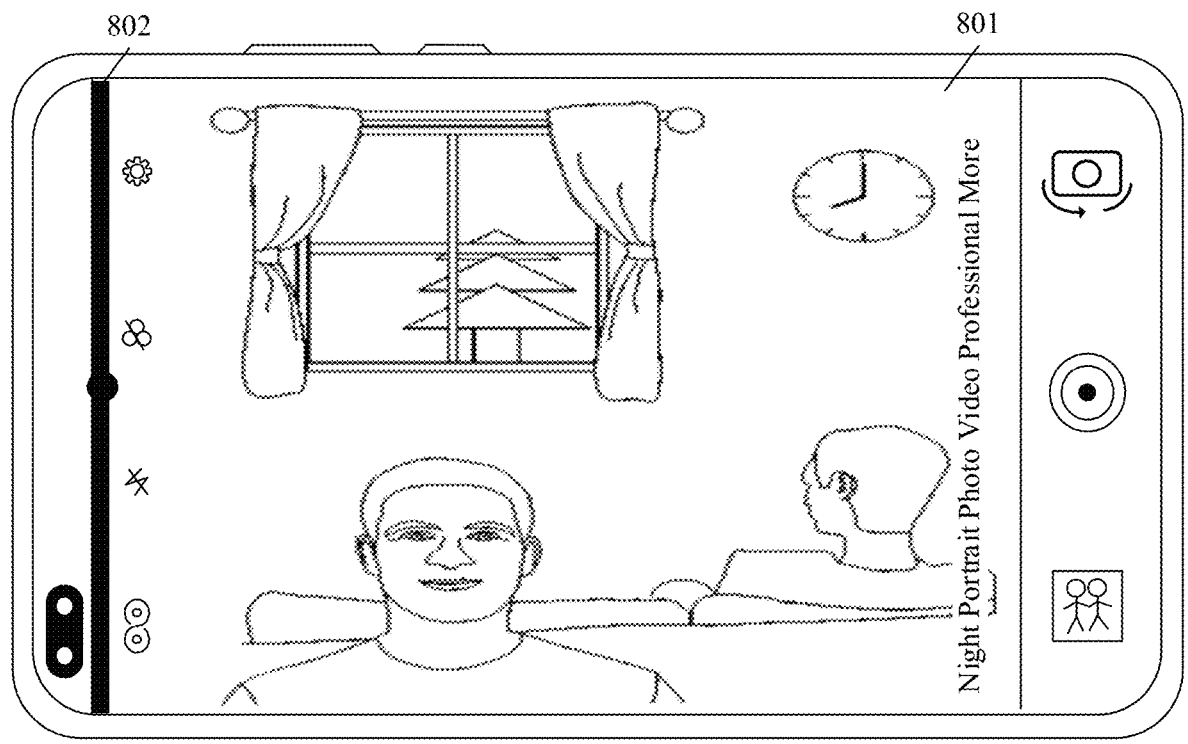
FIG. 8 is a schematic diagram of a viewfinder interface for dual-scene video recording in another landscape scenario according to an embodiment of this application.

It should be understood that the form of the control a shown in FIG. 8 is only an example, and this does not constitute a limitation in actual implementation. For example, the control a may alternatively be in a shape matching a fringe at the top of the mobile phone.

S503: The mobile phone displays an interface b in response to an operation b performed by the user on the control a, where on the interface b, a location a of the control a changes with a real-time touch location of the operation b, and a size of a window a changes with the real-time touch location of the operation b.

The operation b is a drag-and-drop operation performed by the user on the control a. In the scenario 1, the operation b may also be referred to as a first drag-and-drop operation, the interface b may also be referred to as a second interface, and the location a may also be referred to as a first location.

Before S503, the mobile phone may receive the operation b performed by the user on the control a. The operation b is a drag-and-drop operation of moving the control a inward from the first edge. For example, the operation b is a drag-and-drop operation performed by the user on a control a 902 on an interface a 901 shown in FIG. 9A along a direction of an arrow.

It should be noted that the operation b is a continuous action, and the operation b continues after the interface b is displayed. In addition, the operation b and the operation a may be consecutive operations. That is, a finger of the user or a stylus does not leave a screen of the mobile phone in an interval between the operation a and the operation b. Alternatively, the operation b and the operation a may be separate operations. When the operation b and the operation a are separate operations, after the mobile phone displays the control a on the interface a, if the mobile phone does not detect an operation performed by the user on the control a within preset time, the control a is hidden, to prevent the control a from blocking a preview.

In S503, the mobile phone may display the interface b in response to the operation b. The interface b also includes a control a, and a location a of the control a changes with a real-time touch location of the operation b on the interface b. That is, the location a is continuously changing.

Figure 9A:
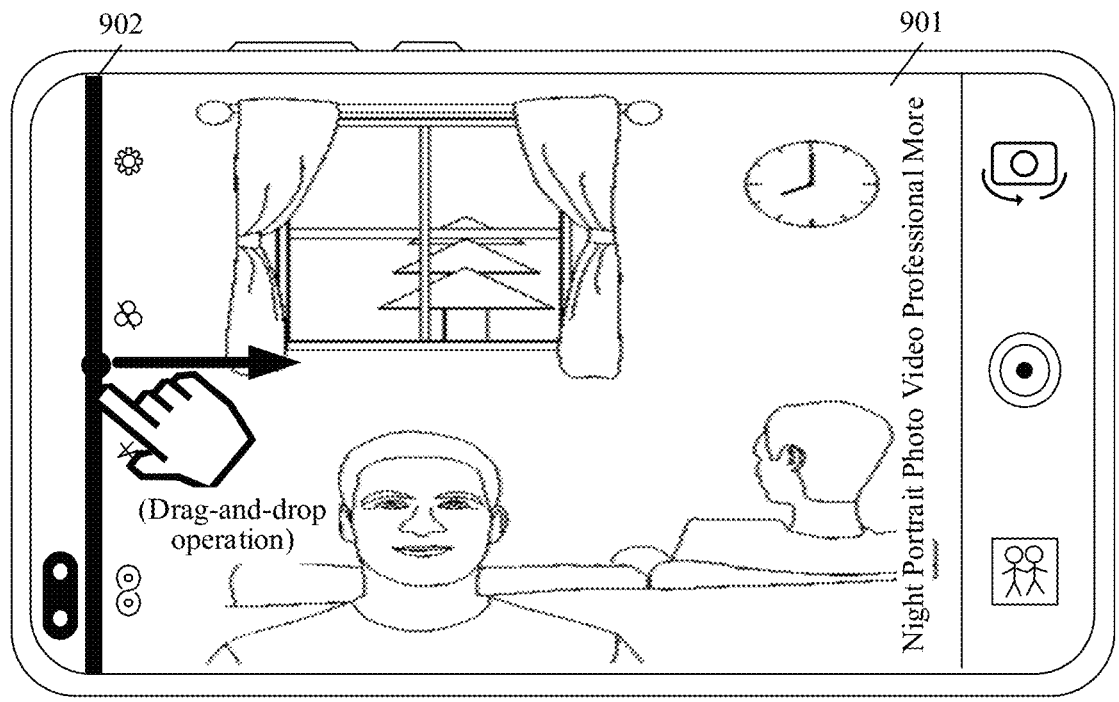
FIG. 9A, FIG. 9B, and FIG. 9C are a schematic diagram of a viewfinder interface for dual-scene video recording in another landscape scenario according to an embodiment of this application.
Figure 9B:
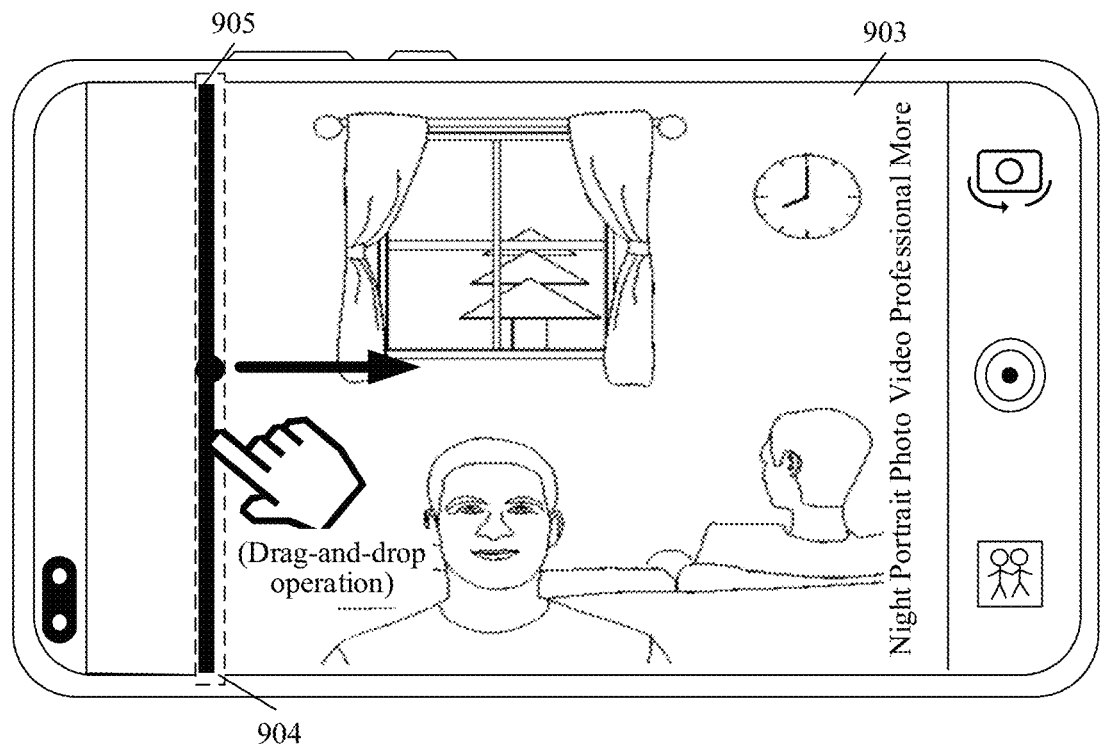

For example, the mobile phone may receive the drag-and-drop operation performed by the user on the control a 902 on the interface a 901 shown in FIG. 9A along the direction of the arrow. In response to the drag-and-drop operation, the mobile phone may display an interface b 903 shown in FIG. 9B. A location a 904 (a location in a dashed-line box) on the interface b 903 includes a control a 905. As the real-time touch location of the drag-and-drop operation changes, the mobile phone may display an interface b 906 shown in FIG. 9C. A location a 907 (a location in a dashed-line box) on the interface b 906 includes a control a 908. Clearly, as the real-time touch location of the drag-and-drop operation continuously moves to the right along the direction of the arrow, the location a also continuously moves to the right.

To simulate a switching process when the location a of the control a is continuously changing, a first side of the control a on the interface b further includes a transition image a, and a second side of the control a further includes a transition image b. Correspondingly, a display size of the transition image a and a display size of the transition image b correspondingly change with a change of the location a of the control a. The transition image a is displayed in the first window, and the transition image b is displayed in a second window. In the scenario 1, the transition image a may also be referred to as an eleventh image, and the transition image b may also be referred to as a twelfth image.

Figure 9C:
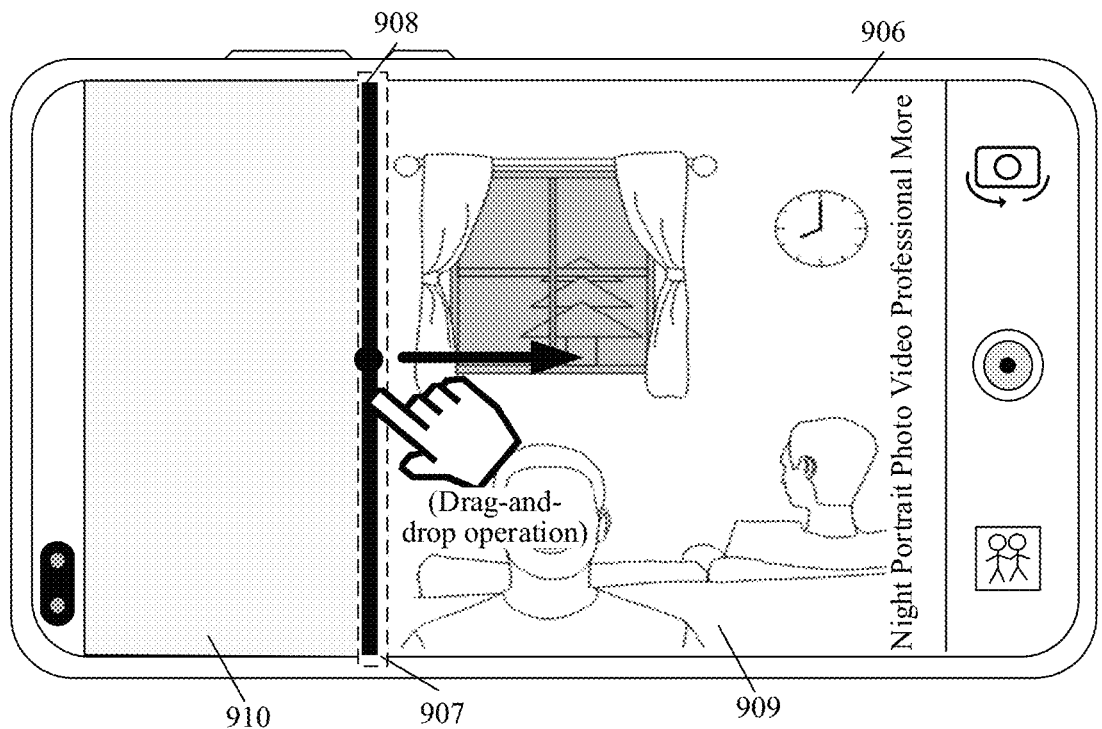

For example, the interface b 906 shown in FIG. 9C includes the control a 908, and a right side of the control a 908 further includes a transition image a 909, that is, the first side is the right side. A left side of the control a 908 further includes a transition image b 910, that is, the second side is the left side. In addition, as the location a of the control a continuously moves to the right, a display size of the transition image a 909 continuously decreases, and a size of the transition image b 910 continuously increases.

The transition image a may be in one of the following forms.

Form 1: The transition image a is the first preview image captured by the camera a. That is, the transition image a is an image captured by the camera in real time. In this way, in a process from beginning of input of the operation b to ending of input of the operation b (referred to as a transition process below), real-time view content is displayed on the viewfinder interface, thereby ensuring authenticity of content on the viewfinder interface.

For example, the interface b 906 shown in FIG. 9C includes the transition image a 909, and the transition image a 909 is the first preview image captured by the camera a.

Form 2: The transition image a is at least one frame of preview image captured by the camera a within a period of time before and after the user starts to input the operation b. That is, the transition image a is a non-real-time preview image captured by the camera A. In a specific implementation, in response to the operation b performed by the user on the control a, the mobile phone may obtain a preview image captured by the camera a at a moment at which the user starts to input the operation b. Then, in a process in which the user continuously inputs the operation b, the preview image captured by the camera a at the moment at which the user starts to input the operation b is zoomed to adapt to a display size of the transition image a at a current moment.

In the form 2, a historical preview image captured by the camera a is used, so that authenticity of content on the viewfinder interface in the transition process can be ensured to some extent. In addition, a preview image does not need to be captured in real time in the transition process, so that power consumption of the mobile phone can be reduced.

For example, the interface b 906 shown in FIG. 9C includes the transition image a 909, and the transition image a 909 may be a preview image captured by the camera a at a moment at which the user starts to input the drag-and-drop operation. For example, the interface a 901 shown in FIG. 9A corresponds to the interface a on which the user starts to input the drag-and-drop operation. In this case, the preview image captured by the camera a at the moment at which the user starts to input the drag-and-drop operation may be a preview image on the interface a 901 shown in FIG. 9A.

Form 3: The transition image a may be a blurred image. For example, the transition image a may be a preset blurred image, or an image obtained by blurring the preview image in the form 1 or the form 2. In this way, the switching transition process can be simulated through blurred transition effect.

The transition image b may be in one of the following forms.

Form 1: The transition image b may be a preset image. The preset image is used, so that power consumption in the switching process can be reduced.

The preset image may be a preset pure-color image. For example, the interface b 906 shown in FIG. 9C includes the control a 908. A left side of the control a 908 further includes the transition image b 910. The transition image b 910 is a pure-gray image.

Alternatively, the preset image may be a preset blurred image. In this way, the switching transition process can be simulated through blurred transition effect.

Form 2: The transition image b may be a second preview image captured by a camera b (also referred to as a second image). The camera b is a camera other than the camera a in the plurality of cameras included in the mobile phone. The second preview image captured by the camera b is used as the transition image a, so that a real-time preview image can be used for transition, and the transition process is more real.

Figure 10:
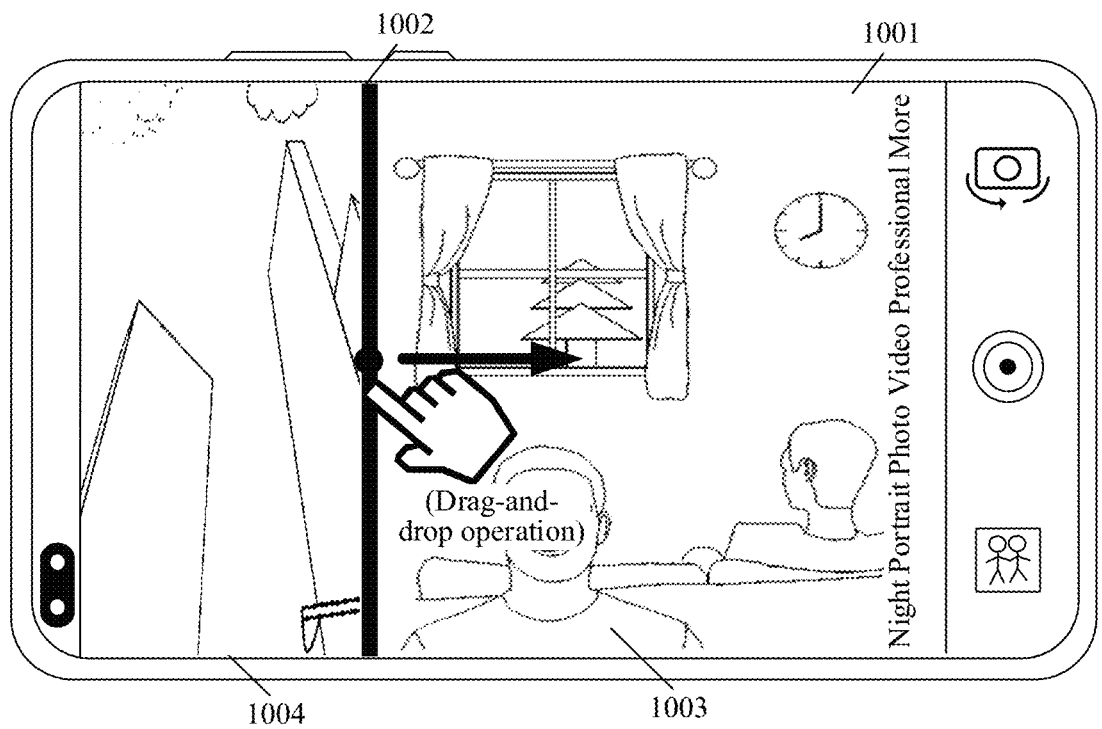
FIG. 10 is a schematic diagram of a viewfinder interface for dual-scene video recording in another landscape scenario according to an embodiment of this application.

For example, an interface b 1001 shown in FIG. 10 includes a control a 1002, and a left side of the control a 1002 further includes a transition image b 1004. The transition image b 1004 is the second preview image captured by the camera b (for example, a rear-facing primary camera).

It should be understood that, in actual implementation, any one of the transition images a in the three forms and any one of the transition images b in the two forms may be combined. This is not specifically limited in this embodiment of this application. For example, to unify transition images on two sides of the control a, both the transition image a and the transition image b may be preset blurred images. Alternatively, to ensure authenticity of displayed content, the transition image a may be the first preview image captured by the camera a, and the transition image b may be the second preview image captured by the camera b. For example, the interface b 1001 shown in FIG. 10 includes a transition image a 1003 and a transition image b 1004, the transition image a 1003 is the first preview image captured by the camera a, and the transition image b 1004 is the second preview image captured by the camera b.

In the following embodiments, for ease of comparison, the solutions of this application are mainly described by using an example in which the transition image b is a preset gray image.

S504: The mobile phone displays an interface c in response to an end event of the operation b, where the interface c is a viewfinder interface for video recording by the mobile phone, the interface c includes a preview image b captured by the camera a and a preview image c captured by the camera b, a second preview image is displayed in the first window, and a third preview image is displayed in the second window, and the preview image b and the preview image c are displayed in a split-screen or picture-in-picture mode on the interface c.

In the scenario 1, the interface c may also be referred to as a third interface, the second preview image may also be referred to as a second image, and the third preview image may also be referred to as a third image.

Before S504, the mobile phone may detect an end of the operation b. When the operation b is stopped and the finger or the stylus leaves a display, the end of the operation b is detected, that is, the end event of the operation b is triggered.

The mobile phone displays the interface c after receiving the end event. It should be understood that, when the interface a is a viewfinder interface for video recording before video recording starts, the interface c is also a viewfinder interface for video recording before video recording starts. When the interface a is a viewfinder interface during video recording, the interface c is also a viewfinder interface during video recording.

The camera b may be started when the mobile phone detects that the user starts to input the operation b. In this way, the second preview image captured by the camera b can be used for transition in the transition process of S503. Alternatively, the camera b may be started when it is detected that the user ends input of the operation b. In this way, the camera b is started only when there is a switching requirement, thereby reducing power consumption of the mobile phone. Usually, if the camera a is a front-facing camera, the camera b is any one of rear-facing cameras. For example, the camera b is the rear-facing primary camera. If the camera a is a rear-facing camera, the camera b may be any one of front-facing cameras. It should be noted that there is usually only one front-facing camera. In this case, the camera b is the only front-facing camera. In this way, switching may be performed to a photographing mode in which a front-facing camera and a rear-facing camera are used by default. This can meet most dual-scene video recording requirements, and reduce a quantity of times of switching performed by the user.

Specifically, the mobile phone may display the first preview image and the second preview image on the interface c based on a touch location at the end of the operation b, so that a display size of the first preview image and a display size of the second preview image on the interface c match the touch location at the end of the operation b, and a display mode for the first preview image and the second preview image on the interface c matches the touch location at the end of the operation b, to meet a switching requirement of the user.

Figure 11:
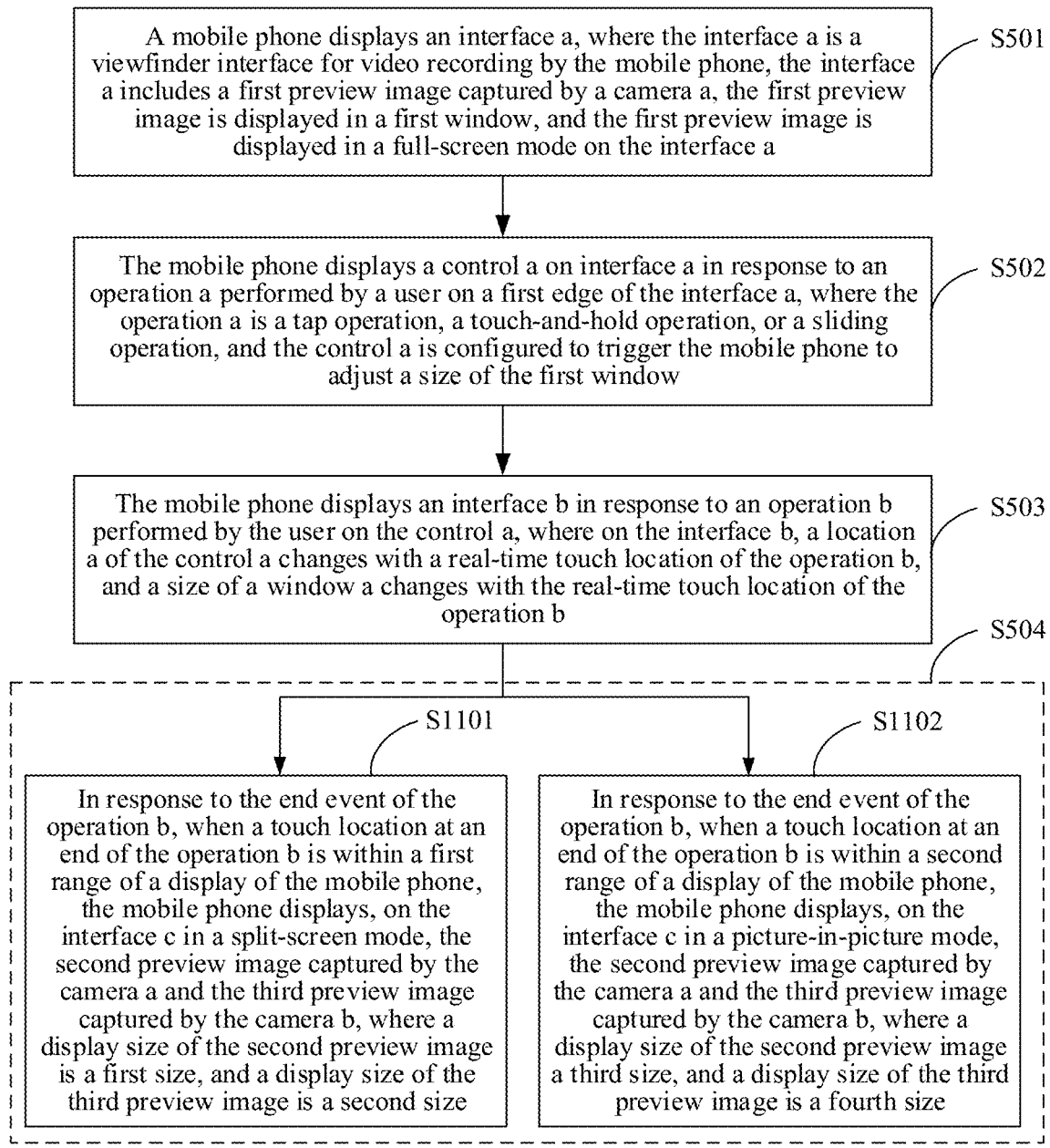
FIG. 11 is a flowchart of another video recording method according to an embodiment of this application.

In some embodiments, the mobile phone may display the second preview image and the third preview image on the interface c in different layout manners and at a fixed size in the corresponding layout manner based on different ranges to which the touch location at the end of the operation b belongs. Specifically, as shown in FIG. 11, S504 includes S1101 and S1102.

S1101: In response to the end event of the operation b, when the touch location at the end of the operation b is within a first range of the display of the mobile phone, the mobile phone displays, on the interface c in a split-screen mode, the second preview image captured by the camera a and the third preview image captured by the camera b, where a display size of the second preview image is a first size, and a display size of the third preview image is a second size.

It should be understood that the second preview image is displayed in the first window, and therefore the first size may also be understood as the size of the first window. Similarly, the second preview image is displayed in the second window, and therefore the second size may also be understood as the size of the second window.

Before S1101, the mobile phone may determine whether the touch location at the end of the operation b is within the first range.

When the mobile phone is in the landscape state, if the input of the operation b starts from the left edge of the interface a (that is, the first edge is the left edge), the first range is a range, on the display, within which a distance d1 from the left edge line is greater than or equal to a distance value 1 and less than a distance value 2. If the input of the operation b starts from the right edge of the interface a (that is, the first edge is the right edge), the first range is a range, on the display, within which a distance d1 from the right edge line is greater than or equal to a distance value 1 and less than a distance value 2. Usually, the distance value 1 is related to a distance d2 between the left edge line and the right edge line of the display, and the distance value 2 is related to the distance d2 between the left edge line and the right edge line of the display. For example, the distance value 1 is a product of a ratio 1 and d2, and the distance value 2 is a product of a ratio 2 and d2. In this way, photographing mode switching timing can be related to a size of the interface b, thereby improving appropriateness of photographing mode switching.

When the mobile phone is in the portrait state, if the input of the operation b starts from the upper edge of the interface a (that is, the first edge is the upper edge), the first range is a range, on the display, within which a distance d1 from the upper edge line is greater than or equal to a distance value 1 and less than a distance value 2. If the input of the operation b starts from the lower edge of the interface a (that is, the first edge is the lower edge), the first range is a range, on the display, within which a distance d1 from the lower edge line is greater than or equal to a distance value 1 and less than a distance value 2. Usually, the distance value 1 is related to a distance d2 between the upper edge line and the lower edge line of the display, and the distance value 2 is related to the distance d2 between the upper edge line and the lower edge line of the display. For example, the distance value 1 is a product of a ratio 1 and d2, and the distance value 2 is a product of a ratio 2 and d2. In this way, photographing mode switching timing can be related to a size of the display, thereby improving appropriateness of photographing mode switching.

It should be understood that all distances mentioned in this specification are vertical distances. That is, the first range includes a range, on the display, within which a vertical distance from the first edge is greater than or equal to a distance value 1 and less than a distance value 2. The distance value 1 may also be referred to as a first distance value, and the distance value 2 may also be referred to as a second distance value.

Figure 12A:
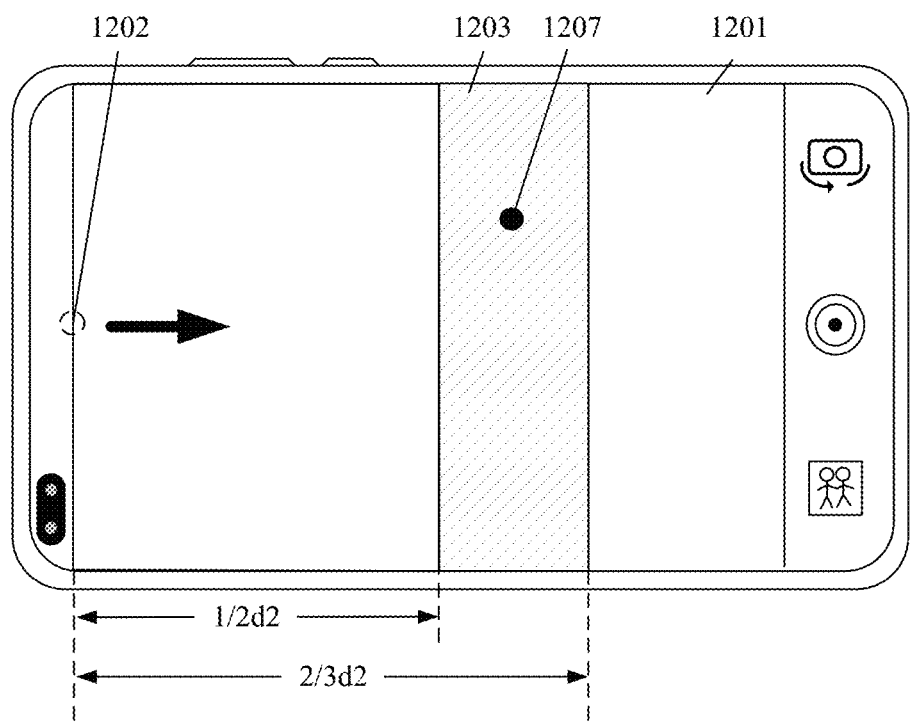
FIG. 12A and FIG. 12B are a schematic diagram of a viewfinder interface for dual-scene video recording in another landscape scenario according to an embodiment of this application.

For example, when the mobile phone is in the landscape state, the ratio 1 is ½, and the ratio 2 is ⅔. That is, if ½d2≤d1<⅔d2, the second preview image and the third preview image are displayed in a split-screen mode on the interface c. For example, on an interface b 1201 shown in FIG. 12A, a location 1202 is a touch location at the beginning of the operation b. That is, the input of the operation b starts from the left edge of the interface a. The first range may be a first range 1203 in FIG. 12A. A distance between a left edge of the first range 1203 and a left edge of the interface b is equal to ½d2, and a distance between a right edge of the first range 1203 and a left edge line of the interface b is equal to ⅔d2. In this specification, usually, an edge of the interface b may be approximately considered to be the left edge of the display. Especially in a full-screen mobile phone, an edge of an interface is an edge of a screen.

It should be noted that, in this specification, the range is described as being greater than or equal to. In some other embodiments, the range may alternatively be described as being less than or equal to. For example, the first range may alternatively include a range, on the display, within which a vertical distance from the first edge is greater than a distance value 1 and less than or equal to a distance value 2.

In some embodiments, the distance value 1 may be close to or equal to 0. In this embodiment, the first range may include a range, on the display, within which a vertical distance from the first edge is less than the distance value 2. In this way, sensitivity of switching can be improved.

On the interface c, the second preview image and the third preview image are displayed in a split-screen mode. When the mobile phone is in the landscape state, the split-screen mode means a left-right split-screen mode. When the mobile phone is in the portrait state, the split-screen mode means an up-down split-screen mode.

In addition, on the interface c, the second preview image is displayed in the first size, and the third preview image is displayed in the second size. The first size and the second size are fixed sizes preset for the split-screen mode. That is, provided that d1 is greater than or equal to the distance value 1 and less than the distance value 2, the second preview image is displayed in the first size, and the third preview image is displayed in the second size. Usually, a ratio of the first size to the second size is 1:1.

Figure 12B:
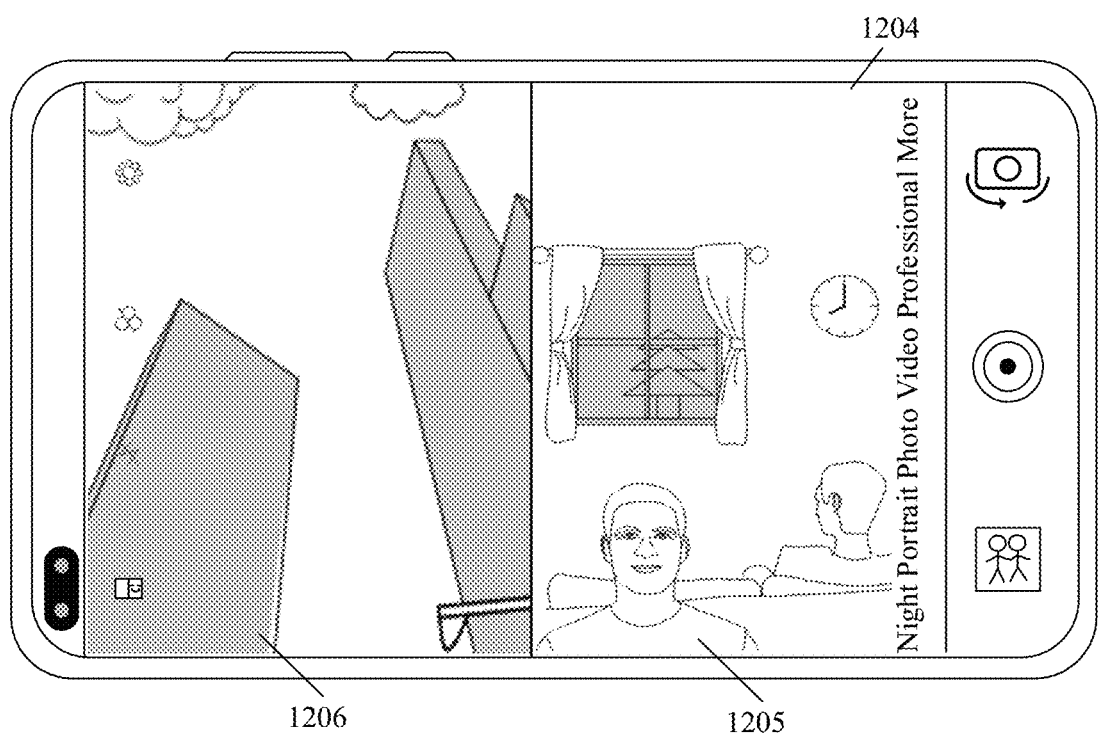

For example, the ratio 1 is ½, the ratio 2 is ⅔, and the ratio of the first size to the second size is 1:1. In this case, provided that ½d2≤d1<⅔d2, the second preview image and the third preview image are displayed on the interface c in a split-screen mode at a ratio of 1:1. For example, the touch location at the end of the operation b is a location 1207 in FIG. 12A, and the location 1207 belongs to the first range 1203. In response to the end event of the operation b, the mobile phone may display an interface c 1204 shown in FIG. 12B. The interface c 1204 includes a second preview image 1205 captured by the camera a and a third preview image 1206 captured by the camera b. In addition, the second preview image 1205 and the third preview image 1206 are displayed in a left-right split-screen mode at a ratio of 1:1.

Herein, it should be noted that the first size and the second size are prestored on the mobile phone (for example, in a camera application). After receiving the end event of the operation b, the camera application determines a range of the touch location at the end of the operation b. If the touch location belongs to the first range, the first size and the second size for the split-screen mode are sent to an underlying image processing module. Then the underlying image processing module processes a video stream captured by the camera a to obtain the second preview image of the first size, and processes a video stream captured by the camera b to obtain the third preview image of the second size. Finally, the image processing module sends the second preview image and the third preview image to the camera application for display.

S1102: In response to the end event of the operation b, when the touch location at the end of the operation b is within a second range of the display of the mobile phone, the mobile phone displays, on the interface c in a picture-in-picture mode, the second preview image captured by the camera a and the third preview image captured by the camera b, where a display size of the second preview image is a third size, and a display size of the third preview image is a fourth size.

It should be understood that the second preview image is displayed in the first window, and therefore the third size may also be understood as the size of the first window. Similarly, the third preview image is displayed in the second window, and therefore the fourth size may also be understood as the size of the second window. The first window is a small window in the picture-in-picture mode, and the second window is a large window in the picture-in-picture mode.

Before S1102, the mobile phone may determine whether the touch location at the end of the operation b is within the second range. The second range is adjacent to the first range.

When the mobile phone is in the landscape state, if the input of the operation b starts from the left edge of the interface a (that is, the first edge is the left edge), the second range is a range, on the display, within which a distance d1 from the left edge line is greater than or equal to a distance value 2. If the input of the operation b starts from the right edge of the interface a (that is, the first edge is the right edge), the second range is a range, on the display, within which a distance d1 from the right edge line is greater than or equal to a distance value 2.

When the mobile phone is in the portrait state, if the input of the operation b starts from the upper edge of the interface a (that is, the first edge is the upper edge), the second range is a range, on the display, within which a distance d1 from the upper edge line is greater than or equal to a distance value 2. If the input of the operation b starts from the lower edge of the interface a (that is, the first edge is the lower edge), the second range is a range, on the display, within which a distance d1 from the lower edge line is greater than or equal to a distance value 2.

Figure 13A:
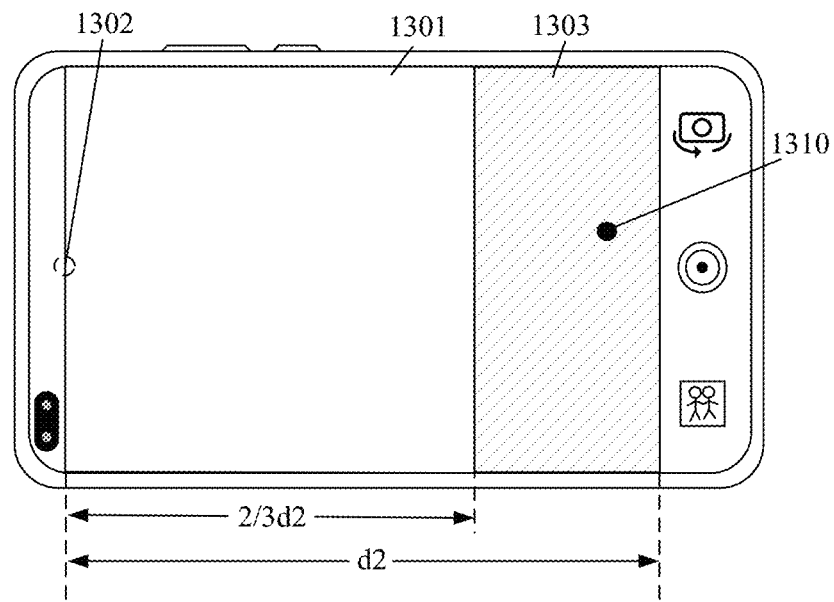
FIG. 13A and FIG. 13B are a schematic diagram of a viewfinder interface for dual-scene video recording in another landscape scenario according to an embodiment of this application.

For example, when the mobile phone is in the landscape state, the ratio 2 is ⅔. That is, if ⅔d2≤d1, the first preview image and the third preview image are displayed in a picture-in-picture mode on the interface c. For example, on an interface b 1301 shown in FIG. 13A, a location 1302 is a touch location at the beginning of the operation b. That is, the input of the operation b starts from the left edge of the interface a. The second range may be a second range 1203 in FIG. 13A. A distance between a left edge of the second range 1203 and a left edge line of the interface b is equal to ⅔d2, and a distance between a right edge of the second range 1203 and a left edge line of the interface b is equal to d2. Similarly, usually, an edge of the interface b may be approximately considered to be the left edge of the display.

On the interface c, the second preview image and the third preview image are displayed in a picture-in-picture mode. The second preview image is displayed in a small window in the picture-in-picture mode, and the third preview image is displayed in a large window in the picture-in-picture mode. That is, the first window is a small window, and the second window is a large window.

Figure 13B:
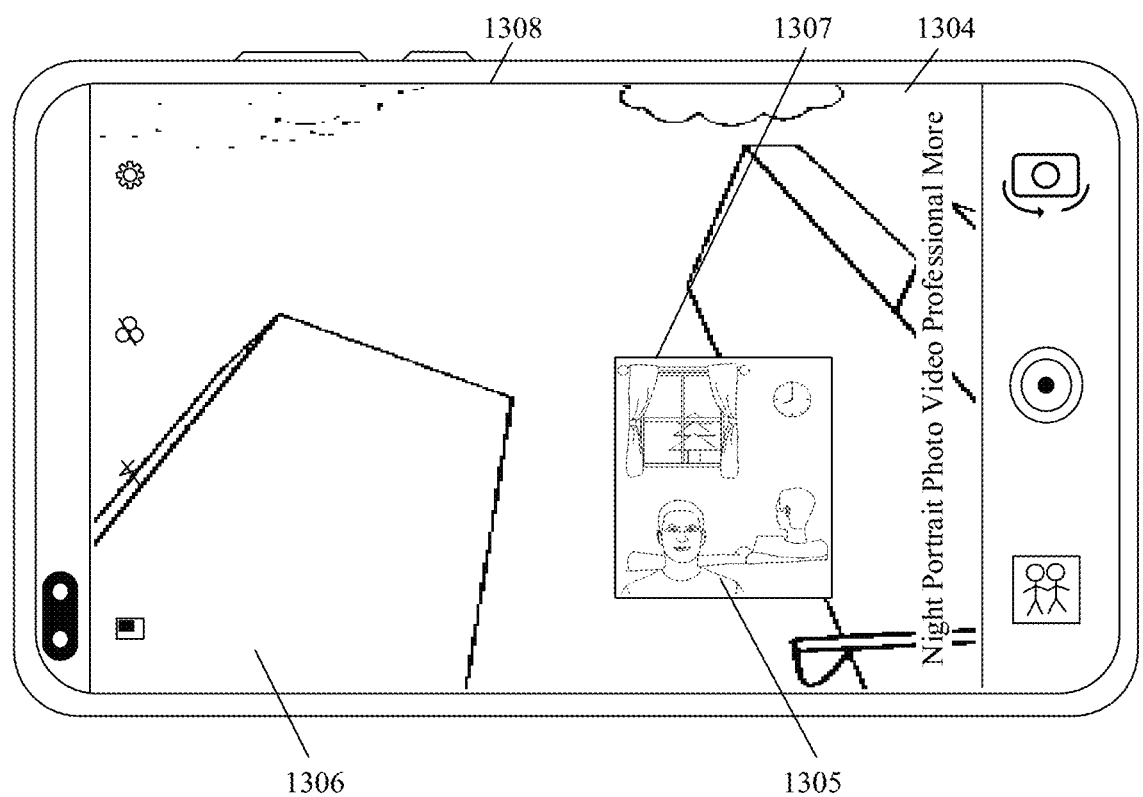

For example, if the ratio 2 is ⅔, provided that ⅔d2≤d1, the second preview image and the third preview image are displayed in the picture-in-picture mode. For example, the touch location at the end of the operation b is a location 1310 in FIG. 13A, and the location 1210 belongs to the second range 1303. In response to the end event of the operation b, the mobile phone may display an interface c 1304 shown in FIG. 13B. The interface c 1304 includes a first preview image 1305 captured by the camera a and a third preview image 1306 captured by the camera b. The first preview image 1305 is displayed in a small window 1307 in the picture-in-picture mode, and the third preview image 1306 is displayed in a large window 1308 in the picture-in-picture mode.

In addition, on the interface c, the second preview image is displayed in the third size (namely, a size of the small window), and the third preview image is displayed in the fourth size (namely, a size of the large window). The third size and the fourth size are fixed sizes preset for the picture-in-picture mode. That is, provided that d1/d2 is greater than the ratio 2, the second preview image is displayed in the third size, and the third preview image is displayed in the fourth size.

Similar to the first size and the second size, the third size and the fourth size are also prestored on the mobile phone (for example, in the camera application). After receiving the end event of the operation b, the camera application determines a range of the touch location at the end of the operation b. If the touch location belongs to the second range, the third size and the fourth size corresponding to the picture-in-picture mode are sent to the underlying image processing module. Then the underlying image processing module processes a video stream captured by the camera a to obtain the second preview image of the third size, and processes a video stream captured by the camera b to obtain the third preview image of the fourth size. Finally, the image processing module sends the second preview image and the third preview image to the camera application for display.

In the manner shown in S1101 and S1102, the second preview image and the third preview image may be displayed in a corresponding layout manner based on a range to which the touch location at the end of the operation b belongs. In this way, switching to different photographing modes can be triggered through a same operation. For example, if the touch location at the end of the operation b belongs to the first range, the single-scene mode may be switched to the front/rear dual-scene mode; or if the touch location at the end of the operation b belongs to the second range, the single-scene mode may be switched to the picture-in-picture dual-scene mode. In addition, in this manner, only a fixed size is used for switching and display, thereby improving efficiency of switching.

In some other embodiments, the mobile phone may switch, without a limitation of levels, the photographing mode based on the touch location at the end of the operation b, and is not limited to switching to a fixed-size split-screen layout or picture-in-picture layout. Specifically, in response to the end event of the operation b, the mobile phone displays the second preview image on a first side of a display location (for example, the location a) of the control a that corresponds to the end of the operation b on the interface c, and displays the third preview image on a second side of the display location (for example, the location a) of the control a that corresponds to the end of the operation b on the interface c. In this way, the second preview image and the third preview image may be displayed in corresponding sizes based on the location at the end of the operation b. This can improve diversity of display.

Figure 14A:
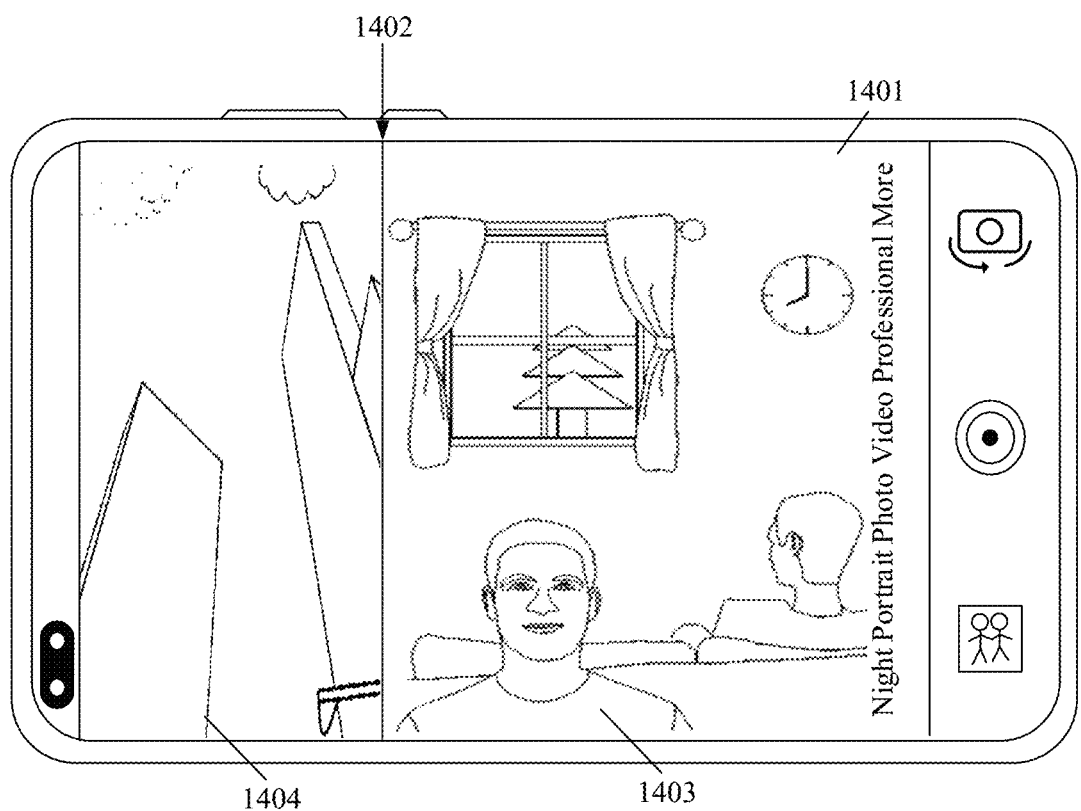
FIG. 14A, FIG. 14B, and FIG. 14C are a schematic diagram of a viewfinder interface for dual-scene video recording in another landscape scenario according to an embodiment of this application.

Example 1: In response to the end event of the operation b, the mobile phone may display an interface c 1401 shown in FIG. 14A. A display location of the control a at the end of the operation b corresponds to a location 1402 on the interface c 1401. In this case, a second preview image 1403 is displayed on a right side of the location 1402, and a third preview image 1404 is displayed on a left side of the location 1402. That is, the first side is the right side, and the second side is the left side.

Figure 14B:
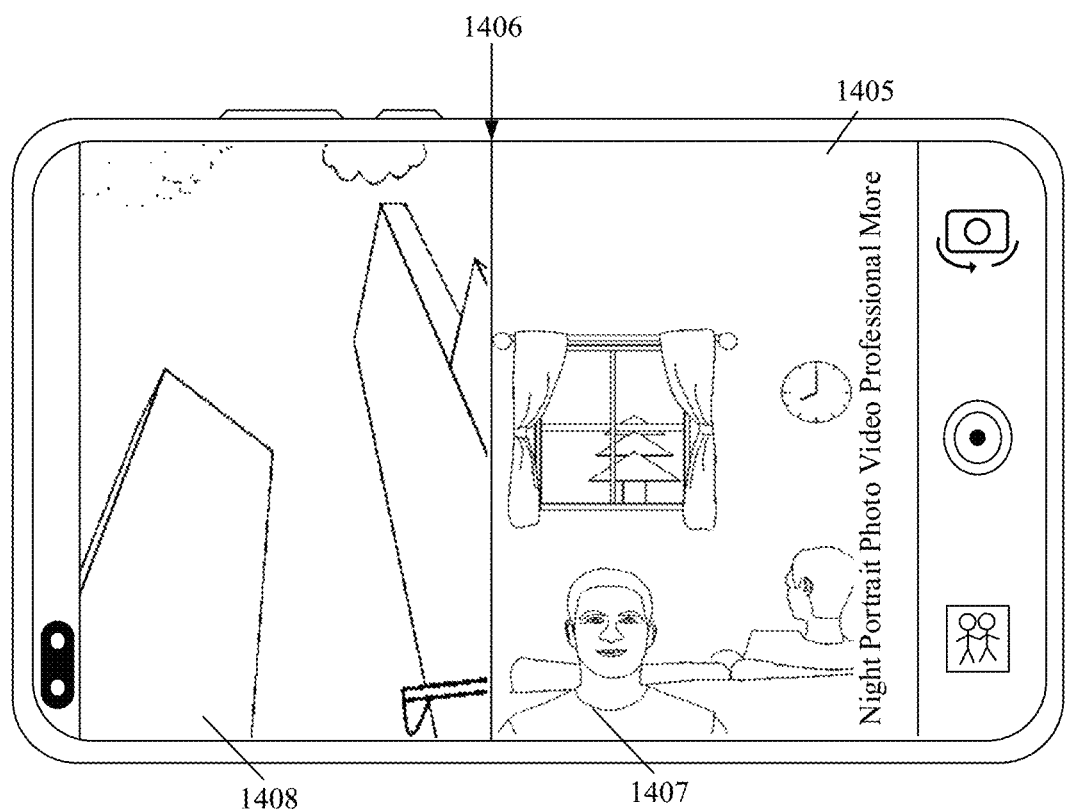

Example 2: In response to the end event of the operation b, the mobile phone may display an interface c 1405 shown in FIG. 14B. A display location of the control a at the end of the operation b corresponds to a location 1406 on the interface c 1405. In this case, a second preview image 1407 is displayed on a right side of the location 1406, and a third preview image 1408 is displayed on a left side of the location 1406. That is, the first side is the right side, and the second side is the left side.

Figure 14C:
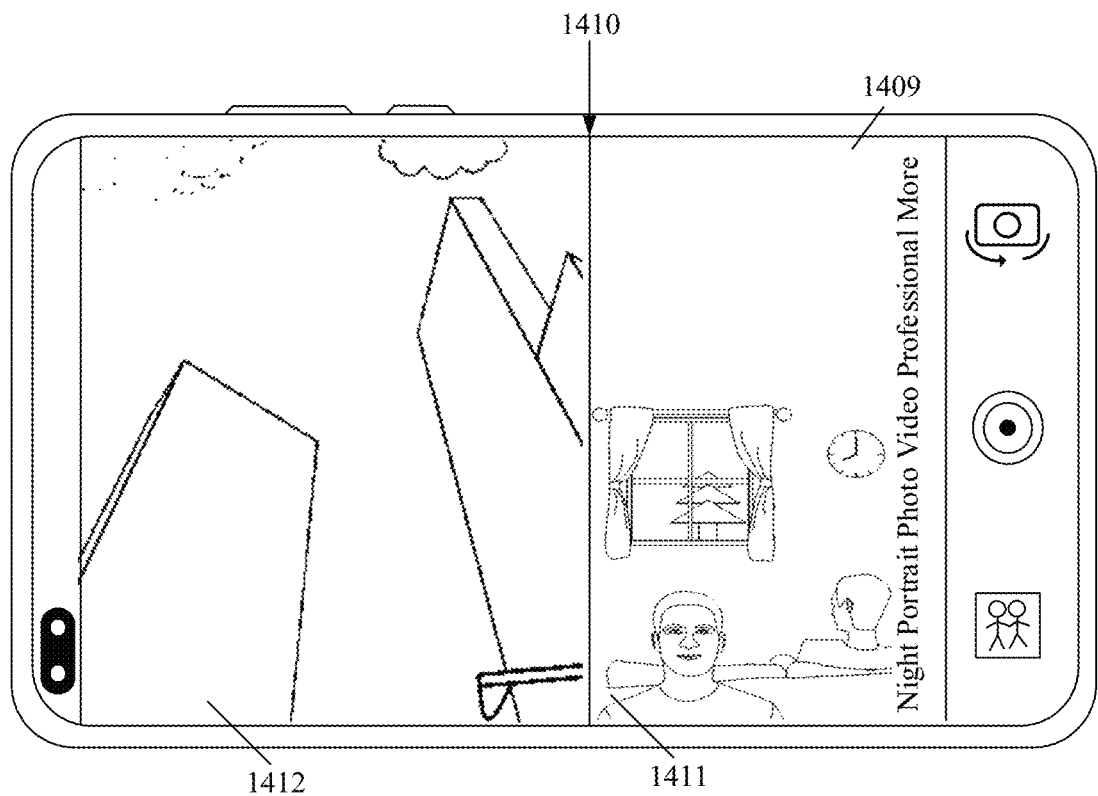

Example 3: In response to the end event of the operation b, the mobile phone may display an interface c 1409 shown in FIG. 14C. A display location of the control a at the end of the operation b corresponds to a location 1410 on the interface c 1409. In this case, a second preview image 1411 is displayed on a right side of the location 1410, and a third preview image 1412 is displayed on a left side of the location 1406. That is, the first side is the right side, and the second side is the left side.

It can be learned from the examples 1 to 3 that, in this embodiment, the single-scene mode may be switched to the front/rear dual-scene mode, and a display size of a preview image captured by a front-facing camera and a preview image captured by a rear-facing camera in the front/rear dual-scene mode may have countless possibilities, and are not fixed sizes. This improves flexibility of display in the front/rear dual-scene mode.

In some other embodiments, the foregoing two manners may be combined. For example, within the first range, the mobile phone may determine, based on the touch location at the end of the operation b, a unique split-screen display size corresponding to the touch location, but not use the fixed first size and second size; and within the second range, the mobile phone may determine, based on the touch location at the end of the operation b, a unique picture-in-picture display size corresponding to the touch location, but not use the fixed third size and fourth size. This can ensure both diversity and appropriateness of switching and display.

Figure 15:
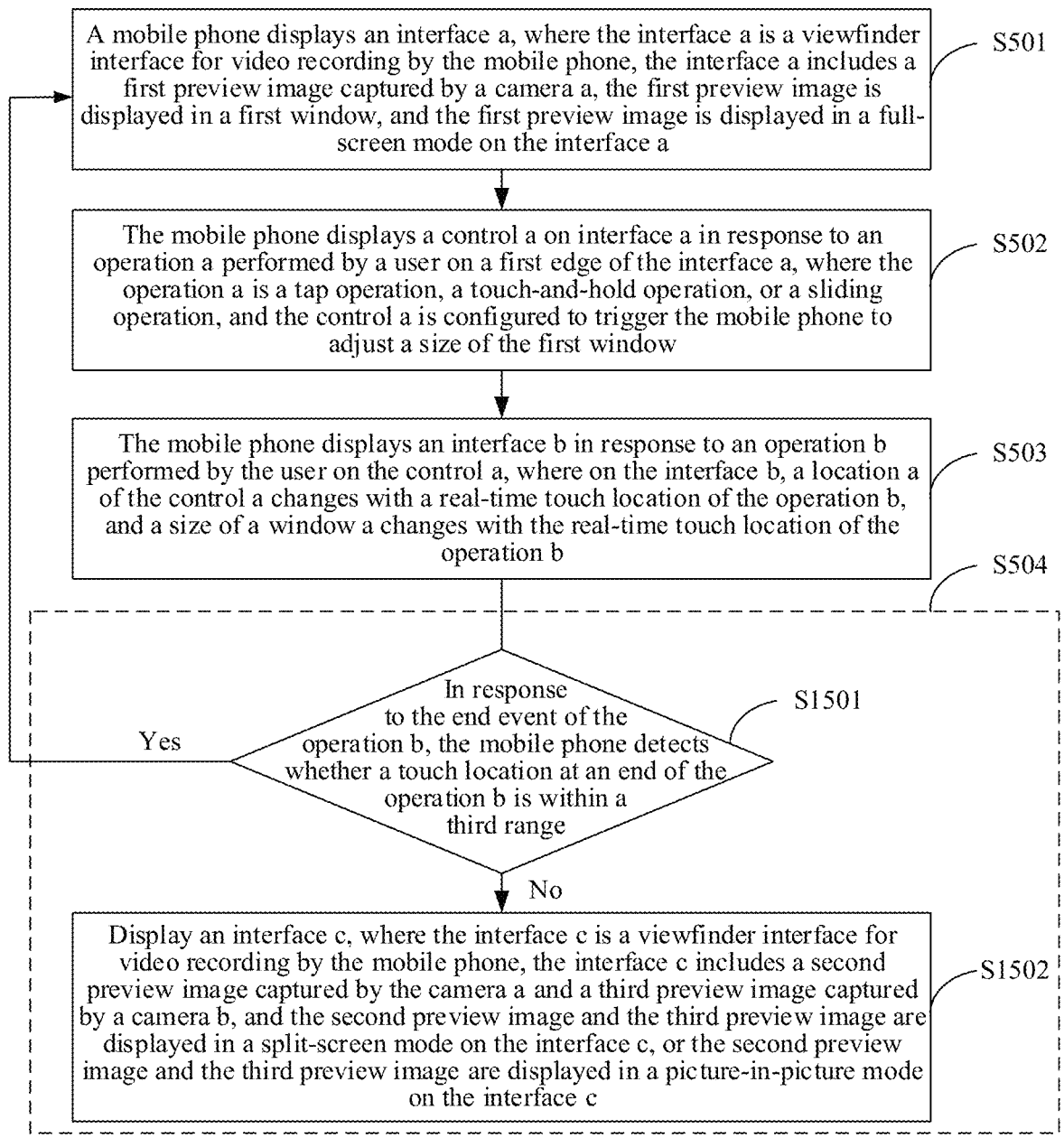
FIG. 15 is a flowchart of another video recording method according to an embodiment of this application.

In some other embodiments, to avoid incorrect switching of a photographing mode, whether there is a switching requirement may be determined first Specifically, as shown in FIG. 15, S504 further includes S1501 and S1502.

S1501: In response to the end event of the operation b, the mobile phone detects whether the touch location at the end of the operation b is within a third range. If yes, step S501 is performed. If no, step S1502 is performed.

The third range is adjacent to the second range.

When the mobile phone is in the landscape state, if the input of the operation b starts from the left edge of the interface a (that is, the first edge is the left edge), the third range is a range, on the display, within which a distance d1 from the left edge is less than a distance value 1. If the input of the operation b starts from the right edge of the interface a (that is, the first edge is the right edge), the third range is a range, on the display, within which a distance d1 from the right edge line is less than a distance value 1.

When the mobile phone is in the portrait state, if the input of the operation b starts from the upper edge of the interface a (that is, the first edge is the upper edge), the third range is a range, on the display, within which a distance d1 from the upper edge is less than a distance value 1. If the input of the operation b starts from the lower edge of the interface a (that is, the first edge is the lower edge), the third range is a range, on the display, within which a distance d1 from the lower edge is less than a distance value 1.

Figure 16:
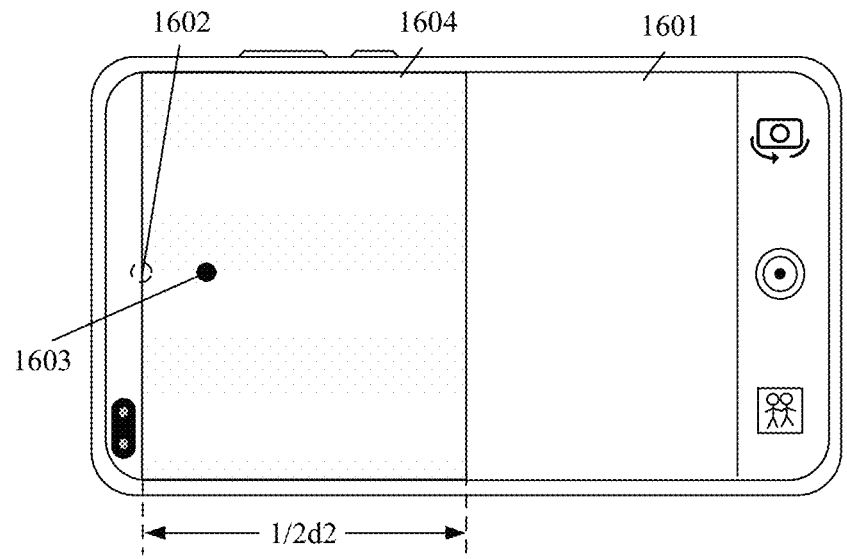
FIG. 16 is a schematic diagram of a location range according to an embodiment of this application.

For example, when the mobile phone is in the landscape state, the distance value 1 is ½d2. That is, if d1<½d2, the touch location is within the third range. For example, on an interface b 1601 shown in FIG. 16, a location 1602 is a touch location at the beginning of the operation b. That is, the input of the operation b starts from the left edge of the interface a. The third range may be a third range 1604 in FIG. 16. A left edge of the third range 1604 coincides with a left edge line of the interface b, and a distance between a right edge of the third range 1604 and the left edge line of the interface b is equal to ½d2. If the touch location at the end of the operation b is a location 1603, the touch location is within the third range 1604.

S1502: Display an interface c, where the interface c is a viewfinder interface for video recording by the mobile phone, the interface c includes a second preview image captured by the camera a and a third preview image captured by a camera b, and the second preview image and the third preview image are displayed in a split-screen mode on the interface c, or the second preview image and the third preview image are displayed in a picture-in-picture mode on the interface c.

S1502 may be implemented in any one of the implementations of displaying the interface c in the scenario 1. Details are not described again herein.

In the manner shown in S1501 and S1502, whether the touch location at the end of the operation b is within the third range is determined before the interface c is displayed. If the touch location is within the third range, it indicates that the operation b is misoperation performed by the user. In this case, the user does not have a switching requirement, and the photographing mode is not switched. The interface c is displayed for switching the photographing mode only when the touch location is not within the third range. In this way, switching of the photographing mode can accurately meet a user requirement.

S501 to S504 are mainly described based on switching before video recording starts. It should be understood that a switching process during video recording is similar, and details are not described herein again. With reference to S501 to S504 and a complete example, the following describes a process of switching a photographing mode during video recording.

Figure 17A:
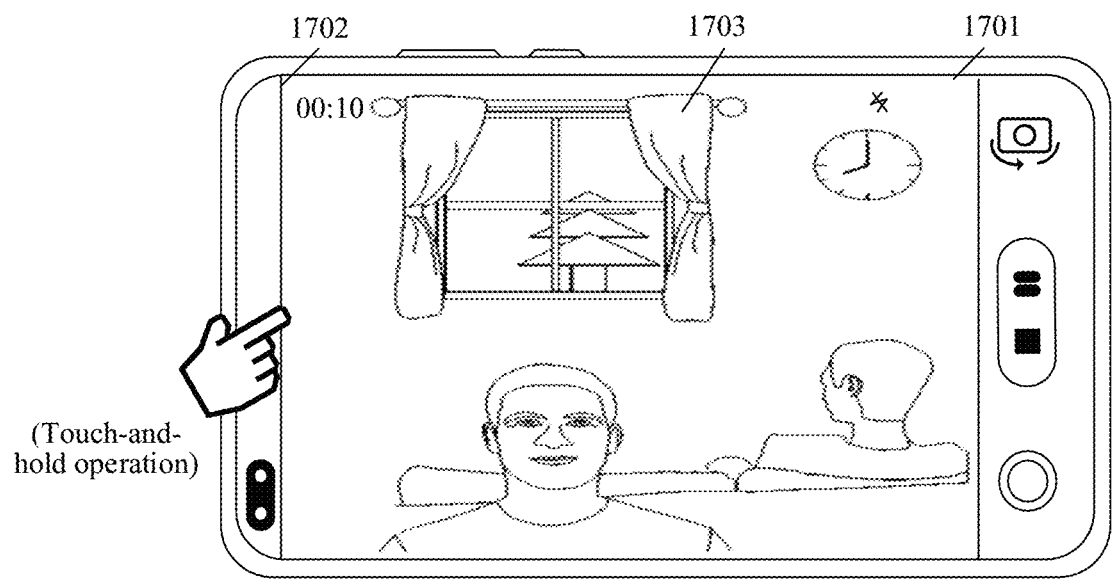
FIG. 17A and FIG. 17B are a schematic diagram of a viewfinder interface for dual-scene video recording in another landscape scenario according to an embodiment of this application.

Corresponding to the S501, the mobile phone may display an interface a 1701 shown in FIG. 17A. The interface a 1701 is a viewfinder interface during video recording by the mobile phone. The interface a 1701 includes a first preview image 1703 captured by the camera a (for example, a front-facing camera). The first preview image 1703 is displayed in a full-screen mode on the interface a 1701.

Figure 17B:
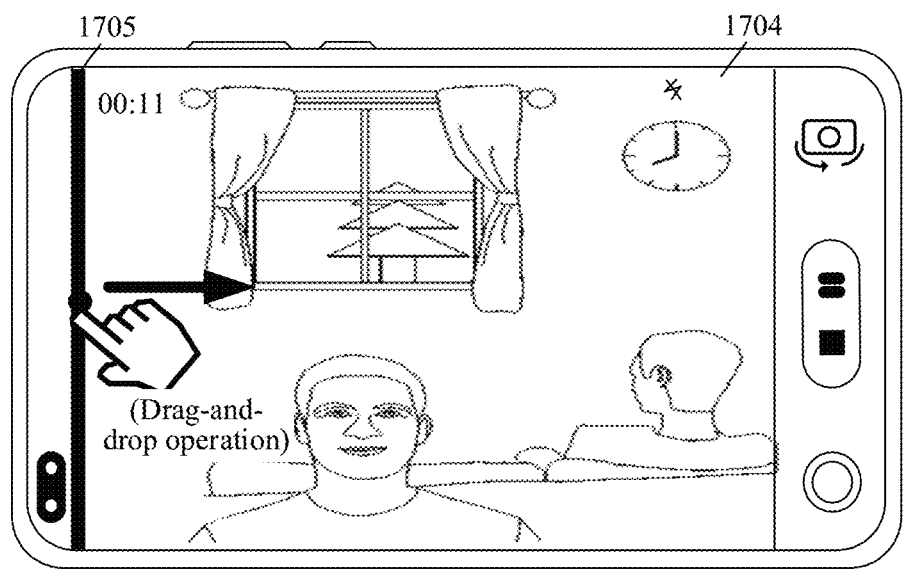

Corresponding to S502, in response to a touch-and-hold operation performed by the user on a left edge line 1702 of the interface a 1701 shown in FIG. 17A, the mobile phone may display an interface a 1704 shown in FIG. 17B. That is, the operation a is a touch-and-hold operation. The interface a 1704 includes a control a 1705. The control a 1705 is configured to trigger the mobile phone to switch a photographing mode.

Figure 18A:
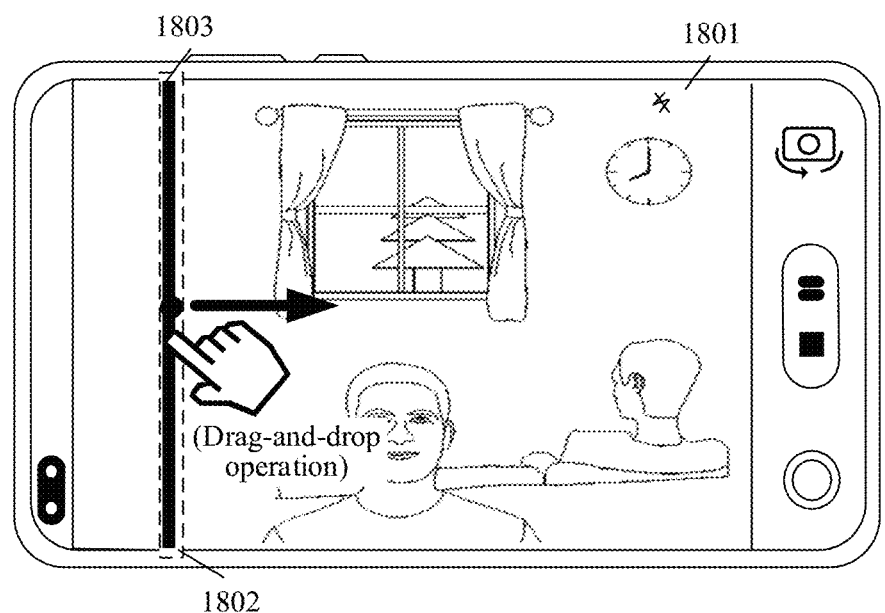
FIG. 18A and FIG. 18B are a schematic diagram of a viewfinder interface for dual-scene video recording in another landscape scenario according to an embodiment of this application.

Corresponding to S503, in response to a drag-and-drop operation performed by the user on the control a 1705 on the interface a 1704 shown in FIG. 17B, the mobile phone may display an interface b 1801 shown in FIG. 18A. That is, the operation b is a drag-and-drop operation. A control a 1803 is displayed at a location a 1802 (in a dashed-line box in the figure) on the interface b 1801. The location a 1802 matches a real-time touch location of the drag-and-drop operation on the interface b 1801.

Figure 18B:
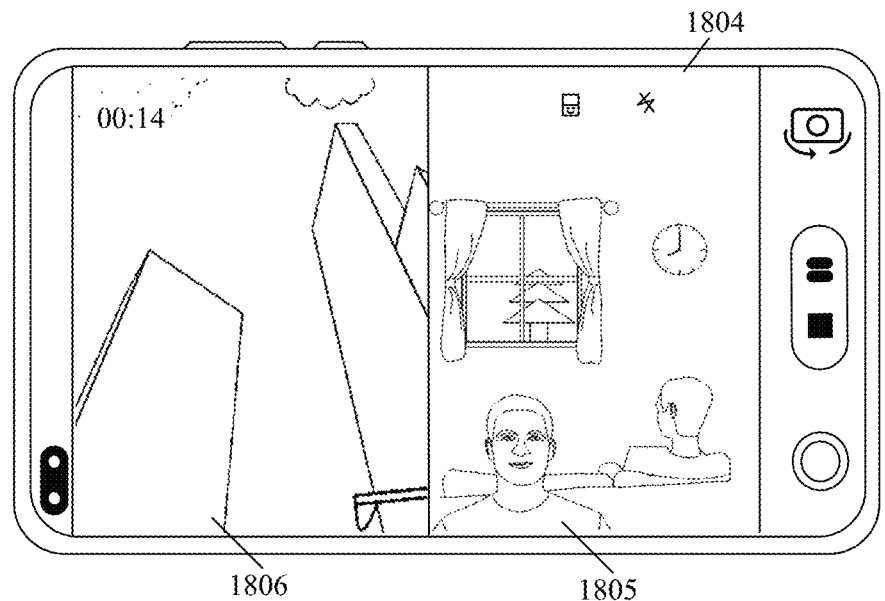

Corresponding to S504, in response to an end event of the drag-and-drop operation, the mobile phone displays an interface c 1804 shown in FIG. 18B. The interface c is a viewfinder interface during video recording by the mobile phone. The interface c 1804 includes a second preview image 1805 captured by the camera a (for example, a front-facing camera) and a third preview image 1806 captured by the camera b (for example, the rear-facing primary camera). The second preview image 1805 and the third preview image 1806 are displayed in a split-screen mode on the interface c 1804.

It should be noted that, different from the switching before video recording starts, in the switching during video recording, interface changes in a transition process are included in a final video. For example, an interface 1801 shown in FIG. 18A is included in the final video. In some embodiments, to ensure coherence of a video, transition motion effect may be added at a corresponding location in the transition process during formation of a video file. For example, blurring motion effect is added. The blurring motion effect is added, so that the transition process can be blurred, and the transition process can be better connected to video recording processes before and after the switching. Alternatively, if duration of the transition process exceeds preset duration a, the mobile phone may compress the duration of the transition process to weaken an influence of the transition process in the final video.

To sum up, in the video recording method in this embodiment of this application, before video recording starts or during video recording, the mobile phone may display the control a in response to the operation a (for example, a touch-and-hold operation) performed by the user on a viewfinder interface in a single-scene mode, to trigger the mobile phone to switch a photographing mode. In this way, no control that is always displayed needs to be set for the user to trigger switching of a photographing mode, so that interface elements are simplified.

Then the mobile phone may switch to a front/rear dual-scene mode or a picture-in-picture dual-scene mode in response to the operation b (for example, a drag-and-drop operation) performed by the user on the control a. In this way, the single-scene mode can be switched to the front/rear dual-scene mode or the picture-in-picture mode only through the operation a and the operation b. Therefore, the photographing mode can be conveniently switched.

Scenario 2: A current viewfinder interface is a viewfinder interface in a front/rear dual-scene (or rear/rear dual-scene) mode. In the scenario 2, the viewfinder interface in the front/rear dual-scene (or the rear/rear dual-scene) mode is also referred to as an interface a.

Figure 19A:
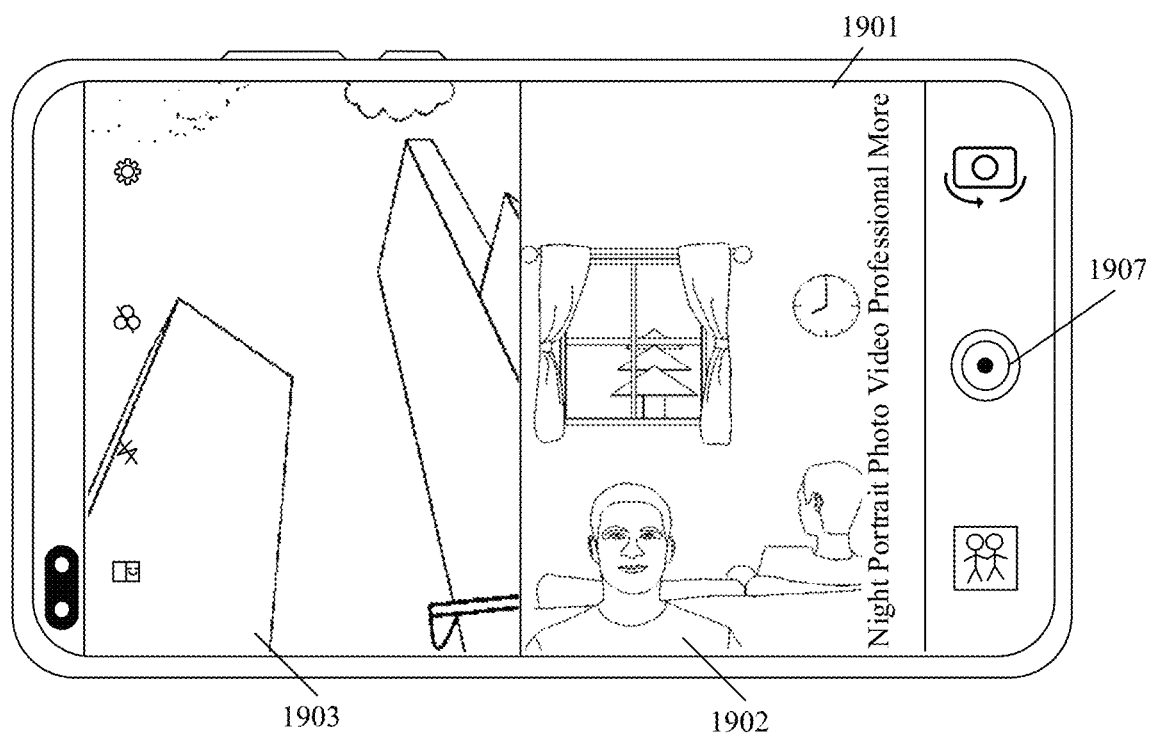
FIG. 19A and FIG. 19B are a schematic diagram of a viewfinder interface for dual-scene video recording in another landscape scenario according to an embodiment of this application.

For example, the interface a is an interface a 1901 shown in FIG. 19A. The interface a 1901 includes a first preview image 1902 captured by a camera a and a second preview image 1903 captured by a camera b. Assuming that the camera a is a front-facing camera and the camera b is a rear-facing camera, the interface a 1901 is a viewfinder interface in a front/rear dual-scene mode.

Figure 19B:
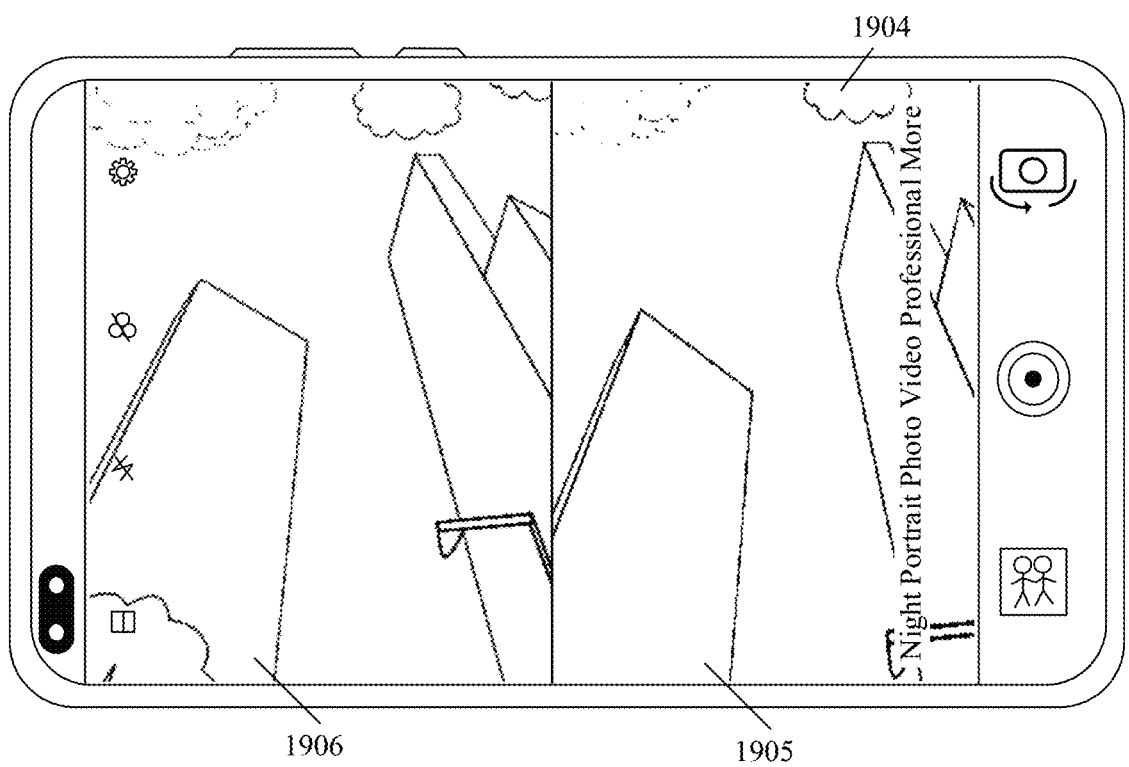

For another example, the interface a is an interface a 1904 shown in FIG. 19B. The interface a 1904 includes a first preview image 1905 captured by a camera a and a second preview image 1906 captured by a camera b. Assuming that the camera a is a rear-facing telephoto camera and the camera b is a rear-facing wide-angle camera, the interface a 1904 is a viewfinder interface in a rear/rear dual-scene mode.

In the following embodiments, an example in which the interface a is a viewfinder interface in a front/rear dual-scene mode is mainly used for description. It should be noted that the viewfinder interface in the front/rear (or rear/rear) mode may be obtained through switching in the scenario 1, or may be obtained through switching in another manner, for example, is obtained through switching from a picture-in-picture dual-scene mode. This is not specifically limited in this embodiment of this application.

Figure 20:
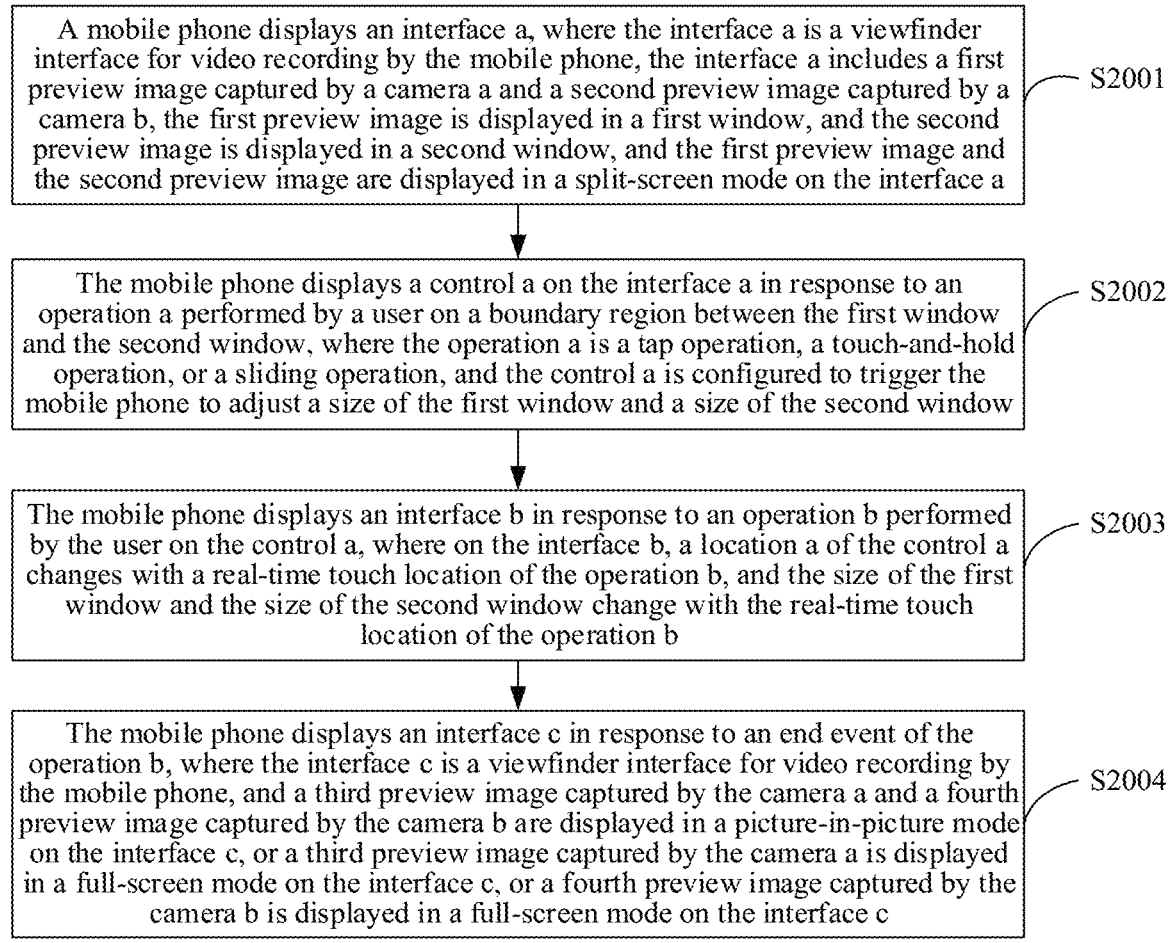
FIG. 20 is a flowchart of another video recording method according to an embodiment of this application.

An embodiment of this application provides a video recording method, applied to a mobile phone including a plurality of cameras. In addition, the mobile phone may provide a dual-scene video recording function. As shown in FIG. 20, the method includes S2001 to S2004.

S2001: The mobile phone displays an interface a, where the interface a is a viewfinder interface for video recording by the mobile phone, the interface a includes a first preview image captured by a camera a and a second preview image captured by a camera b, the first preview image is displayed in a first window, and the second preview image is displayed in a second window, and the first preview image and the second preview image are displayed in a split-screen mode on the interface a.

In the scenario 2, if the interface a is obtained through switching in the scenario 1, the interface a may also be referred to as a third interface, the camera a may also be referred to as a first camera, the camera b may also be referred to as a second camera, the first preview image may also be referred to as a second image, and the second preview image may also be referred to as a third image.

Figure 21:
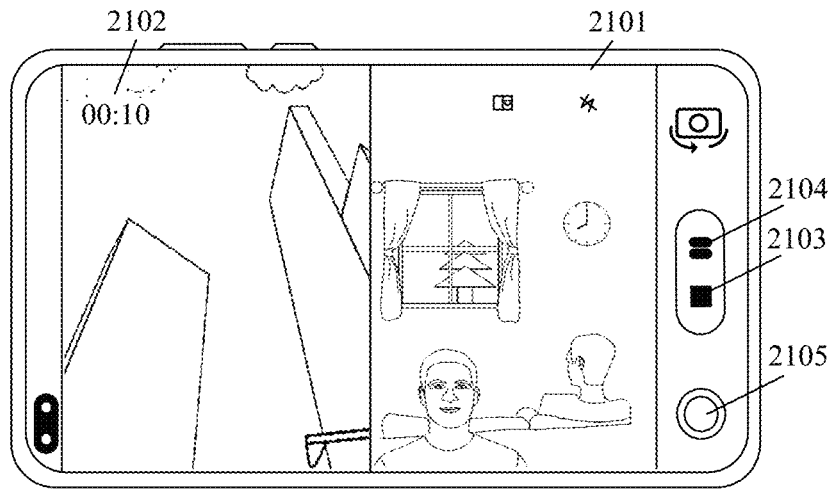
FIG. 21 is a schematic diagram of a viewfinder interface for dual-scene video recording in another landscape scenario according to an embodiment of this application.

Similar to that in the scenario 1, the interface a in the scenario 2 may be a viewfinder interface for video recording before the mobile phone starts video recording. For example, the interface a 1901 shown in FIG. 19A includes a control 1907 for starting video recording. In this case, the interface a 1901 is a viewfinder interface for video recording before video recording starts. Alternatively, the interface a may be a viewfinder interface during video recording. For example, an interface a 2101 shown in FIG. 21 includes icons indicating that video recording is ongoing, for example, a video recording timer 2102, a control 2103 for stopping video recording, a control 2104 for pausing video recording, and a screenshot control 2105. In this case, the interface a 2101 is a viewfinder interface during video recording.

First, it should be noted herein that, in the scenario 2, a switching process is described mainly by using an example in which the interface a is a viewfinder interface for video recording before the mobile phone starts video recording.

The interface a includes a first preview image captured by a camera a and a second preview image captured by a camera b. The camera a and the camera b may be any two different cameras of the plurality of cameras included in the mobile phone. For example, the camera a and the camera b are any two of a front-facing camera, a rear-facing primary camera, a rear-facing telephoto camera, a rear-facing wide-angle camera, and a rear-facing ultra-wide-angle camera.

S2002: The mobile phone displays a control a on the interface a in response to an operation a performed by a user on a boundary region between the first window and the second window on the interface a, where the operation a is a tap operation, a touch-and-hold operation, or a sliding operation, and the control a is configured to trigger the mobile phone to adjust a size of the first window and a size of the second window.

In the scenario 2, the operation a may also be referred to as a second operation, and the control a may also be referred to as a second control.

Before S502, the mobile phone may receive the operation a performed by the user on the boundary region between the first window and the second window on the interface a. For the operation a, refer to related descriptions in S502 in the scenario 1. Details are not described again herein.

In the following embodiments of the scenario 2, an example in which the operation b is a touch-and-hold operation is mainly used for description.

Figure 22A:
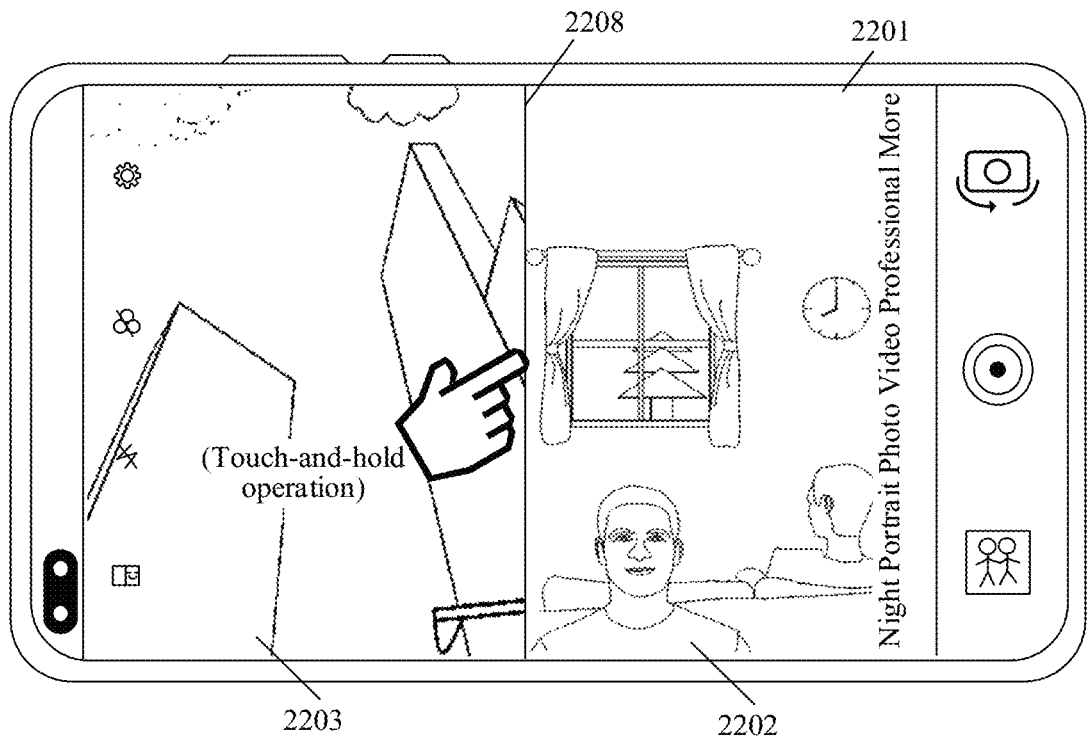
FIG. 22A and FIG. 22B are a schematic diagram of a viewfinder interface for dual-scene video recording in another landscape scenario according to an embodiment of this application.
Figure 22B:
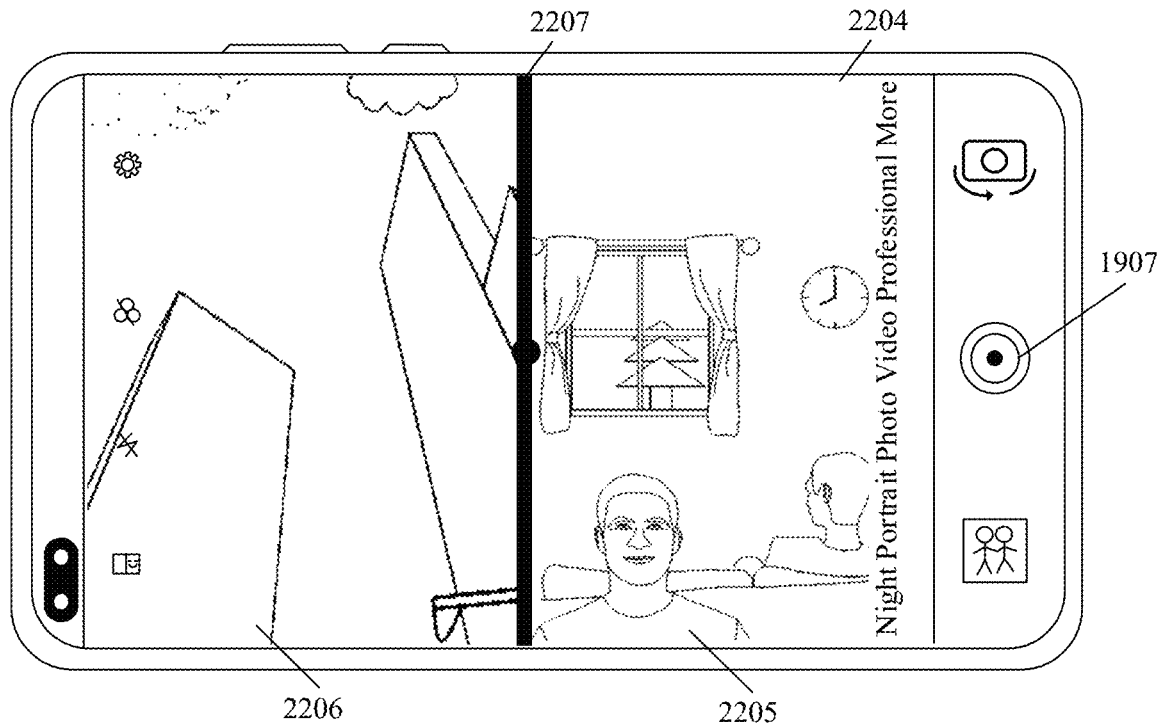

For example, in response to a touch-and-hold operation performed by the user on a connection line between a first preview image 2202 and a second preview image 2203 on an interface a 2201 shown in FIG. 22A, the mobile phone may display an interface a 2204 shown in FIG. 22B. The interface a 2204 includes a first preview image 2205, a second preview image 2206, and a control a 2207. The control a 2207 is displayed in a boundary region between the first preview image 2205 and the second preview image 2206. It should be understood that the first preview image is displayed in a first window, and the second preview image is displayed in a second window. In this case, the connection line between the first preview image and the second preview image may also be considered as a boundary region between the first window and the second window.

Figure 23:
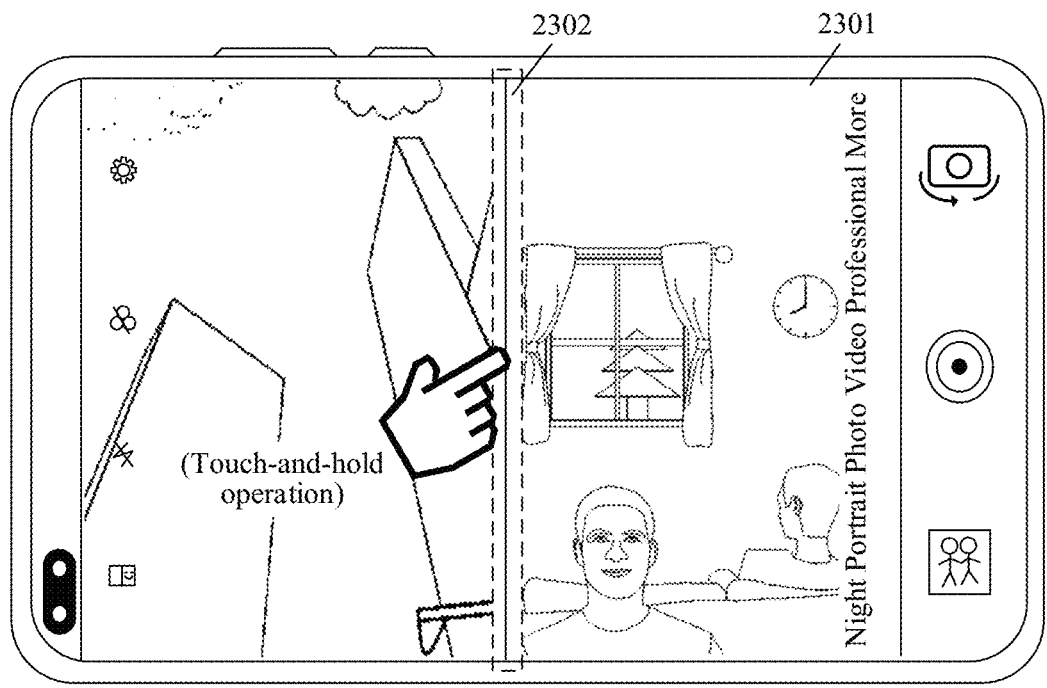
FIG. 23 is a schematic diagram of a viewfinder interface for dual-scene video recording in another landscape scenario according to an embodiment of this application.

The boundary region between the first window and the second window may be boundary line between the first window and the second window. For example, the boundary region is a boundary line 2208 on the interface a 2201 shown in FIG. 22A. Alternatively, the boundary region between the first window and the second window may be a preset region including a boundary line between the first window and the second window. For example, the boundary region is a boundary region 2302 on an interface a 2301 shown in FIG. 23.

S2003: The mobile phone displays an interface b in response to an operation b performed by the user on the control a, where on the interface b, a location a of the control a changes with a real-time touch location of the operation b, and the size of the first window and the size of the second window change with the real-time touch location of the operation b.

The operation b may be a drag-and-drop operation. In the scenario 2, the drag-and-drop operation may also be referred to as a second drag-and-drop operation, the interface b may also be referred to as a fourth interface, and the location a may also be referred to as a second location.

Before S2003, the mobile phone may receive the operation b performed by the user on the control a. For the operation b, refer to related descriptions in S503 in the scenario 1. Details are not described again herein.

Figure 24A:
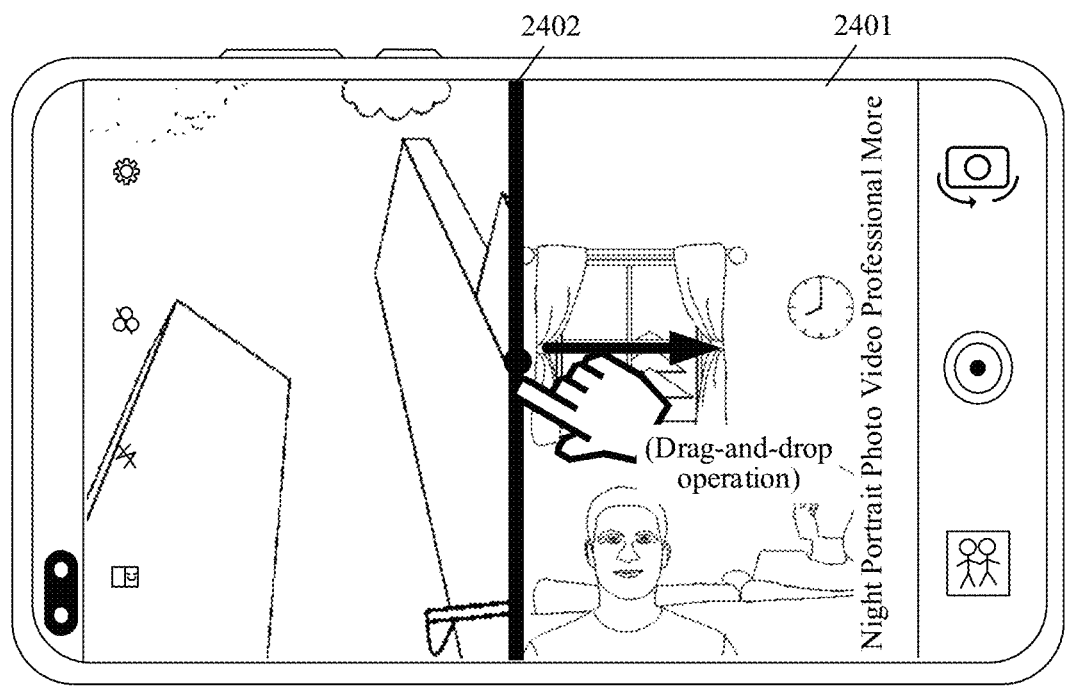
FIG. 24A and FIG. 24B are a schematic diagram of a viewfinder interface for dual-scene video recording in another landscape scenario according to an embodiment of this application.

For example, the mobile phone may receive a touch-and-hold operation performed by the user on a control a 2402 on an interface a 2401 shown in FIG. 24A. In response to the drag-and-drop operation performed by the user on the control a 2402, the mobile phone may display an interface b 2403 shown in FIG. 24B. The interface b 2403 includes a control a 2404. The control a 2404 is displayed at a location a 2405 (in a dashed-line box in the figure) on the interface b 2403. The location a 2405 gradually moves to the right as the drag-and-drop operation moves to the right.

To simulate a switching process when the location a of the control a is continuously changing, a first side of the control a on the interface b further includes a transition image a, and a second side of the control a further includes a transition image b. Correspondingly, a display size of the transition image a and a display size of the transition image b correspondingly change with a change of the location a of the control a. The transition image a is displayed in the first window, and the transition image b is displayed in second window. In the scenario 2, the transition image a may also be referred to as a thirteenth image, and the transition image b may also be referred to as a fourteenth image.

Figure 24B:
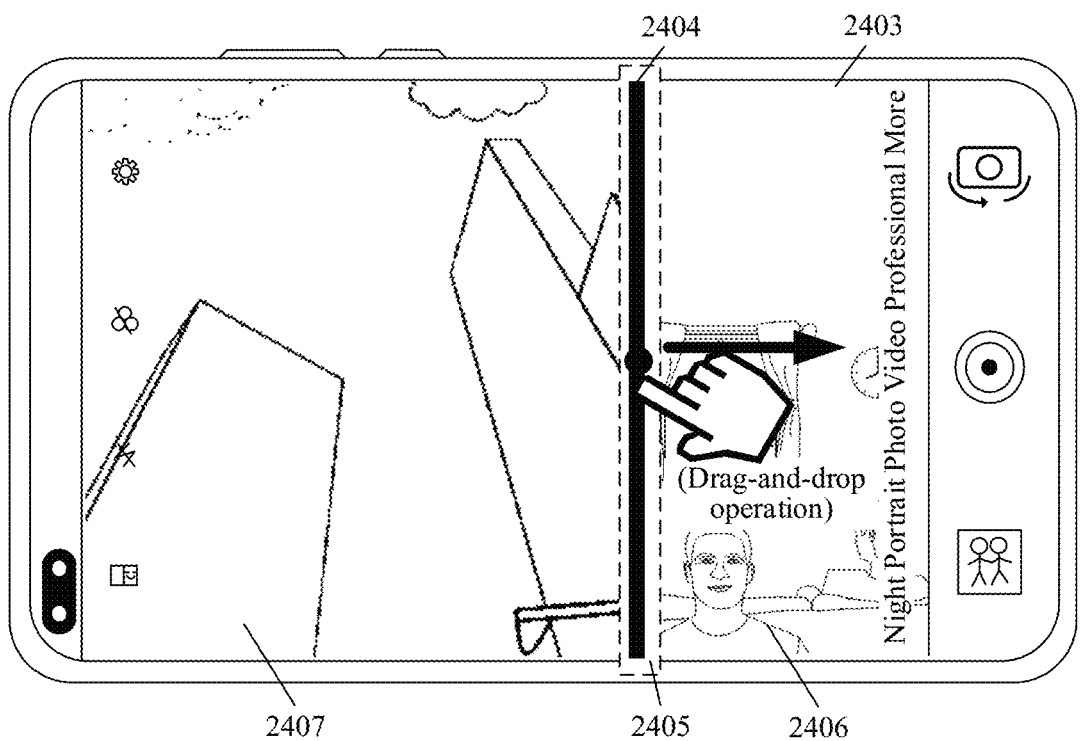

For example, the interface b 2403 shown in FIG. 24B includes the control a 2404, and a right side of the control a 2404 further includes a transition image a 2406, that is, the first side is the right side. A left side of the control a 2404 further includes a transition image b 2407, that is, the second side is the left side. In addition, as the location a of the control a continuously moves to the right, a display size of the transition image a 2406 continuously decreases, and a size of the transition image b 2407 continuously increases.

It should be noted that, in a transition process, the transition image a is displayed in the first window, the transition image b is displayed in the second window, a change of the display size of the transition image a may also be considered as a change of the size of the first window, and a change of the display size of the transition image b may also be considered as a change of the size of the second window.

The transition image a and the transition image b may be in one of the following forms.

Form 1: The transition image a is the first preview image captured by the camera a in real time, and the transition image b is the second preview image captured by the camera b in real time. In this case, a real-time view is displayed in the transition process, thereby ensuring authenticity of content on the viewfinder interface.

For example, the transition image a 2406 on the interface b 2403 shown in FIG. 24B is the first preview image captured by the camera a in real time, and the transition image b 2407 is the second preview image captured by the camera b in real time.

Form 2: The transition image a is at least one frame of preview image captured by the camera a within a period of time before and after the user starts to input the operation b. The transition image b is at least one frame of preview image captured by the camera b within a period of time before and after the user starts to input the operation b. That is, both the transition image a and the transition image b are non-real-time preview images captured by the camera. In a specific implementation, in response to the operation b performed by the user on the control a, the mobile phone may obtain a preview image captured by the camera a at a moment at which the user starts to input the operation b. Then, in a process in which the user continuously inputs the operation b, the preview image captured by the camera a at the moment at which the user starts to input the operation b is zoomed to adapt to a display size of the transition image a at a current moment. Similarly, in response to the operation b performed by the user on the control a, the mobile phone may obtain a preview image captured by the camera b at a moment at which the user starts to input the operation b. Then, in a process in which the user continuously inputs the operation b, the preview image captured by the camera b at the moment at which the user starts to input the operation b is zoomed to adapt to a display size of the transition image b at a current moment.

In the form 2, historical preview images captured by the camera a and the camera b are used as transition images. This can ensure, to some extent, that a real view is displayed on an interface in the transition process. In addition, a preview image does not need to be captured in real time in the transition process, so that power consumption of the mobile phone can be reduced.

For example, the transition image a 2406 on the interface b 2403 shown in FIG. 24B is a preview image captured by the camera a at a moment at which the user starts to input the drag-and-drop operation, and the transition image b 2407 is a preview image captured by the camera b at the moment at which the user starts to input the drag-and-drop operation.

Form 3: The transition image a and the transition image b may be blurred images. For example, the transition image a and the transition image b may be preset blurred images, or images obtained by blurring the preview image in the form 1 or the form 2. In this way, the switching transition process can be vividly simulated through blurred transition effect.

S2004: The mobile phone displays an interface c in response to an end event of the operation b, where the interface c is a viewfinder interface for video recording by the mobile phone, a third preview image captured by the camera a and a fourth preview image captured by the camera b are displayed in a picture-in-picture mode on the interface c, or a third preview image captured by the camera a is displayed in a full-screen mode on the interface c, or a fourth preview image captured by the camera b is displayed in a full-screen mode on the interface c.

In the scenario 2, the interface c may also be referred to as a fifth interface, the third preview image may also be referred to as a fourth image, and the fourth preview image may also be referred to as a fifth image.

Before S2004, the mobile phone may detect an end of b. When the operation b is stopped and the finger or the stylus leaves a display, the end of the operation b is detected, that is, the end event of the operation b is triggered.

The mobile phone displays the interface c after receiving the end event. It should be understood that, when the interface a is a viewfinder interface for video recording before video recording starts, the interface c is also a viewfinder interface for video recording before video recording starts. When the interface a is a viewfinder interface during video recording, the interface c is also a viewfinder interface during video recording.

Specifically, the mobile phone may display the third preview image and/or the fourth preview image on the interface c based on a touch location at the end of the operation b, so that a display size and a display mode of the third preview image and/or a display size and a display mode of the fourth preview image on the interface c match the touch location at the end of the operation b, to meet a switching requirement of the user.

Similar to the scenario 1, the following several switching manners are also mainly provided in the scenario 2.

Figure 25:
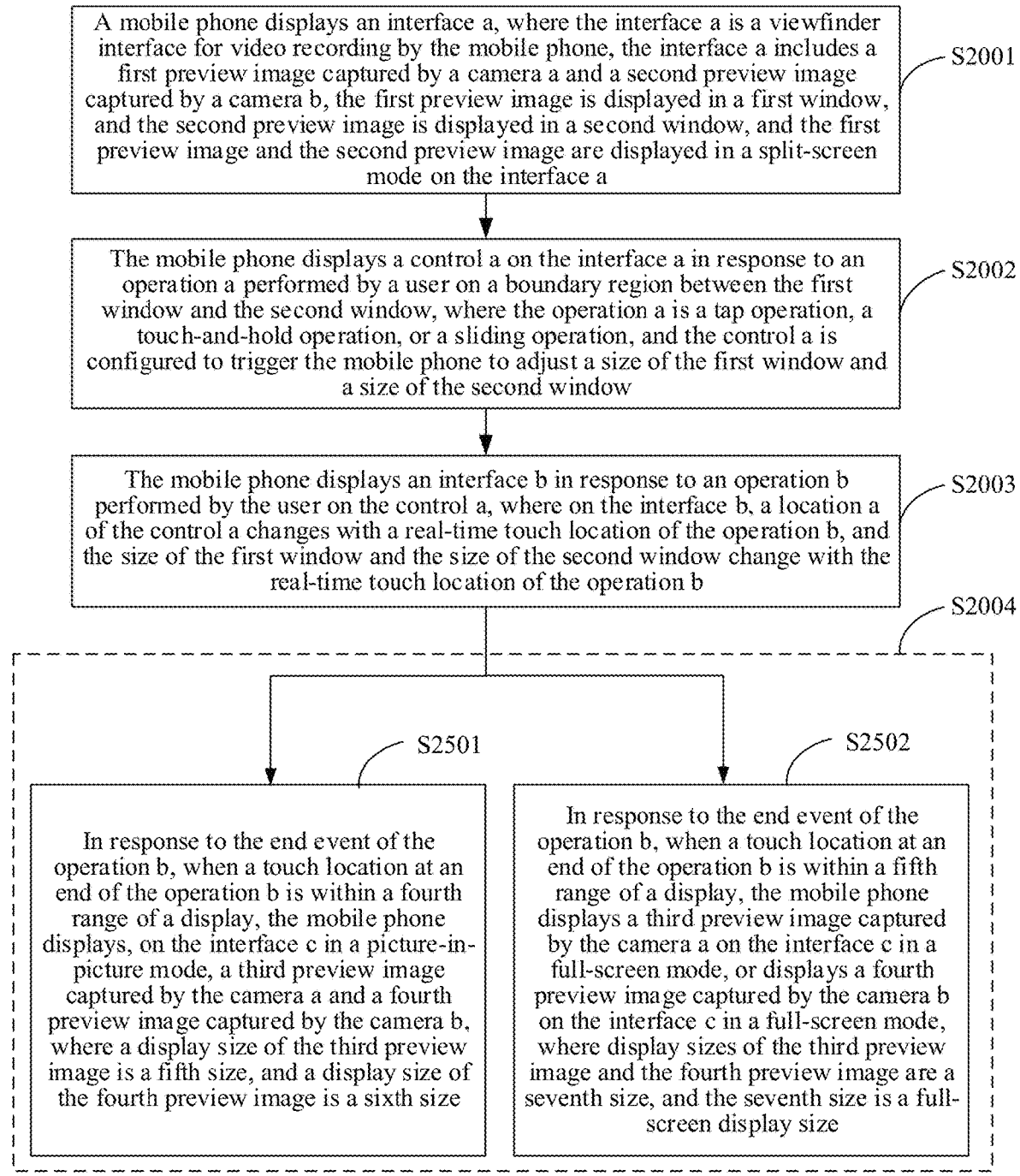
FIG. 25 is a flowchart of another video recording method according to an embodiment of this application.

In some embodiments, the mobile phone may display the third preview image and/or the fourth preview image on the interface c in different layout manners and at a fixed size in the corresponding layout manner based on different ranges to which the touch location at the end of the operation b belongs. Specifically, as shown in FIG. 25, S2004 includes S2501 and S2502.

S2501: In response to the end event of the operation b, when the touch location at the end of the operation b is within a fourth range of the display, the mobile phone displays, on the interface c in a picture-in-picture mode, the third preview image captured by the camera a and the fourth preview image captured by the camera b, where a display size of the third preview image is a fifth size, and a display size of the fourth preview image is a sixth size.

It should be understood that the third preview image is displayed in the first window, and therefore the fifth size may also be understood as the size of the first window. Similarly, the fourth preview image is displayed in the second window, and therefore the sixth size may also be understood as the size of the second window.

Before S2501, the mobile phone may determine whether the touch location at the end of the operation b is within the fourth range.

When the mobile phone is in a landscape state, the fourth range includes a range, on the display, within which a distance d1 from a left edge or a right edge of the display is greater than or equal to a distance value 1 and less than a distance value 2. Similarly, usually, the distance value 1 and the distance value 2 are related to a distance d2 between the left edge and the right edge of the display. The distance value 1 is a product of a ratio 1 and d2, and the distance value 2 is a product of a ratio 2 and d2. In this way, photographing mode switching timing can be related to a size of the interface b, thereby improving appropriateness of photographing mode switching.

When the mobile phone is in a portrait state, the fourth range includes a range, on the display, within which a distance d1 from an upper edge line or a lower edge line of the display is greater than or equal to a distance value 1 and less than a distance value 2. Similarly, usually, the distance value 1 and the distance value 2 are related to a distance d2 between the left edge line and the right edge line of the display. The distance value 1 is a product of a ratio 1 and d2, and the distance value 2 is a product of a ratio 2 and d2. In this way, photographing mode switching timing can be related to a size of the interface b, thereby improving appropriateness of photographing mode switching.

It should be understood that the operation b may not always move in one direction. Therefore, the fourth range usually includes two parts. This avoids missing a switching requirement of the user.

It should be understood that all the foregoing distances are vertical distances. In the scenario 2, the distance value 1 may also be referred to as a third distance value, and the distance value 2 may also be referred to as a fourth distance value.

For example, when the mobile phone is in the landscape state, the ratio 1 is $1/10$, and the ratio 2 is $1/3$. That is, if $1/10 d2 \le d1 < 1/3 d2$, the third preview image and the fourth preview image are displayed in a picture-in-picture mode on the interface c. The fourth range may include a fourth range 2601 and a fourth range 2602 in FIG. 26. A distance between a right edge of the fourth range 2601 and a right edge line of the interface b is equal to $1/10 d2$, and a distance between a left edge of the fourth range 2601 and the right edge line of the interface b is equal to $1/3 d2$. A distance between a left edge of the fourth range 2602 and a left edge line of the interface b is equal to $1/10 d2$, and a distance between a right edge of the fourth range 2602 and the left edge line of the interface b is equal to $1/3 d2$. If the touch location at the end of the operation b is within the fourth range 2601 or the fourth range 2602, the touch location at the end of the operation b is within the fourth range. In this case, the third preview image captured by the camera a and the fourth preview image captured by the camera b are displayed in a picture-in-picture mode on the interface c. It should be understood that an edge of the interface b may be approximately considered to be the left edge of the display. Especially in a full-screen mobile phone, an edge of an interface is an edge of a screen.

On the interface c, the third preview image and the fourth preview image are displayed in a picture-in-picture mode. In addition, on the interface c, one of the third preview image and the fourth preview image is displayed in a small window in the picture-in-picture mode, and the other is displayed in a large window in the picture-in-picture mode.

Specifically, when the mobile phone is in the landscape state, if the touch location at the end of the operation b is near the left edge of the interface b, a preview image near a left edge of the interface a is displayed in the small window on the interface c, and a preview image away from the left edge of interface a is displayed in the large window on the interface c. If the touch location at the end of the operation b is near the right edge of the interface b, a preview image near a right edge of the interface a is displayed in the small window on the interface c, and a preview image away from the right edge of interface a is displayed in the large window on the interface c.

When the mobile phone is in the portrait state, if the touch location at the end of the operation b is near the upper edge of the interface b, a preview image near an upper edge of the interface a is displayed in the small window on the interface c, and a preview image away from the upper edge of interface a is displayed in the large window on the interface c. If the touch location at the end of the operation b is near the lower edge of the interface b, a preview image near a lower edge of the interface a is displayed in the small window on the interface c, and a preview image away from the lower edge of interface a is displayed in the large window on the interface c.

Figure 26:
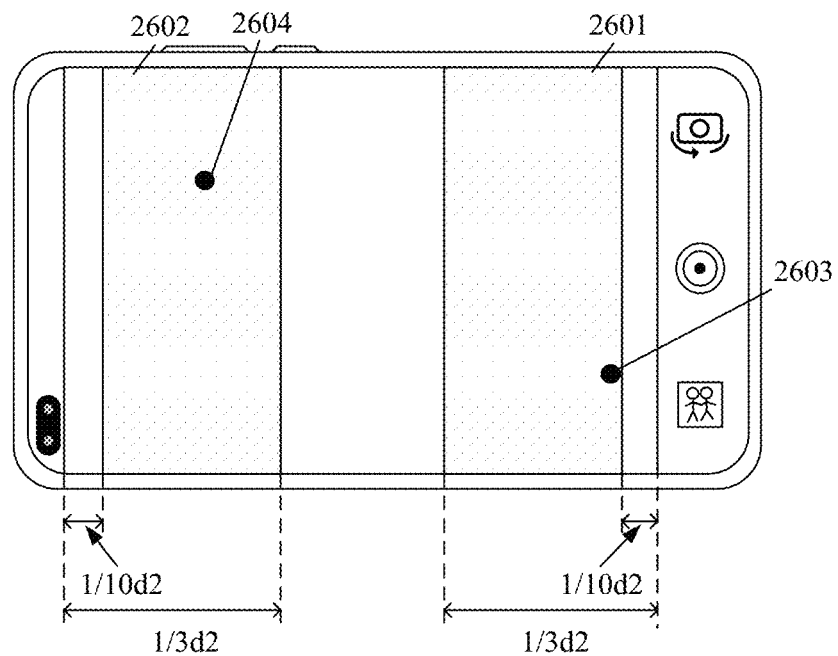
FIG. 26 is a schematic diagram of another location range according to an embodiment of this application.

For example, when the mobile phone is in the landscape state, the touch location at the end of the operation b is a location 2603 in FIG. 26. The location 2603 is within the fourth range 2601, and the location 2603 is near the right edge of the interface b. It is assumed that the interface a is the interface a 2201 shown in FIG. 22A. On the interface a 2201, the third preview image 2202 is near a right edge of the interface a 2201, and the third preview image 2203 is near a left edge of the interface a 2201. In this case, after switching is completed, the third preview image should be displayed in the small window on the interface c, and the fourth preview image should be displayed in the large window on the interface c. Correspondingly, in response to the end event of the operation b, the mobile phone may display an interface c 1304 shown in FIG. 13B. On the interface c 1304, a third preview image 1305 is displayed in a small window 1307 on the interface c 1304, and a fourth preview image 1306 is displayed in a large window 1308 on the interface c 1304. In this case, the first window is the small window 1307, and the second window is the large window 1308.

Figure 27:
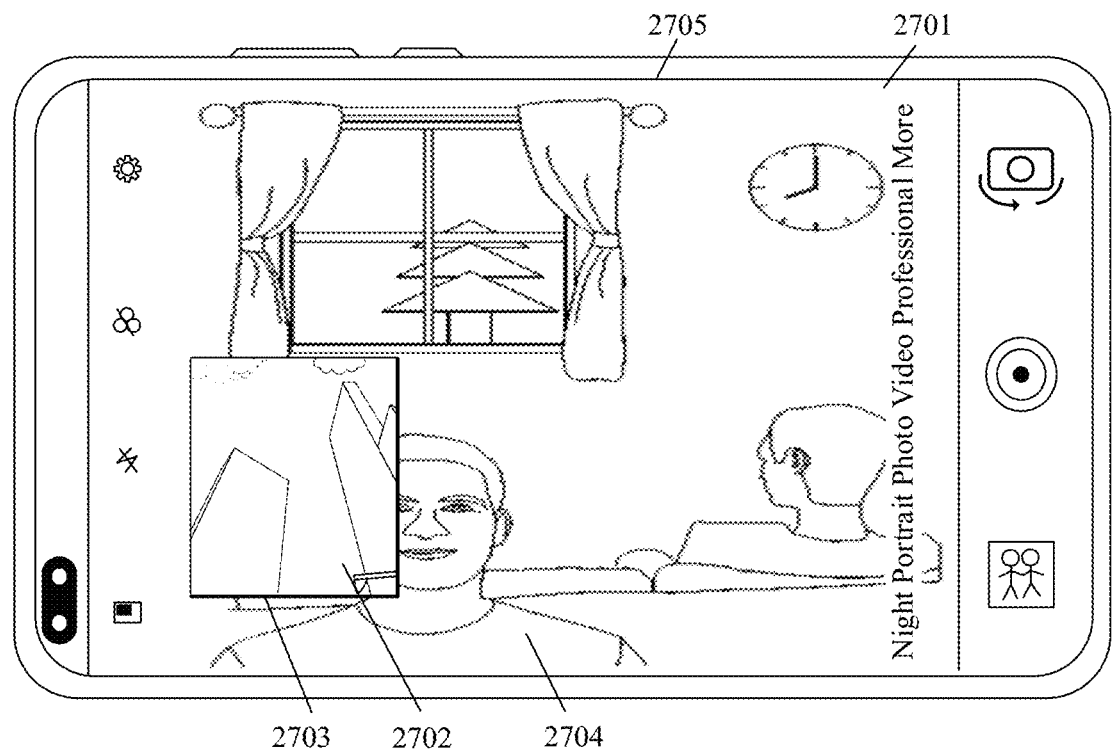
FIG. 27 is a schematic diagram of a viewfinder interface for dual-scene video recording in another landscape scenario according to an embodiment of this application.

For example, when the mobile phone is in the landscape state, the touch location at the end of the operation b is a location 2604 in FIG. 26. The location 2604 is within the fourth range 2602, and the location 2604 is near the left edge of the interface b. It is assumed that the interface a is the interface a 2201 shown in FIG. 22A. On the interface a 2201, the third preview image 2202 is near a right edge of the interface a 2201, and the third preview image 2203 is near a left edge of the interface a 2201. In this case, after switching is completed, the third preview image should be displayed in the small window on the interface c, and the fourth preview image should be displayed in the large window on the interface c. Correspondingly, in response to the end event of the operation b, the mobile phone may display an interface c 2701 shown in FIG. 27. On the interface c 2701, a fourth preview image 2702 is displayed in a small window 2703 on the interface c 2701, and a third preview image 2704 is displayed in a large window 2705 on the interface c 2701. In this case, the first window is the large window 2705, and the second window is the small window 2703.

Similarly, the fifth size and the sixth size are prestored on the mobile phone (for example, in a camera application). For use of the fifth size and the sixth size, refer to the use of the third size and the fourth size in the case 1. The only difference lies in that the third size and the fourth size in the case 1 are used within the second range, and the fifth size and the sixth size in the case 2 are used within the fourth range. Details are not described herein again.

S2502: In response to the end event of the operation b, when the touch location at the end of the operation b is within a fifth range of the display, the mobile phone displays the third preview image captured by the camera a on the interface c in a full-screen mode, or displays the fourth preview image captured by the camera b on the interface c in a full-screen mode, where display sizes of the third preview image and the fourth preview image are a seventh size, and the seventh size is a full-screen display size.

Before S2502, the mobile phone may determine whether the touch location at the end of the operation b is within the fifth range. The fifth range is adjacent to the fourth range.

When the mobile phone is in the landscape state, the fifth range is a range, on the display, within which a distance d1 from the left edge or the right edge of the display is less than a distance value 1. Similarly, the distance value 1 may be a product of a ratio 1 and d2.

When the mobile phone is in the portrait state, the fifth range is a range, on the display, within which a distance d1 from the upper edge or the lower edge of the display is less than a distance value 1. Similarly, the distance value 1 may be a product of a ratio 1 and d2.

Usually, the distance value 1 is close to or equal to 0. That is, when the mobile phone is in the landscape state and the touch location at the end of the operation b is near the left edge or the right edge of the interface b, the mobile phone switches to the full-screen mode for display. When the mobile phone is in the portrait state and the touch location at the end of the operation b is near the upper edge or the lower edge of the interface b, the mobile phone switches to the full-screen mode for display. It should be understood that the operation b may not always move in one direction. Therefore, the fifth range usually includes two parts. This avoids missing a switching requirement of the user.

For example, when the mobile phone is in the landscape state, the ratio 1 is $1/10$. That is, if $d1 < 1/10 \cdot d2$, the third preview image or the fourth preview image is displayed in a full-screen mode on the interface c. The fifth range may include a fifth range 2801 and a fifth range 2802 in FIG. 28. A right edge of the fifth range 2801 is the right edge line of the interface b, and a distance between a left edge of the fifth range 2801 and the right edge line of the interface b is equal to $1/10 \cdot d2$. A left edge of the fifth range 2802 is the left edge line of the interface b, and a distance between a right edge of the fifth range 2802 and the left edge line of the interface b is equal to $1/10 \cdot d2$. If the touch location at the end of the operation b is within the fifth range 2801 or the fifth range 2802, the touch location at the end of the operation b is within the fifth range. In this case, the third preview image captured by the camera a is displayed in a full-screen mode on the interface c, or the fourth preview image captured by the camera b is displayed in a full-screen mode on the interface c.

On the interface c, the third preview image or the fourth preview image is displayed in a full-screen mode, and a full-screen display size is the seventh size. When the mobile phone is in the landscape state, if the touch location at the end of the operation b is near the left edge of the interface b, a preview image near a left edge of the interface a is displayed in a full-screen mode on the interface c. If the touch location at the end of the operation b is near the right edge of the interface b, a preview image near a right edge of the interface a is displayed in a full-screen mode on the interface c.

When the mobile phone is in the portrait state, if the touch location at the end of the operation b is near the upper edge of the interface b, a preview image near an upper edge of the interface a is displayed in a full-screen mode on the interface c. If the touch location at the end of the operation b is near the lower edge of the interface b, a preview image near a lower edge of the interface a is displayed in a full-screen mode on the interface c.

Figure 28:
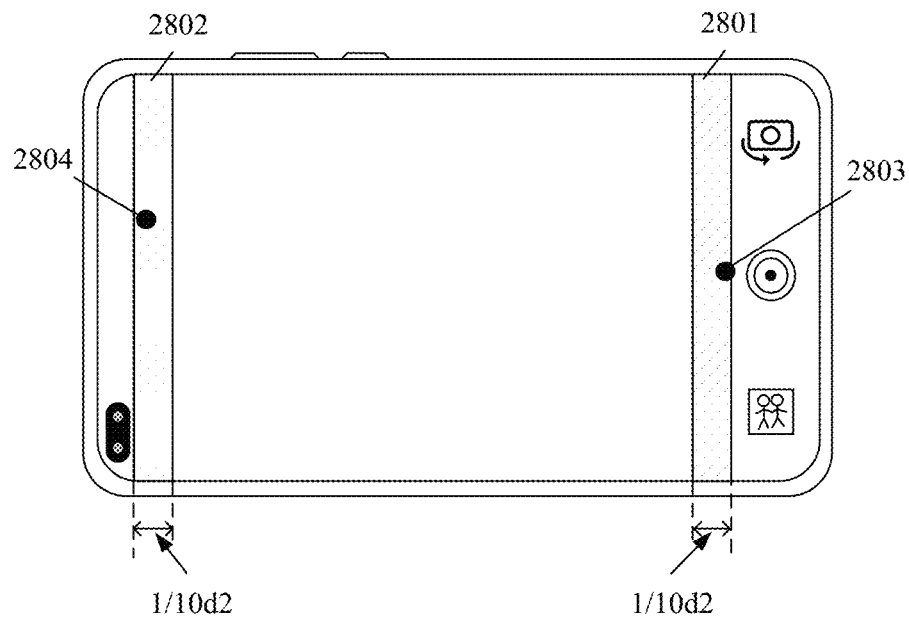
FIG. 28 is a schematic diagram of another location range according to an embodiment of this application.

For example, when the mobile phone is in the landscape state, the touch location at the end of the operation b is a location 2803 in FIG. 28. The location 2803 is within the fifth range 2801, and the location 2803 is near the right edge of the interface b. It is assumed that the interface a is the interface a 2201 shown in FIG. 22A. On the interface a 2201, the third preview image 2202 is near a right edge of the interface a 2201, and the third preview image 2203 is near a left edge of the interface a 2201. In this case, after switching is completed, the fourth preview image should be displayed in a full-screen mode on the interface c. Correspondingly, in response to the end event of the operation b, the mobile phone may display an interface c 2901 shown in FIG. 29A. A fourth preview image 2902 is displayed in a full-screen mode on the interface c 2901. In this case, the size of the second window is a full-screen size.

For example, in the landscape scenario, the touch location at the end of the operation b is a location 2804 in FIG. 28. The location 2804 is within the second range 2802, and the location 2804 is near the left edge of the interface b. It is assumed that the interface a is the interface a 2201 shown in FIG. 22A. On the interface a 2201, the third preview image 2202 is near a right edge of the interface a 2201, and the third preview image 2203 is near a left edge of the interface a 2201. In this case, after switching is completed, the third preview image should be displayed in a full-screen mode on the interface c. Correspondingly, in response to the end event of the operation b, the mobile phone may display an interface c 2903 shown in FIG. 29B. A third preview image 2904 is displayed in a full-screen mode on the interface c 2903. In this case, the size of the first window is a full-screen size.

Figure 29A:
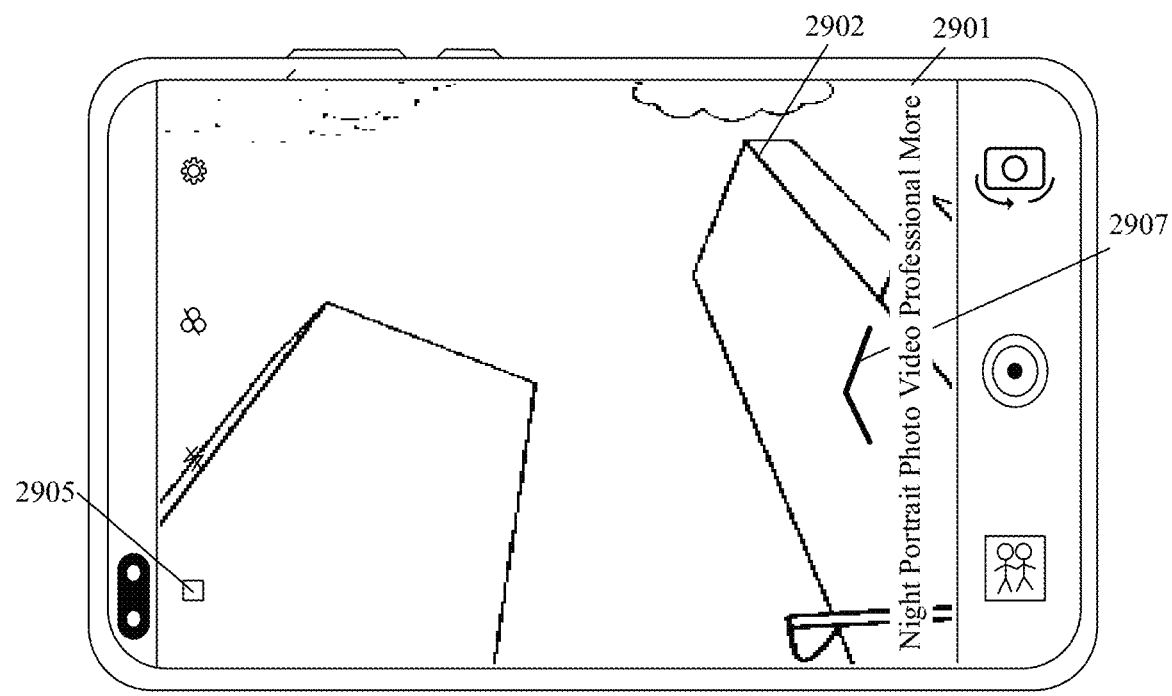
FIG. 29A and FIG. 29B are a schematic diagram of a viewfinder interface for dual-scene video recording in another landscape scenario according to an embodiment of this application.
Figure 29B:
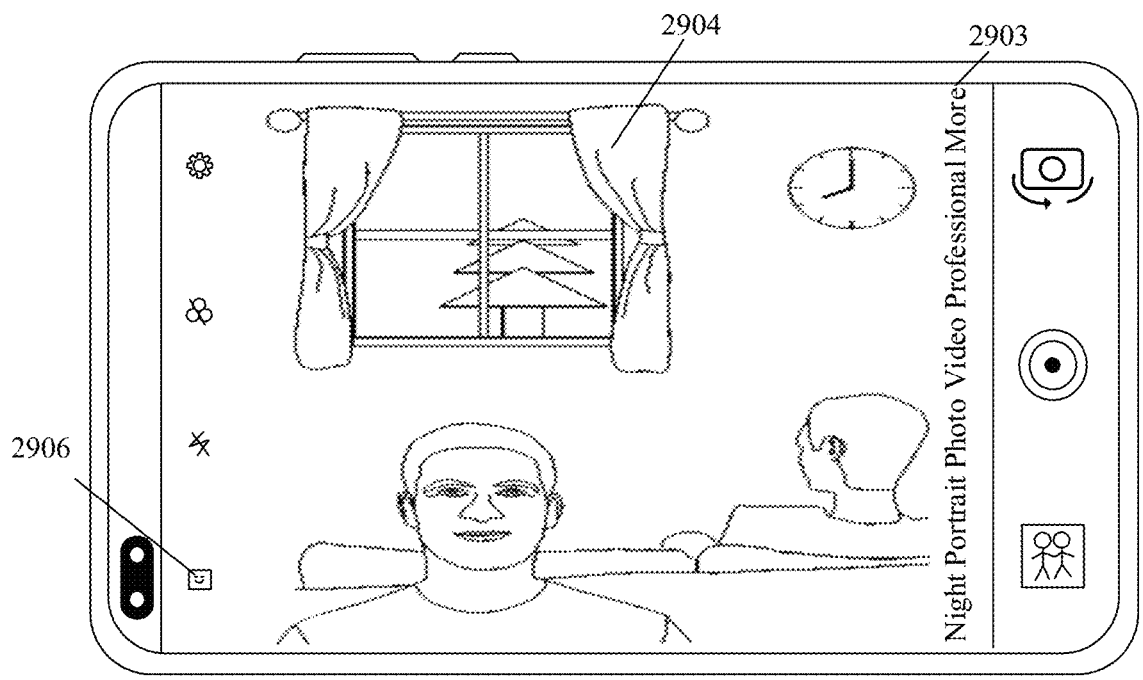

It should be noted that, when the viewfinder interface in the full-screen layout is obtained through switching from another video recording mode, the viewfinder interface in the full-screen layout further includes a mode identifier. This mode identifier is used for indicating a current video recording mode. For example, the interface c 2901 shown in FIG. 29A is obtained through switching from the interface a 2201 shown in FIG. 22A, and the fourth preview image 2902 on the interface c 2901 is captured by a rear-facing camera. The interface c 2901 includes a mode identifier 2905, and the mode identifier 2905 is used for indicating that a video recording mode with a single rear-facing camera is currently used. For another example, the interface c 2903 shown in FIG. 29B is obtained through switching from the interface a 2201 shown in FIG. 22A, and the fourth preview image 2904 on the interface c 2903 is captured by a front-facing camera. The interface c 2903 includes a mode identifier 2906, and the mode identifier 2906 is used for indicating that front video recording mode with a single front-facing camera is currently used.

Similarly, the seventh size for full-screen display is also prestored on the mobile phone (for example, in the camera application). After receiving the end event of the operation b, the camera application determines a range of the touch location at the end of the operation b. If the touch location belongs to the fifth range, the seventh size corresponding to full-screen display is sent to an underlying image processing module. Then the underlying image processing module processes a video stream captured by the camera a or a video stream captured by the camera b, to obtain the third preview image of the seventh size or the fourth preview image of the seventh size. Finally, the image processing module sends the third preview image or the fourth preview image to the camera application for display.

After the front/rear dual-scene mode (or the rear/rear dual-scene mode) is switched to the single-scene mode, only the first window or the second window is included in the viewfinder interface. In some embodiments, a removed window can be quickly dragged back to the viewfinder interface. Specifically, after S2502, the mobile phone displays an interface d in response to an operation c performed by the user on the interface c. The operation c is used for triggering the mobile phone to add a preview window to the viewfinder interface. The interface d includes a fifth preview image captured by the camera a and a sixth preview image captured by the camera b. The fifth preview image and the sixth preview image are displayed in a split-screen mode on the interface c. The fifth preview image is displayed in the first window, and the sixth preview image is displayed in the second window. It should be noted that, after the interface c is displayed, the mobile phone can switch back to the front/rear dual-scene (or rear/rear dual-scene) mode in response to the operation c performed by the user on the interface c only before switching the photographing mode again.

In this embodiment, the mobile phone may receive the operation c performed by the user on the interface c. The operation c may be a gesture of sliding from an edge at which a preview window is removed toward the viewfinder interface. For example, the first window is removed from the right edge of the interface b. In this case, the operation c may be a gesture input by the user to slide from a right edge of the interface c toward the interface c.

Alternatively, to guide the user to switch back to the front/rear dual-scene (or rear/rear dual-scene) mode, after a preview window is removed from the viewfinder interface, a return control is displayed at an edge location at which the preview window is removed. Correspondingly, the operation c may be a sliding operation or a tap operation performed on the return control. For example, the mobile phone may display the interface c 2901 shown in FIG. 29A. The interface c 2901 includes a return control 2907. The operation c may be a tap operation performed on the return control 2907.

In the manner shown in S2501 and S2502, the third preview image and/or the fourth preview image may be displayed in a corresponding layout based on a range to which the touch location at the end of the operation b belongs. In this way, switching to different photographing modes can be triggered through a same operation. For example, if the touch location at the end of the operation b belongs to the fourth range, the front/rear dual-scene mode may be switched to the picture-in-picture dual-scene mode; or if the touch location at the end of the operation b belongs to the fifth range, the front/rear dual-scene mode may be switched to the single-scene mode. In addition, in this manner, only a fixed size is used for switching and display, thereby improving efficiency of switching.

In some other embodiments, the mobile phone may switch, without a limitation of levels, the photographing mode based on the touch location at the end of the operation b. Specifically, in response to the end event of operation b, the mobile phone determines, based on the touch location at the end of the operation b, a small window size and a large window size in a picture-in-picture layout that uniquely correspond to the touch location. This can improve diversity of display.

Figure 30A:
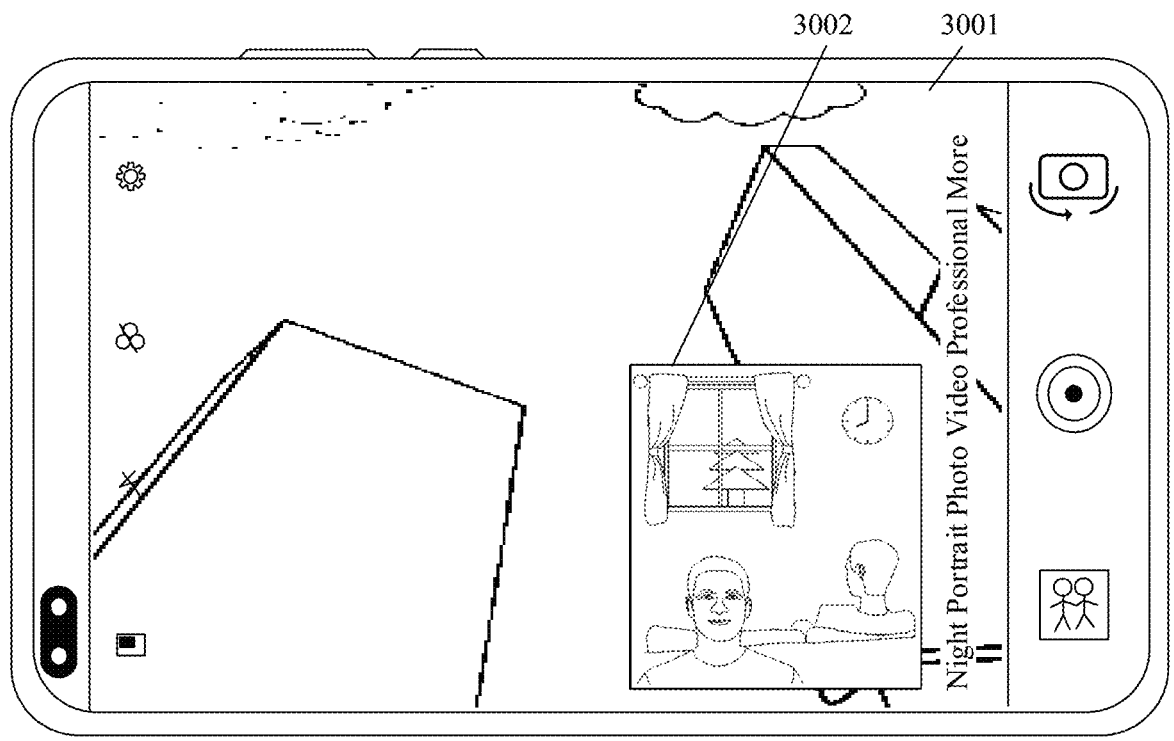
FIG. 30A, FIG. 30B, and FIG. 30C are a schematic diagram of a viewfinder interface for dual-scene video recording in another landscape scenario according to an embodiment of this application.
Figure 30B:
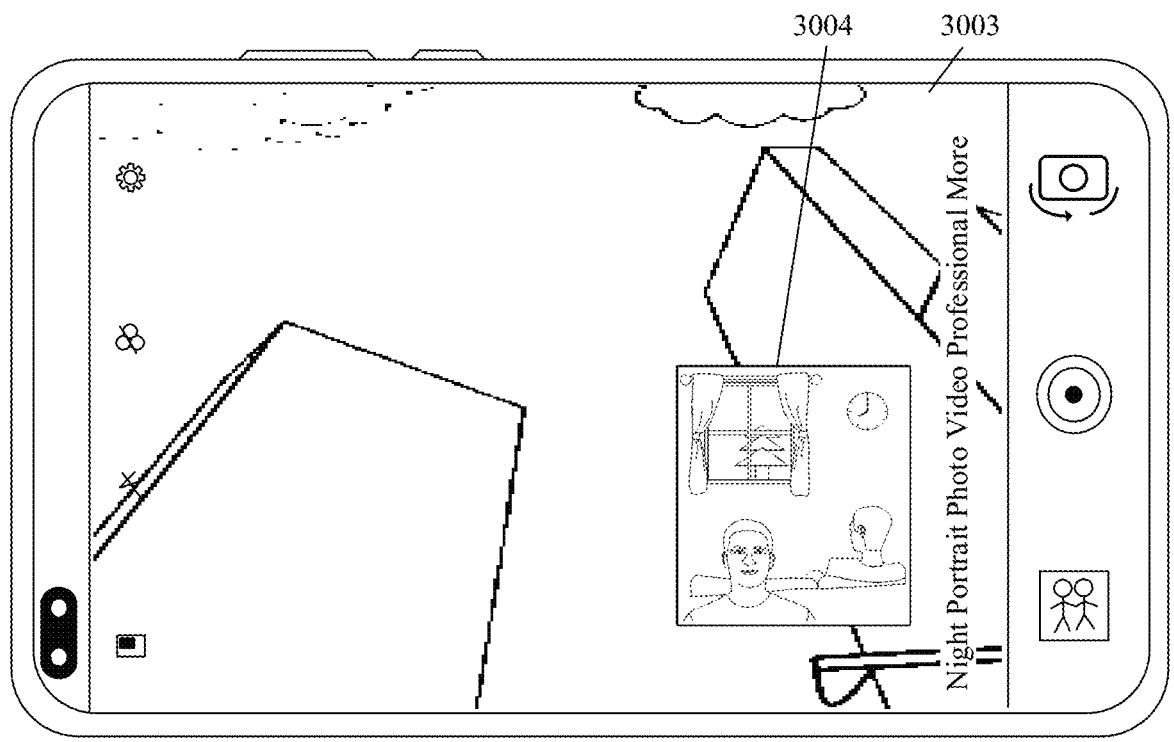
Figure 30C:
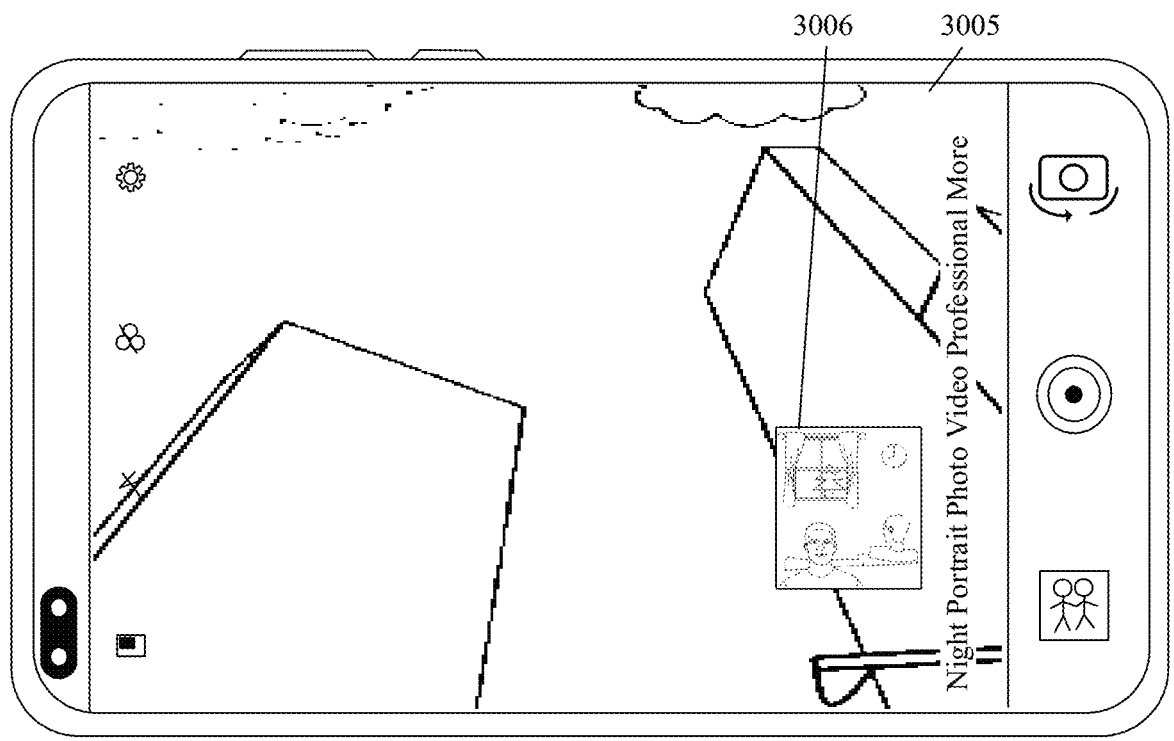

For example, if the operation b moves to the right edge of the interface b, it is assumed that the touch location at the end of the operation b keeps approaching the right edge of the interface b during three independent switching processes. In this case, corresponding to the three switching processes, the interface c obtained through switching may be an interface c 3001 shown in FIG. 30A, an interface c 3003 shown in FIG. 30B, and an interface c 3005 shown in FIG. 30C respectively. In addition, a size of a small window 3002 on the interface c 3001 is greater than that of a small window 3004 on the interface c 3003, and the size of the small window 3004 on the interface c 3003 is greater than that of a small window 3006 on the interface c 3005.

In some other embodiments, the foregoing two manners may be combined. For example, within the fourth range, the mobile phone may determine, based on the touch location at the end of the operation b, a small window size and a large window size in a picture-in-picture layout that uniquely correspond to the touch location, but not use the fixed first size and second size.

Figure 31:
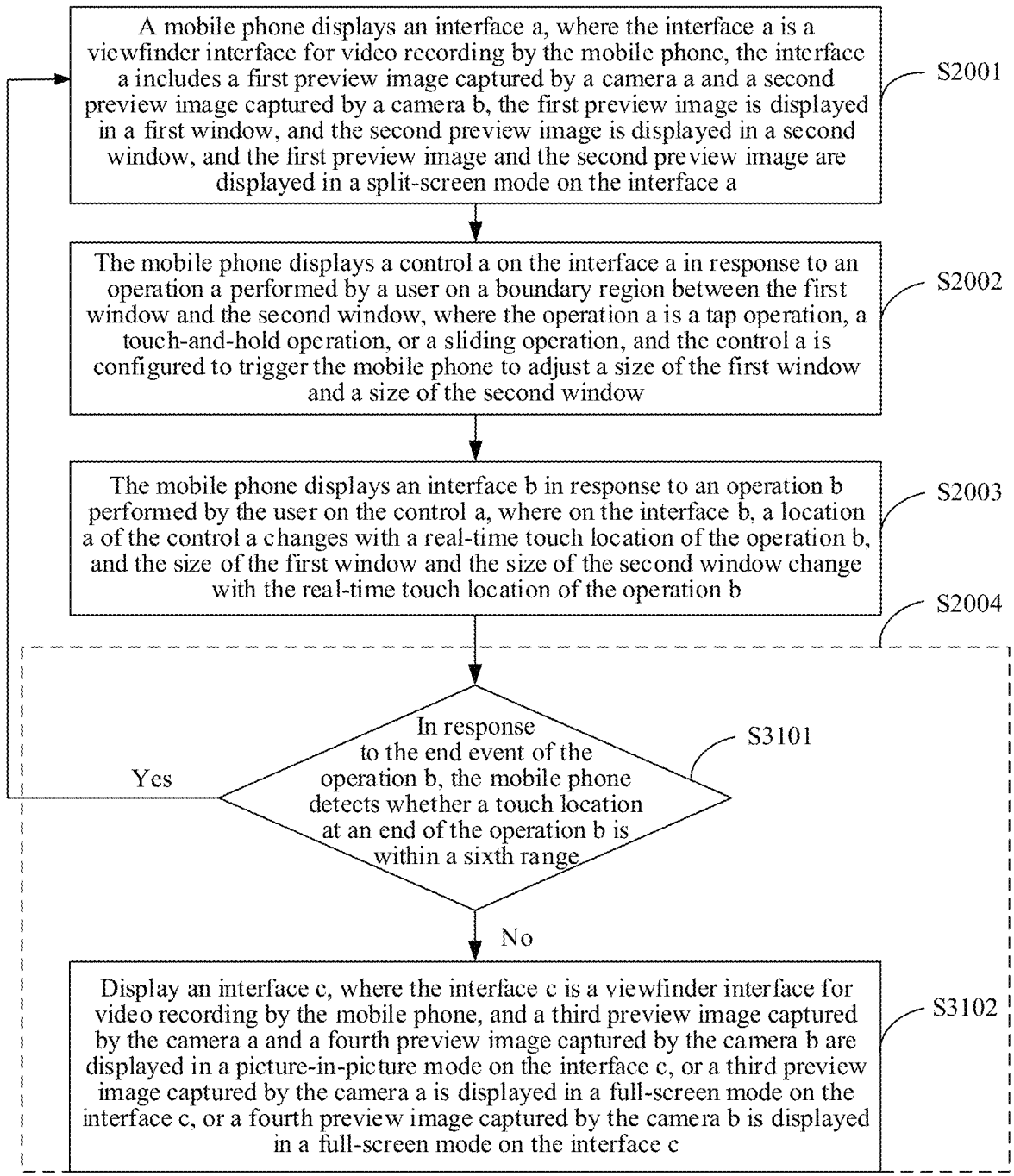
FIG. 31 is a flowchart of another video recording method according to an embodiment of this application.

In some other embodiments, to avoid incorrect switching of a photographing mode, whether there is a switching requirement may be determined first Specifically, as shown in FIG. 31, S2004 further includes S3101 and S3102.

S3101: In response to the end event of the operation b, the mobile phone detects whether the touch location at the end of the operation b is within a sixth range. If yes, step S2001 is performed. If no, step S3102 is performed.

The sixth range is adjacent to the fourth range.

When the mobile phone is in the landscape state, the sixth range is a range, on the display, within which a distance d1 from the left edge or the right edge of the display is greater than or equal a distance value 2. Similarly, the distance value 2 may be a product of a ratio 2 and d2.

When the mobile phone is in the portrait state, the sixth range is a range, on the display, within which a distance d1 from the upper edge or the lower edge of the display is greater than or equal a distance value 2. Similarly, the distance value 2 may be a product of a ratio 2 and d2.

Figure 32:
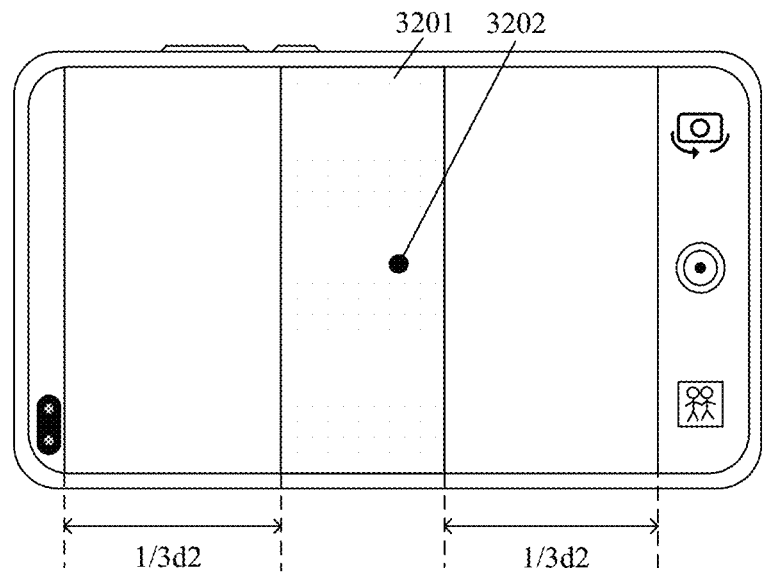
FIG. 32 is a schematic diagram of another location range according to an embodiment of this application.

For example, when the mobile phone is in the landscape state, the ratio 2 is ⅓. That is, if ⅓d2≤d1, the touch location is within the sixth range. The sixth range may be a sixth range 3201 in FIG. 32. A distance between a left edge of the sixth range 3201 and the left edge of the interface b is equal to ⅓d2, and a distance between a right/left edge of the sixth range 3201 and the right edge of the interface b is equal to ⅓d2. If the touch location at the end of the operation b is within the sixth range 3201, it indicates that there is no switching requirement.

S3102: Display an interface c, where the interface c is a viewfinder interface for video recording by the mobile phone, a third preview image captured by the camera a and a fourth preview image captured by the camera b are displayed in a picture-in-picture mode on the interface c, or a third preview image captured by the camera a is displayed in a full-screen mode on the interface c, or a fourth preview image captured by the camera b is displayed in a full-screen mode on the interface c.

S3102 may be implemented in any one of the implementations of displaying the interface c in the scenario 2. Details are not described again herein.

In the manner shown in S3101 and S3102, whether the touch location at the end of the operation b is within the sixth range is determined before the interface c is displayed. If the touch location is within the sixth range, it indicates that the operation b is misoperation performed by the user. In this case, the user does not have a switching requirement, and the photographing mode is not switched. The interface c is displayed for switching the photographing mode only when the touch location is not within the sixth range. In this way, switching of the photographing mode can accurately meet a user requirement.

S2001 to S2004 are mainly described based on switching before video recording starts. It should be understood that a switching process during video recording is similar, and details are not described herein again. It should be noted that, different from the switching before video recording starts, in the switching during video recording, interface changes in a transition process are included in a final video. In some embodiments, to ensure coherence of a video, transition motion effect may be added at a corresponding location in the transition process during formation of a video file. For example, blurring motion effect is added. The blurring motion effect is added, so that the transition process can be blurred, and the transition process can be better connected to video recording processes before and after the switching. Alternatively, if duration of the transition process exceeds preset duration a, the mobile phone may compress the duration of the transition process to weaken an influence of the transition process in the final video.

To sum up, in the video recording method in this embodiment of this application, before video recording starts or during video recording, the mobile phone may display the control a in response to the operation a (for example, a touch-and-hold operation) performed by the user on a viewfinder interface in a front/rear dual-scene (or rear/rear dual-scene) mode, to trigger the mobile phone to switch a photographing mode. In this way, no control that is always displayed needs to be set for the user to trigger switching of a photographing mode, so that interface elements are simplified.

Then the mobile phone may switch to a picture-in-picture dual-scene mode or a single-scene mode in response to the operation b (for example, a drag-and-drop operation) performed by the user on the control a. In this way, the front/rear dual-scene (or rear/rear dual-scene) mode can be switched to the picture-in-picture mode or the single-scene mode only through the operation a and the operation b. Therefore, the photographing mode can be conveniently switched.

Scenario 3: A current viewfinder interface is a viewfinder interface in a picture-in-picture dual-scene mode. In the scenario 3, the viewfinder interface in the picture-in-picture dual-scene mode is also referred to as an interface a.

Figure 33A:
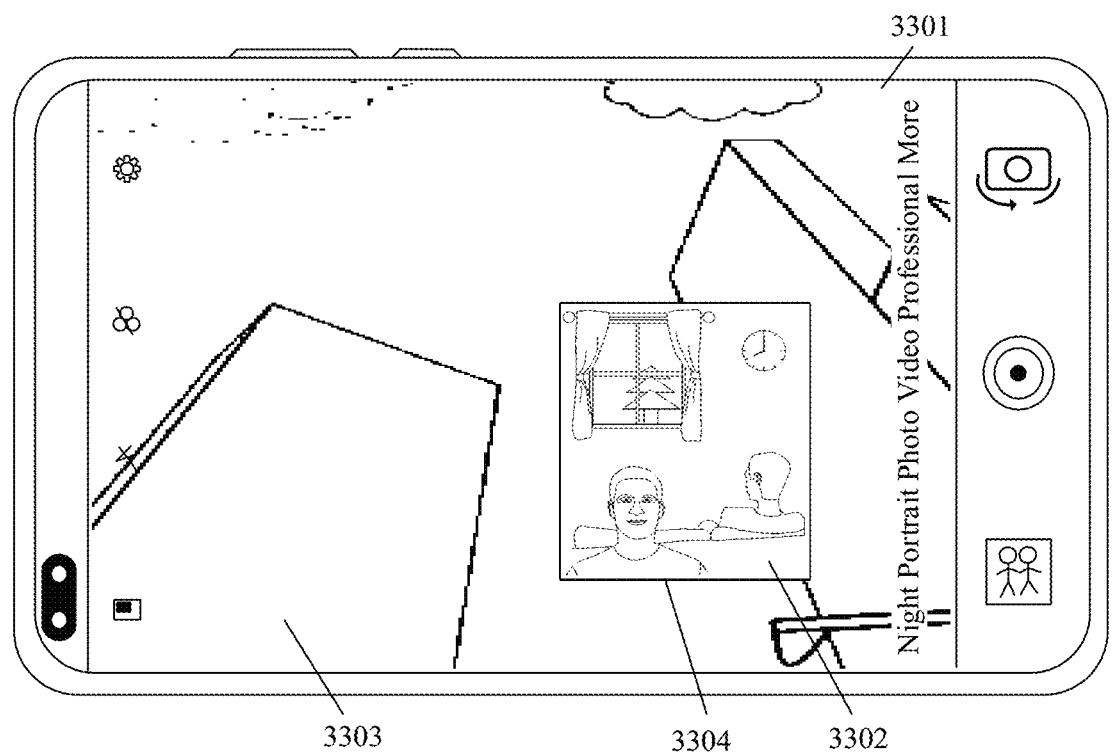

For example, the interface a is an interface a 3301 shown in FIG. 33A. The interface a 3301 includes a first preview image 3302 captured by a camera a (for example, a front-facing camera) and a second preview image 3303 captured by a camera b (for example, a rear-facing camera). In addition, the first preview image 3302 and the second preview image 3303 are displayed in a picture-in-picture mode on the interface a 3301. That is, the interface a 3301 shown in FIG. 33A is a viewfinder interface in a picture-in-picture dual-scene mode.

It should be noted that the location and the size of the small window 3304 in the picture-in-picture dual-scene mode shown in FIG. 33A are exemplary, and do not constitute a limitation in actual implementation. For example, the interface a may alternatively be an interface a 3305 shown in FIG. 33B. A small window 3306 on the interface a 3305 is located in an upper left corner of the interface a 3305, and a size of the small window 3306 is greater than that of the small window 3304 in FIG. 33A. In addition, a form of the small window is not limited to the form of the small window 3304 in FIG. 33A or the small window 3306 in FIG. 33B. For example, the small window may alternatively be in a circular shape or a triangular shape.

The viewfinder interface in the picture-in-picture dual-scene mode in the scenario 3 may be obtained through switching in the scenario 1 or through switching in the scenario 2. This is not specifically limited in this embodiment of this application.

An embodiment of this application provides a video recording method, applied to a mobile phone including a plurality of cameras. In addition, the mobile phone may provide a dual-scene video recording function. In this embodiment, switching may be performed from a picturein-picture dual-scene mode to a single-scene mode. Specifically, as shown in FIG. 34, the method includes S3401 to S3404.

S3401: The mobile phone displays an interface a, where the interface a is a viewfinder interface for video recording by the mobile phone, the interface a includes a first preview image captured by a camera a and a second preview image captured by a camera b, the first preview image is displayed in a first window, and the second preview image is displayed in a second window, and the first preview image and the second preview image are displayed in a picture-in-picture mode on the interface a.

In the scenario 3, if the interface a is obtained through switching in the scenario 1, the interface a may also be referred to as a third interface, the camera a may also be referred to as a first camera, the camera b may also be referred to as a second camera, the first preview image may also be referred to as a second image, and the second preview image may also be referred to as a third image. In addition, if the interface a is obtained through switching in the scenario 1, the first window is a small window, and the second window is a large window.

Similar to that in the scenario 1, the interface a in the scenario 2 may be a viewfinder interface for video recording before the mobile phone starts video recording. Alternatively, the interface a in the scenario 2 may alternatively be a viewfinder interface during video recording.

S3402: The mobile phone displays a first window in a preset state on the interface a in response to an operation a performed by a user on the first window, where the operation a is a tap operation or a touch-and-hold operation, and the preset state is used for indicating that the first window is editable.

In the scenario 3, the operation a may be referred to as a third operation.

Before S3402, the mobile phone may receive the operation a performed by the user on the first window.

For example, the operation a is a touch-and-hold operation. The mobile phone may receive a touch-and-hold operation performed by the user on a first window 3304 on the interface a 3301 shown in FIG. 33A. In response to the touch-and-hold operation performed by the user on the first window 3304, the mobile phone may display an interface a 3501 shown in FIG. 35. An edge of a first window 3502 on the interface a 3501 is highlighted. The edge is highlighted to indicate that the first window 3502 is in an editable state.

The editable state is a state in which the user can perform an operation on the first window to change a location and/or a size of the first window. It should be understood that highlighting of the edge of the first window is only an example of a preset state. In actual implementation, information in another form such as text or dynamic effect may alternatively be used for indicating that the first window is in an editable state.

S3403: The mobile phone displays the first window at a location a on the interface a in response to a moving operation performed by the user on the first window, where the location a changes with a real-time touch location of the moving operation.

In the scenario 3, the location a may also be referred to as a third location.

Before S3403, the mobile phone may receive the moving operation performed by the user on the first window. The moving operation may be an operation whose real-time touch location can continuously change, for example, a drag-and-drop operation or a sliding operation. Similarly, the moving operation and the operation a may be consecutive operations or separate operations.

Figure 35:
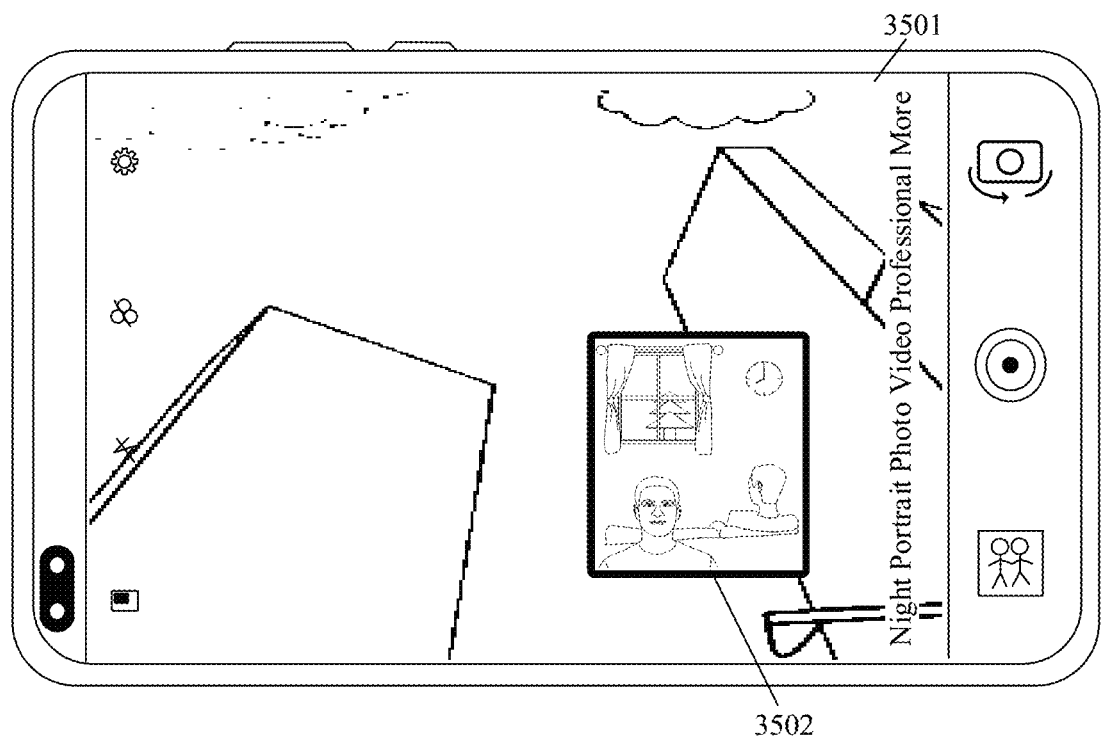
FIG. 35 is a schematic diagram of a viewfinder interface for dual-scene video recording in another landscape scenario according to an embodiment of this application.

For example, the mobile phone may receive the moving operation performed by the user on the first window 3502 on the interface a 3501 shown in FIG. 35. In response to the moving operation, the mobile phone may adjust the display location a of the first window with the real-time touch location of the moving operation, so that the first window moves with the real-time touch location of the moving operation. For example, as the real-time touch location of the moving operation continuously moves to the right, an interface a 3601 shown in FIG. 36A, an interface a 3603 shown in FIG. 36B, and an interface a 3605 shown in FIG. 36C may be sequentially displayed. A first window 3602 on the interface a 3601, a first window 3604 on the interface a 3603, and a first window 3606 on the interface a 3605 show rightward movement. It should be understood that the location a is a location region occupied by the entire first window, and when the first window moves to the right, the location a occupied by the first window also moves to the right.

Figure 36A:
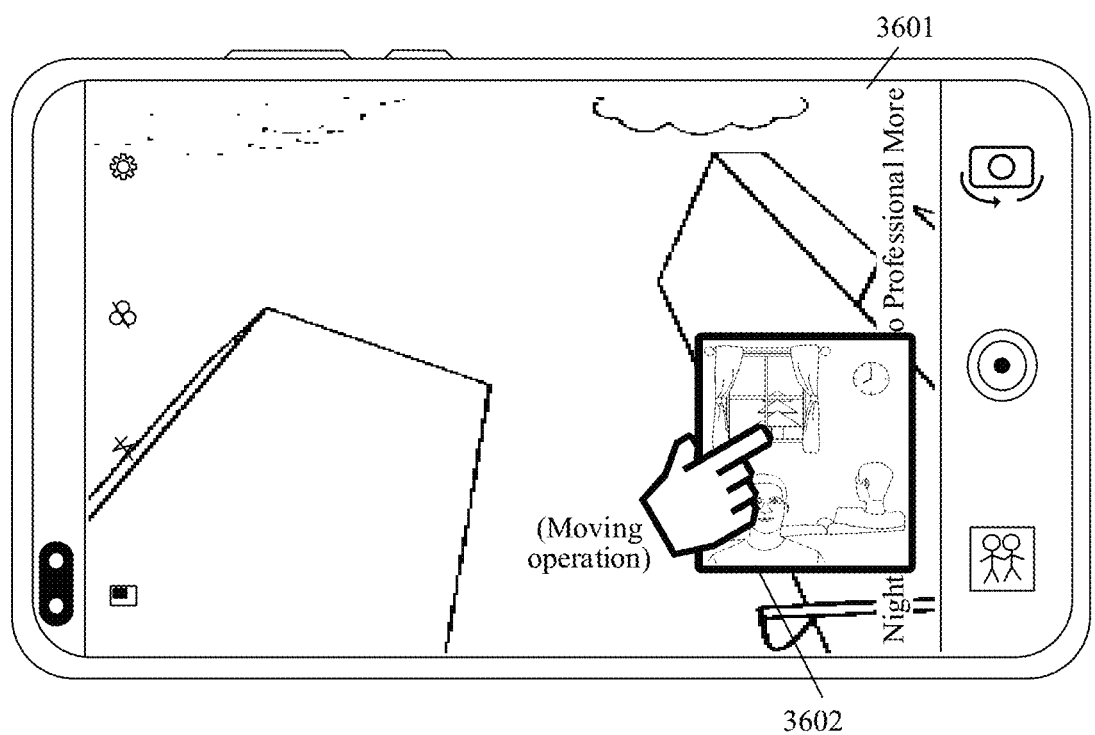
FIG. 36A, FIG. 36B, and FIG. 36C are a schematic diagram of a viewfinder interface for dual-scene video recording in another landscape scenario according to an embodiment of this application.
Figure 36B:
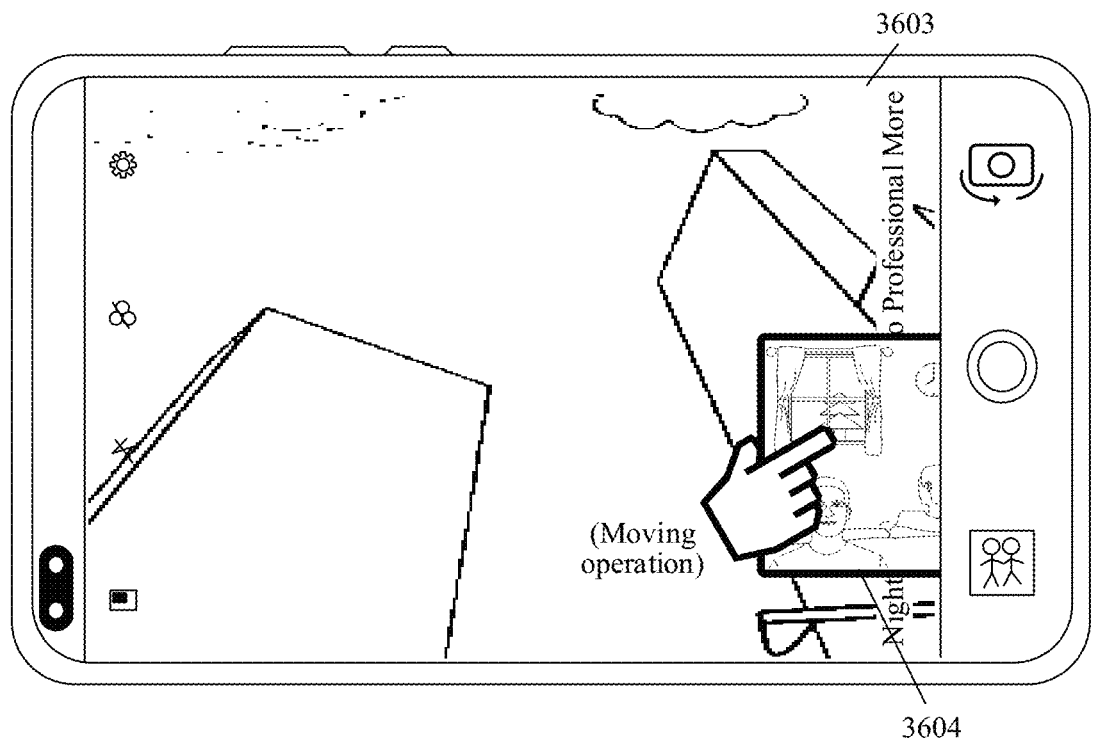
Figure 36C:
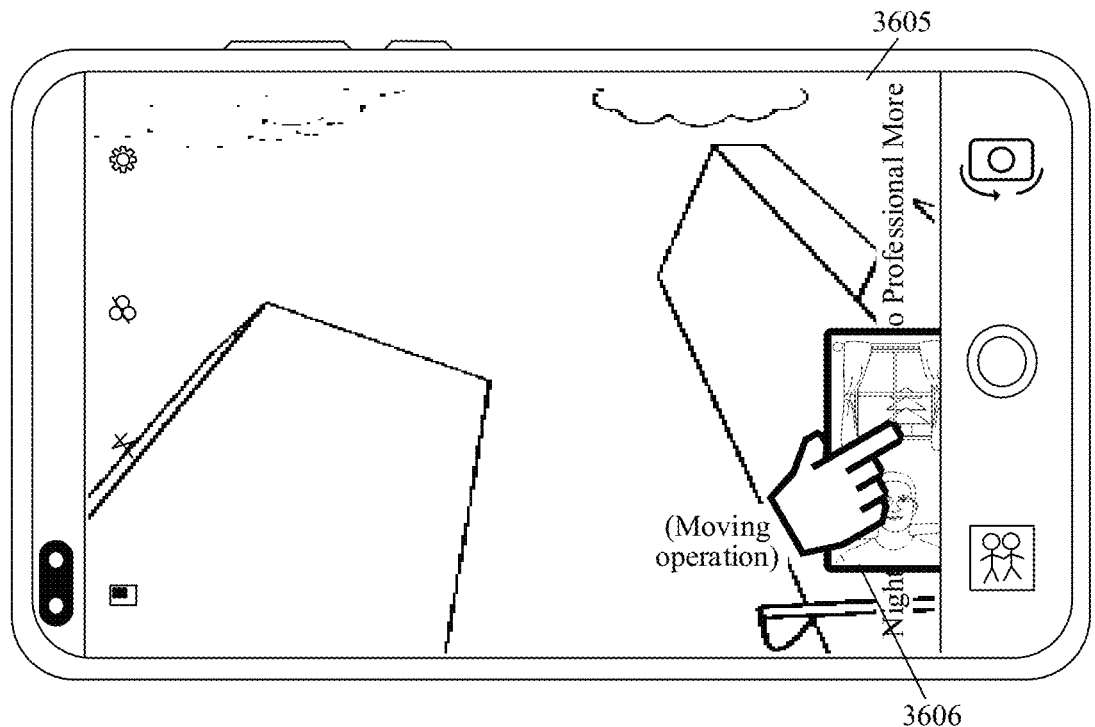

It should be noted that changes of the real-time touch location of the moving operation shown in FIG. 36A, FIG. 36B, and FIG. 36C are exemplary, and the moving operation may perform movement in any direction on the interface a.

S3404: In response to an end event of the moving operation, if the location a of the first window at an end of the moving operation is within a seventh range, the mobile phone displays an interface b, where the interface b is a viewfinder interface for video recording by the mobile phone, the interface b includes a second window, a third preview image captured by the camera b is displayed in the second window, and the third preview image is displayed in a full-screen mode on the interface b.

In the scenario 3, the interface b may also be referred to as a sixth interface, and the third preview image may also be referred to as a sixth image.

The seventh range is a range, on the display, within which a distance d1 from an edge of the display is less than a distance value 1. The distance value 1 is usually a value close to 0. The edge of the display includes the upper edge, the lower edge, the left edge, or the right edge. In the scenario 3, this distance value 1 may be referred to as a fifth distance.

For example, the distance value 1 is d0 in FIG. 37. In this case, the seventh range may be a seventh range 3701 in FIG. 37 (namely, a shaded part in the figure). In response to the end event of the moving operation, if the location a of the first window at the end of the moving operation is a location a 3702 in FIG. 37 and the location a 3702 belongs to the seventh range 3701, the interface b may be displayed.

The interface b is a viewfinder interface in a single-scene mode. For example, the interface b may be the viewfinder interface shown in FIG. 29A. It should be understood that, when the interface a is a viewfinder interface for video recording before video recording starts, the interface b is also a viewfinder interface for video recording before video recording starts. When the interface a is a viewfinder interface during video recording, the interface b is also a viewfinder interface during video recording.

In some embodiments, after the first window is moved out of the viewfinder interface, the first window can be quickly dragged back to the viewfinder interface. Specifically, as shown in FIG. 38, after S3404, the method further includes S3801.

S3801: The mobile phone displays an interface c in response to an operation b performed by the user on the interface b, where the operation b is used for triggering the mobile phone to add a preview window to viewfinder interface, the interface c is a viewfinder interface for video recording by the mobile phone, the interface c includes a first window and a second window, the first window is the added preview window, a fourth preview image captured by the camera a is displayed in the first window, a fifth preview image captured by the camera b is displayed in the second window, and the fourth preview image and the fifth preview image are displayed in a picture-in-picture mode on the interface c.

In the scenario 3, the operation b may be referred to as a fourth operation, the interface c may be referred to as a seventh interface, the fourth preview image may be referred to as a seventh image, and the fifth preview image may be referred to as an eighth image.

It should be noted that, after the interface b is displayed, the mobile phone can switch back to the picture-in-picture dual-scene mode in response to the operation b performed by the user on the interface b only before switching the photographing mode again.

Before S3801, the mobile phone may receive the operation b performed by the user on the interface b. The operation b may be a gesture of sliding from an edge at which the first window is removed toward the viewfinder interface.

Figure 39A:
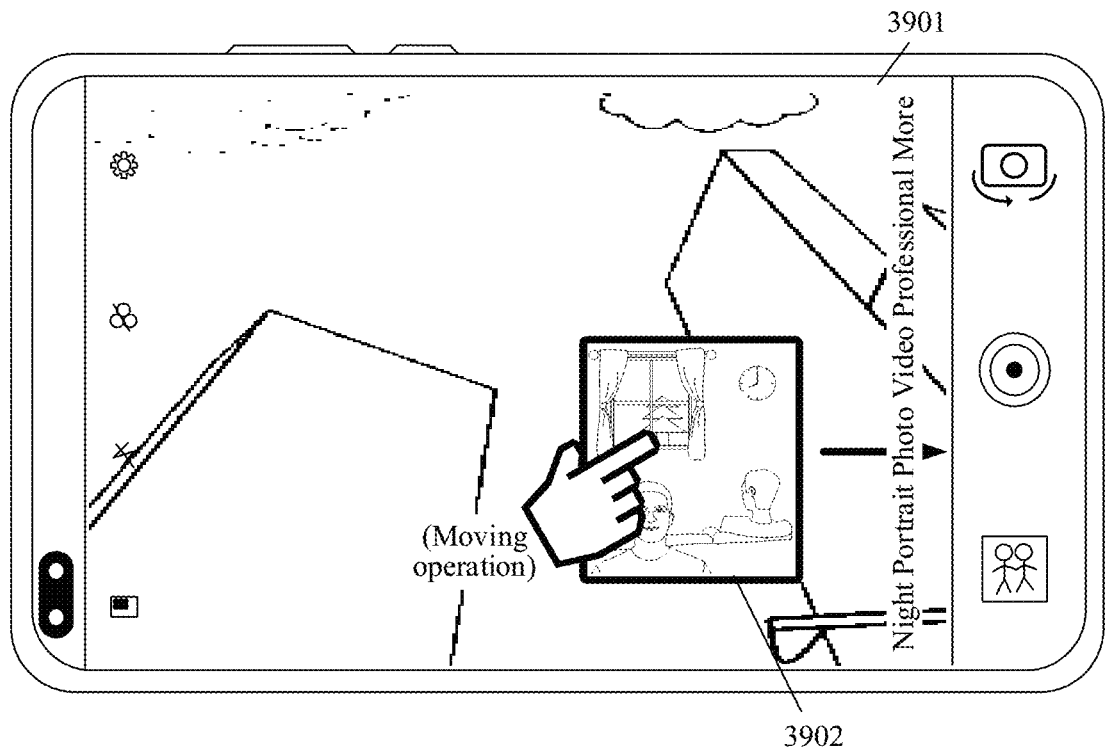
FIG. 39A and FIG. 39B are a schematic diagram of a viewfinder interface for dual-scene video recording in another landscape scenario according to an embodiment of this application.
Figure 39B:
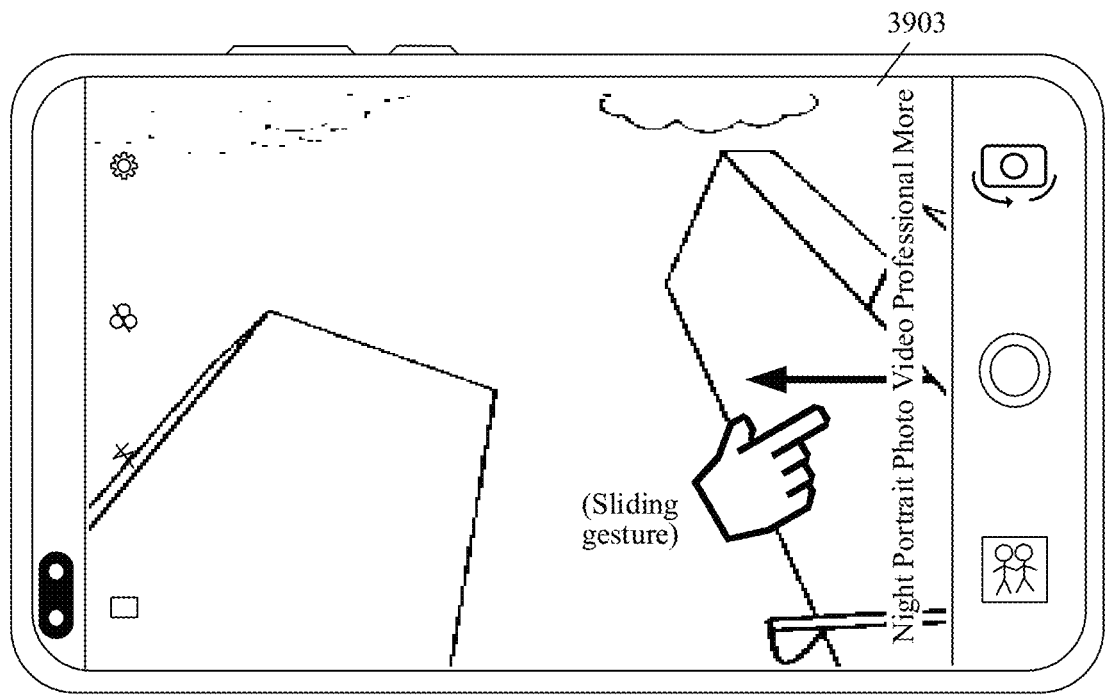

For example, on an interface a 3901 shown in FIG. 39A, a first window 3902 is removed along a direction indicated by an arrow in the figure. Correspondingly, the operation b may be a move-in gesture along a direction indicated by an arrow on an interface b 3903 shown in FIG. 39B.

Alternatively, to guide the user to switch back to the picture-in-picture dual-scene mode, after the first window is removed from the viewfinder interface, a return control is displayed at an edge location at which the first window is removed. Correspondingly, the operation b may be a sliding operation or a tap operation performed on the return control.

For example, on an interface a 3901 shown in FIG. 39A, a first window 3902 is removed along a direction indicated by an arrow in the figure. After the first window 3902 is removed from the interface a, an interface b 4001 shown in FIG. 40 may be displayed. The interface b 4001 includes a return control 4002. Correspondingly, the operation b may be a tap operation performed by the user on the return control 4002.

To sum up, in the video recording method provided in this embodiment of this application, the small window in the picture-in-picture mode can be activated through the operation a, so that the small window is in an editable state. Then the small window can be moved. This can avoid misoperation by the user. In addition, if the small window is moved to the seventh range and then movement stops, the small window may be moved out of the interface. In this way, the picture-in-picture dual-scene mode is switched to a single-scene mode.

An embodiment of this application provides a video recording method, applied to a mobile phone including a plurality of cameras. In addition, the mobile phone may provide a dual-scene video recording function. In this embodiment, switching may be performed from a picture-in-picture dual-scene mode to a front/rear dual-scene (or rear/rear dual-scene) mode. Specifically, as shown in FIG. 41, the method includes S4101 to S4103.

S4101: The mobile phone displays an interface a, where the interface a is a viewfinder interface for video recording by the mobile phone, the interface a includes a first preview image captured by a camera a and a second preview image captured by a camera b, the first preview image is displayed in a first window, and the second preview image is displayed in a second window, and the first preview image and the second preview image are displayed in a picture-in-picture mode on the interface a.

S4102: The mobile phone displays a first window in a preset state on the interface a in response to an operation a performed by a user on the first window, where the operation a is a tap operation or a touch-and-hold operation, and the preset state is used for indicating that the first window is editable.

For S4101 and S4102, refer to related descriptions in S3401 and S3402. Details are not described again herein.

S4103: The mobile phone adjusts a size of the first window in response to a zoom operation performed by the user on the first window, and displays the first window with an adjusted size on the interface a, where the size of the first window changes with a real-time touch location of the zoom operation; and if a size of the adjusted first window reaches a preset size a, displays an interface d, where the interface d is a viewfinder interface for video recording by the mobile phone, the interface d includes a sixth preview image captured by the camera a and a seventh preview image captured by the camera b, and the sixth preview image and the seventh preview image are displayed in a split-screen mode on the interface d.

In the scenario 3, the preset size a may also be referred to as a first preset size, the interface d may also be referred to as an eighth interface, the sixth preview image may be referred to as a ninth image, and the seventh preview image may be referred to as a tenth image.

Figure 42A:
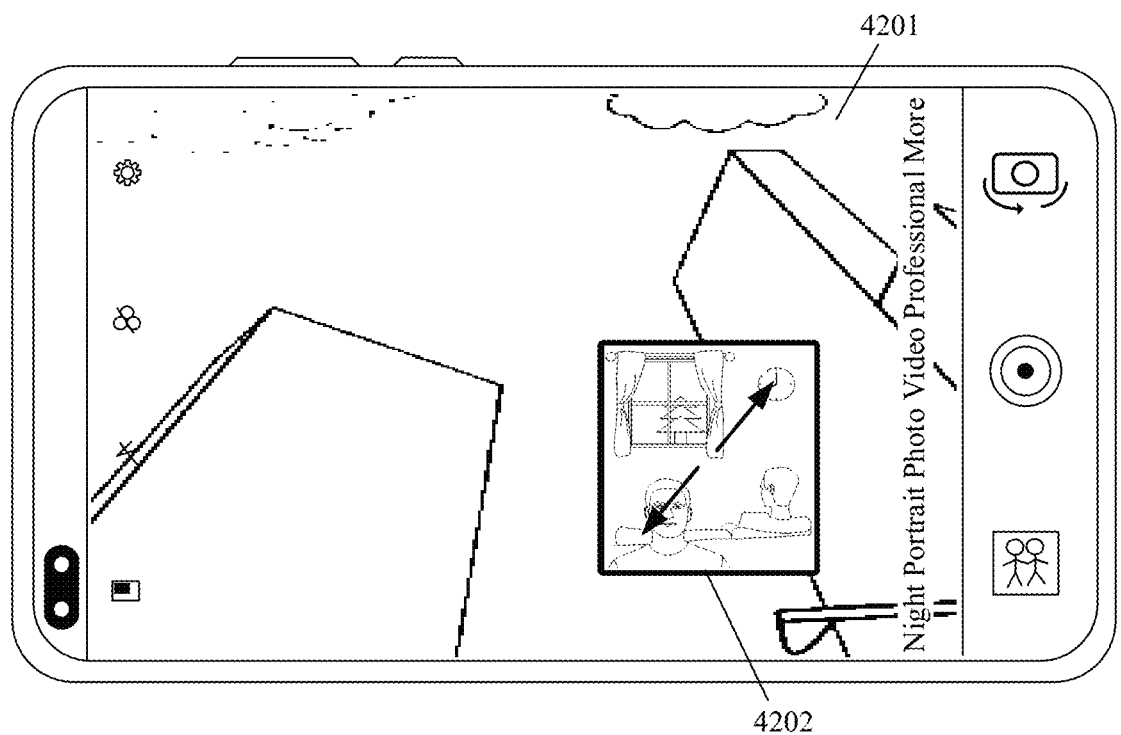
FIG. 42A and FIG. 42B are a schematic diagram of a viewfinder interface for dual-scene video recording in another landscape scenario according to an embodiment of this application.

Before S4103, the mobile phone may receive the zoom operation performed by the user on the first window. The zoom operation may be a zoom gesture input by the user. For example, the zoom operation may be a zoom gesture (as indicated by an arrow) input by the user for a first window 4202 on an interface a 4201 shown in FIG. 42A.

Figure 42B:
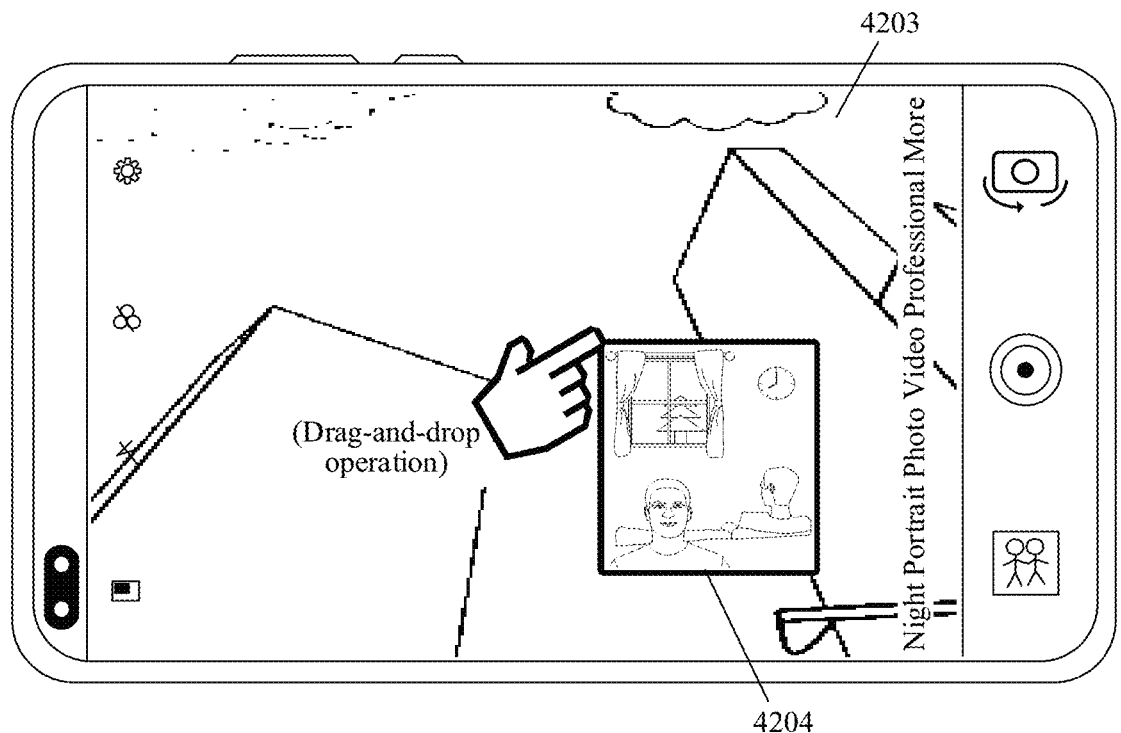

Alternatively, the zoom operation may be a drag operation performed by the user on an edge of the first window. For example, the zoom operation is a drag operation performed by the user on an edge of a first window 4202 on an interface a 4203 shown in FIG. 42B.

In response to the zoom operation performed by the user on the first window, the mobile phone may increase or decrease the size of the first window. When the preset size a is reached, the mobile phone switches to a split-screen mode for display. The preset size a may be a fixed size. This can simplify an operation for setting the preset size a.

Alternatively, the preset size a is a size specified based on a size of interface a. That is, the preset size a is related to a screen size of the electronic device. Usually, the preset size a is a size close to half of an area of the interface a. In this way, appropriateness of switching can be improved.

For example, when the mobile phone is in a landscape state, a width value of the preset size a is close to half of a width of the interface a, and a height value of the preset size a is close to a height of the interface a. If a width of the first window after zooming is close to the width value of the preset size a, and/or a height of the first window after zooming is close to the height value of the preset size a, it indicates that a size of the adjusted first window reaches the preset size a.

Figure 43:
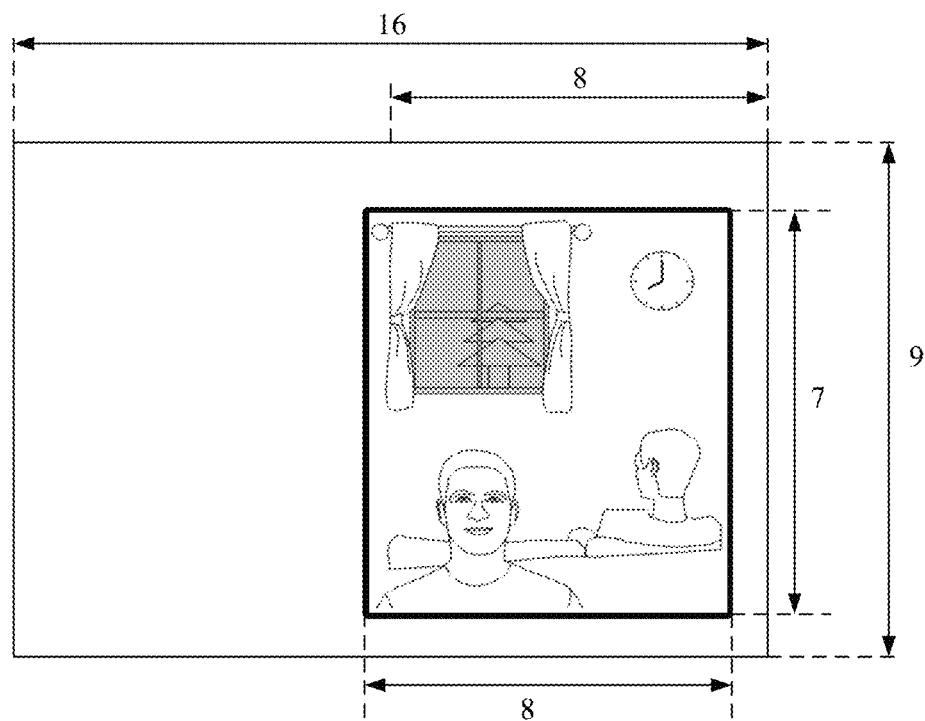
FIG. 43 is a schematic diagram of a size range according to an embodiment of this application.

For example, when the mobile phone is in a portrait state, a width value of the preset size a is close to a width of the interface a, and a height value of the preset size a is close to half of a height of the interface a. If a width of the first window after zooming is close to the width value of the preset size a, and/or a height of the first window after zooming is close to the height value of the preset size a, it indicates that a size of the adjusted first window reaches the preset size a. For example, when the mobile phone is in the landscape state, as shown in FIG. 43, the width of the interface a is 16 units and the height is 9 units. The width value of the preset size a is half of the width of the interface a, that is, 8 units. The height value of the preset size a is half of the height of the interface a, that is, 9 units. If a width value of the first window after zooming reaches the width value of the preset size a, that is, 8 units, a size of the first window after zooming reaches the preset size a.

After it is determined that the size of the first window reaches the preset size a, the interface d is displayed. When the mobile phone is in the landscape state, if the first window after zooming is near a left edge of the interface a, the sixth preview image and the seventh preview image are sequentially displayed from left to right on the interface d. If the first window after zooming is near a right edge of the interface a, the seventh preview image and the sixth preview image are sequentially displayed from left to right on the interface d.

When the mobile phone is in the portrait state, if the first window after zooming is near an upper edge of the interface a, the sixth preview image and the seventh preview image are sequentially displayed from top to bottom on the interface d. If the first window after zooming is near a lower edge of the interface a, the seventh preview image and the sixth preview image are sequentially displayed from top to bottom on the interface d.

The landscape mode is used as an example. In FIG. 43, the first window after zooming is near the right edge of the interface a, and a size of the first window a reaches the preset size a. In this case, the displayed interface b may be the viewfinder interface shown in FIG. 19A.

To sum up, in the video recording method provided in this embodiment of this application, the small window on the viewfinder interface in the picture-in-picture dual-scene mode can be activated through the operation a, so that the small window is in an editable state. Then the small window can be zoomed. This can avoid misoperation by the user. In addition, if a size of the small window after zooming reaches the preset size a, switching may be performed to the split-screen photographing mode (for example, the front/rear dual-scene mode or the rear/rear dual-scene mode).

In the embodiment of the scenario 3, description is provided by using an example in which the small window is first activated and then a moving operation or a zoom operation is performed on the small window. In some other embodiments, a moving operation or a zoom operation may alternatively be directly performed on the small window. This can simplify an operation of switching and improve efficiency of switching.

In addition, in the embodiment of the scenario 3, description is mainly provided based on switching before video recording starts. It should be understood that a switching process during video recording is similar, and details are not described herein again. It should be noted that, different from the switching before video recording starts, in the switching during video recording, a transition process is included in a final video. In some embodiments, to ensure coherence of a video, transition motion effect may be added at a corresponding location in the transition process during formation of a video file. For example, blurring motion effect is added. The blurring motion effect is added, so that the transition process can be blurred, and the transition process can be better connected to video recording processes before and after the switching. Alternatively, if duration of the transition process exceeds preset duration a, the mobile phone may compress the duration of the transition process to weaken an influence of the transition process in the final video.

Finally, it should be noted that, although the switching in the scenario 1, the scenario 2, and the scenario 3 is separately described in the foregoing embodiments, a person skilled in the art should understand that the switching processes in the foregoing three scenarios may be combined in any manner. For example, in a process of starting a video recording function of a camera and then ending the function, switching may be first performed from a single-scene mode to a front/rear dual-scene mode (the scenario 1), then switching may be performed from the front/rear dual-scene mode to a picture-in-picture mode (the scenario 2), and then switching may be performed from the picture-in-picture mode to the single-scene mode (the scenario 3). A manner of combination is not limited in the embodiments of this application.

Some other embodiments of this application provide an electronic device. The electronic device may include a display (for example, a touchscreen), a memory, and one or more processors. The display and the memory are coupled to the processor. The memory is configured to store computer program code, and the computer program code includes computer instructions. When the processor executes the computer instructions, the electronic device can perform the functions or the steps performed by the mobile phone in the foregoing method embodiments. For a structure of the electronic device, refer to the structure of the electronic device 300 shown in FIG. 3.

Figure 44:
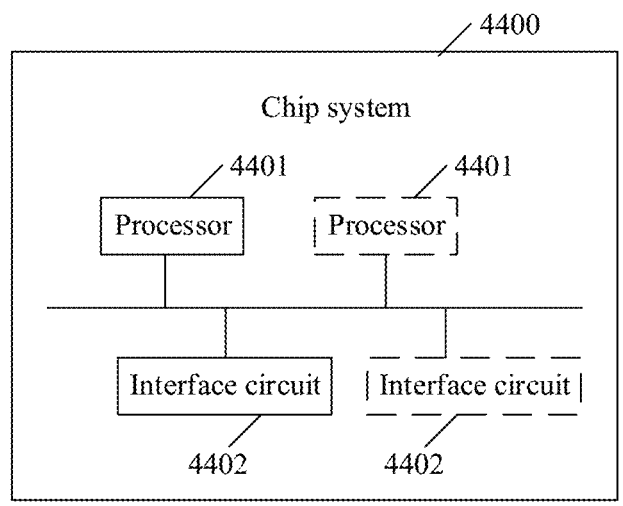
FIG. 44 is a schematic structural diagram of a chip system according to an embodiment of this application.

An embodiment of this application further provides a chip system. As shown in FIG. 44, the chip system 4400 includes at least one processor 4401 and at least one interface circuit 4402. The processor 4401 and the interface circuit 4402 may be interconnected through a line. For example, the interface circuit 4402 may be configured to receive a signal from another apparatus (for example, a memory of an electronic device). For another example, the interface circuit 4402 may be configured to transmit a signal to another apparatus (for example, the processor 4401). For example, the interface circuit 4402 may read the instructions stored in the memory, and send the instructions to the processor 4401. When the instructions are executed by the processor 4401, the electronic device is enabled to perform the steps in the foregoing embodiments. Certainly, the chip system may further include other discrete devices. This is not specifically limited in this embodiment of this application.

An embodiment of this application further provides a computer storage medium. The computer storage medium includes computer instructions. When the computer instructions run on an electronic device, the electronic device is enabled to perform the functions or the steps performed by the mobile phone in the foregoing method embodiments.

An embodiment of this application further provides a computer program product. When the computer program product runs on a computer, the computer is enabled to perform the functions or the steps performed by the mobile phone in the foregoing method embodiments.

Based on the descriptions of the foregoing implementations, a person skilled in the art may clearly understand that, for a purpose of convenient and brief description, division into the foregoing functional modules is merely used as an example for illustration. In actual application, the foregoing functions may be allocated to different functional modules and implemented according to a requirement. In other words, an inner structure of the apparatus is divided into different functional modules to implement all or some of the functions described above.

In the several embodiments provided in this application, it should be understood that the disclosed apparatus and method may be implemented in other manners. For example, the described apparatus embodiment is merely exemplary. For example, the module or unit division is merely logical function division and may be other division during actual implementation. For example, a plurality of units or components may be combined or integrated into another apparatus, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separated. A part shown as a unit may be one or more physical units, and may be located at one position, or may be distributed at different positions. Some or all of the units may be selected according to actual needs to achieve the objectives of the solutions of the embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The storage medium includes any medium that can store program code, for example, a USB flash drive, a removable hard disk, a read-only memory (read-only memory, ROM), a random access memory (random access memory, RAM), a magnetic disk, or an optical disc.

The foregoing content is merely specific embodiments of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A video recording method, applied to an electronic device, wherein the method comprises:
    displaying, by the electronic device, a first interface, wherein the first interface a viewfinder interface for video recording by the electronic device, the first interface comprises a first window, a first image captured by a first camera is displayed in the first window, and the first image is displayed in a full-screen mode on the first interface;
    displaying, by the electronic device, a first control on the first interface in response to a first operation performed by a user on a first edge of the first interface, wherein the first control is configured to trigger the electronic device to adjust a size of the first window;
    displaying, by the electronic device, a second interface in response to a first drag-and-drop operation performed by the user on the first control, wherein on the second interface, a first location of the first control changes with a real-time touch location of the first drag-and-drop operation, and the size of the first window changes with the real-time touch location of the first drag-and-drop operation; and
    displaying, by the electronic device, a third interface in response to an end of the first drag-and-drop operation, wherein the third interface is a viewfinder interface for video recording by the electronic device, the third interface comprises the first window and a second window, a second image captured by the first camera is displayed in the first window, a third image captured by a second camera is displayed in the second window, and the second image and the third image are displayed in a split-screen or picture-in-picture mode on the third interface;
    wherein when a touch location at the end of the first drag-and-drop operation is within a first range of a display of the electronic device, the second image and the third image are displayed in the split-screen mode on the third interface, and the first range comprises a range, on the display, within which a vertical distance from the first edge is greater than a first distance value and less than a second distance value; or
    when a touch location at the end of the first drag-and-drop operation is within a second range of the display, the second image and the third image are displayed in the picture-in-picture mode on the third interface, and the second range comprises a range, on the display, within which a vertical distance from the first edge is greater than the second distance value; or
    when a touch location at the end of the first drag-and-drop operation is within a third range of the display of the electronic device, displaying, by the electronic device, the first interface, wherein the third range comprises a range, on the display, within which a vertical distance from the first edge is less than the first distance value.

2. The method according to claim 1, wherein when the electronic device is in a landscape state, the first interface is a landscape-mode interface, and the first edge of the first interface comprises a left edge of the landscape-mode interface or a right edge of the landscape-mode interface; or
    when the electronic device is in a portrait state, the first interface is a portrait-mode interface, and the first edge of the first interface comprises an upper edge of the portrait-mode interface or a lower edge of the portrait-mode interface.

3. The method according to claim 1, wherein the second image and the third image are displayed in the split-screen mode on the third interface; and
    after the displaying, by the electronic device, a third interface in response to an end of the drag-and-drop operation, the method further comprises:
    displaying, by the electronic device, a second control on the third interface in response to a second operation performed by the user on a boundary region between the first window and the second window on the third interface, wherein the second control is configured to trigger the electronic device to adjust the size of the first window and a size of the second window;
    displaying, by the electronic device, a fourth interface in response to a second drag-and-drop operation performed by the user on the second control, wherein on the fourth interface, a second location of the second control changes with a real-time touch location of the second drag-and-drop operation, and the size of the first window and the size of the second window change with the real-time touch location of the second drag-and-drop operation; and displaying, by the electronic device, a fifth interface in response to an end of the second drag-and-drop operation, wherein the fifth interface is a viewfinder interface for video recording by the electronic device;

the fifth interface comprises a fourth image captured by the first camera and a fifth image captured by the second camera, and the fourth image and the fifth image are displayed in a picture-in-picture mode on the fifth interface; or the fifth interface comprises the fourth image, and the fourth image is displayed in a full-screen mode on the fifth interface; or the fifth interface comprises the fifth image, and the fifth image is displayed in a full-screen mode on the fifth interface.

4. The method according to claim 3, wherein the displaying, by the electronic device, a fifth interface in response to an end of the second drag-and-drop operation comprises:

when a touch location at the end of the second drag-and-drop operation is within a fourth range of the display, displaying the fourth image and the fifth image in the picture-in-picture mode on the fifth interface; or when a touch location at the end of the second drag-and-drop operation is within a fifth range of the display, displaying the fourth image or the fifth image in the full-screen mode on the fifth interface.

5. The method according to claim 4, wherein when the electronic device is in the landscape state, the fourth range comprises a range, on the display, within which a distance from the left edge or the right edge of the display is greater than a third distance value and less than a fourth distance value, and the fifth range comprises a range, on the display, within which a distance from the left edge or the right edge of the display is less than the third distance value; or when the electronic device is in the portrait state, the fourth range comprises a range, on the display, within which a distance from the upper edge or the lower edge of the display is greater than the third distance value and less than the fourth distance value, and the fifth range comprises a range, on the display, within which a distance from the upper edge or the lower edge of the display is less than the third distance value.

6. The method according to claim 4, wherein the method further comprises:

when the touch location at the end of the second drag-and-drop operation is within a sixth range of the display, displaying, by the electronic device, the third interface, wherein when the electronic device is in the landscape state, the sixth range comprises a range, on the display, within which a distance from the left edge or the right edge of the display is greater than the fourth distance value; or when the electronic device is in the portrait state, the sixth range comprises a range, on the display, within which a distance from the upper edge or the lower edge of the display is greater than the fourth distance value.

7. The method according to claim 1, wherein the second image and the third image are displayed in the picture-in-picture mode on the third interface; and after the displaying, by the electronic device, a third interface in response to an end of the first drag-and-drop operation, the method further comprises:

displaying, by the electronic device, a first window in a preset state on the third interface in response to a third operation performed by the user on the first window on the third interface, wherein the preset state is used for indicating that the first window is editable;

displaying, by the electronic device, the first window at a third location on the third interface in response to a moving operation performed by the user on the first window, wherein the third location changes with a real-time touch location of the moving operation; and displaying, by the electronic device, a sixth interface in response to an end of the moving operation if the third location at the end of the moving operation belongs to a seventh range, wherein the sixth interface is a viewfinder interface for video recording by the electronic device, the sixth interface comprises the second window, a sixth image captured by the second camera is displayed in the second window, and the sixth image is displayed in a full-screen mode on the sixth interface, and the seventh range comprises a range, on the display of the electronic device, within which a distance from the upper edge, the lower edge, the left edge, or the right edge of the display is less than the fifth distance value.

8. The method according to claim 7, wherein after the displaying, by the electronic device, a sixth interface, the method further comprises:

displaying, by the electronic device, a seventh interface in response to a fourth operation performed by the user on the sixth interface, wherein the fourth operation is used for triggering the electronic device to add a preview window to the viewfinder interface, and the seventh interface is a viewfinder interface for video recording by the electronic device; and the seventh interface comprises the first window and the second window, the first window is the added preview window, a seventh image captured by the first camera is displayed in the first window, an eighth image captured by the second camera is displayed in the second window, and the seventh image and the eighth image are displayed in a picture-in-picture mode on the seventh interface.

9. The method according to claim 1, wherein the second image and the third image are displayed in the picture-in-picture mode on the third interface; and after the displaying, by the electronic device, a third interface in response to an end of the first drag-and-drop operation, the method further comprises:

displaying, by the electronic device, a first window in a preset state on the third interface in response to a third operation performed by the user on the first window on the third interface, wherein the preset state is used for indicating that the first window is editable;

displaying, by the electronic device, the first window with an adjusted size on the third interface in response to a zoom operation performed by the user on the first window, wherein the size of the first window changes with a real-time touch location of the zoom operation, the zoom operation comprises a preset zoom gesture or a drag operation performed on an edge of the first window; and if the size of the first window reaches a first preset size, displaying, by the electronic device, an eighth interface, wherein the eighth interface is a viewfinder interface for video recording by the electronic device, the eighth interface comprises a ninth image captured by the first camera and a tenth image captured by the second camera, and the ninth image and the tenth image are displayed in a split-screen mode on the eighth interface.

10. An electronic device, wherein the electronic device comprises a plurality of cameras, the electronic device comprises a display, a memory, and one or more processors, the plurality of cameras, the display, and the memory are coupled to the processor, the memory is configured to store computer program code, the computer program code comprises computer instructions, and when the computer instructions are executed by the processor, the electronic device is enabled to perform following operations:

displaying, a first interface, wherein the first interface is a viewfinder interface for video recording the first interface comprises a first window, a first image captured by a first camera is displayed in the first window, and the first image is displayed in a full-screen mode on the first interface;

displaying, a first control on the first interface in response to a first operation performed by a user on a first edge of the first interface, wherein the first control is configured to trigger the electronic device to adjust a size of the first window;

displaying, a second interface in response to a first drag-and-drop operation performed by the user on the first control, wherein on the second interface, a first location of the first control changes with a real-time touch location of the first drag-and-drop operation, and the size of the first window changes with the real-time touch location of the first drag-and-drop operation; and displaying, a third interface in response to an end of the first drag-and-drop operation, wherein the third interface is a viewfinder interface for video recording the third interface comprises the first window and a second window, a second image captured by the first camera is displayed in the first window, a third image captured by a second camera is displayed in the second window, and the second image and the third image are displayed in a split-screen or picture-in-picture mode on the third interface;

wherein when a touch location at the end of the first drag-and-drop operation is within a first range of a display of the electronic device, the second image and the third image are displayed in the split-screen mode on the third interface, and the first range comprises a range, on the display, within which a vertical distance from the first edge is greater than a first distance value and less than a second distance value; or when a touch location at the end of the first drag-and-drop operation is within a second range of the display, the second image and the third image are displayed in the picture-in-picture mode on the third interface, and the second range comprises a range, on the display, within which a vertical distance from the first edge is greater than the second distance value; or when a touch location at the end of the first drag-and-drop operation is within a third range of the display of the electronic device, displaying, the first interface, wherein the third range comprises a range, on the display, within which a vertical distance from the first edge is less than the first distance value.

11. The electronic device according to claim 10, wherein when the electronic device is in a landscape state, the first interface is a landscape-mode interface, and the first edge of the first interface comprises a left edge of the landscape-mode interface or a right edge of the landscape-mode interface; or when the electronic device is in a portrait state, the first interface is a portrait-mode interface, and the first edge of the first interface comprises an upper edge of the portrait-mode interface or a lower edge of the portrait-mode interface.

12. The electronic device according to claim 10, wherein the second image and the third image are displayed in the split-screen mode on the third interface; and when the computer instructions are executed by the processor, the electronic device is enabled to further perform following operations:

after the displaying, a third interface in response to an end of the drag-and-drop operation, displaying, a second control on the third interface in response to a second operation performed by the user on a boundary region between the first window and the second window on the third interface, wherein the second control is configured to trigger the electronic device to adjust the size of the first window and a size of the second window;

displaying, a fourth interface in response to a second drag-and-drop operation performed by the user on the second control, wherein on the fourth interface, a second location of the second control changes with a real-time touch location of the second drag-and-drop operation, and the size of the first window and the size of the second window change with the real-time touch location of the second drag-and-drop operation; and displaying, a fifth interface in response to an end of the second drag-and-drop operation, wherein the fifth interface is a viewfinder interface for video recording by the electronic device;

the fifth interface comprises a fourth image captured by the first camera and a fifth image captured by the second camera, and the fourth image and the fifth image are displayed in a picture-in-picture mode on the fifth interface; or the fifth interface comprises the fourth image, and the fourth image is displayed in a full-screen mode on the fifth interface; or the fifth interface comprises the fifth image, and the fifth image is displayed in a full-screen mode on the fifth interface.

13. The electronic device according to claim 12, wherein the displaying, a fifth interface in response to an end of the second drag-and-drop operation comprises:

when a touch location at the end of the second drag-and-drop operation is within a fourth range of the display, displaying the fourth image and the fifth image in the picture-in-picture mode on the fifth interface; or when a touch location at the end of the second drag-and-drop operation is within a fifth range of the display, displaying the fourth image or the fifth image in the full-screen mode on the fifth interface.

14. The electronic device according to claim 13, wherein when the electronic device is in the landscape state, the fourth range comprises a range, on the display, within which a distance from the left edge or the right edge of the display is greater than a third distance value and less than a fourth distance value, and the fifth range comprises a range, on the display, within which a distance from the left edge or the right edge of the display is less than the third distance value; or when the electronic device is in the portrait state, the fourth range comprises a range, on the display, within which a distance from the upper edge or the lower edge of the display is greater than the third distance value and less than the fourth distance value, and the fifth range comprises a range, on the display, within which a distance from the upper edge or the lower edge of the display is less than the third distance value.

15. The electronic device according to claim 13, wherein when the computer instructions are executed by the processor, the electronic device is enabled to further perform following operations:

when the touch location at the end of the second drag-and-drop operation is within a sixth range of the display, displaying, the third interface, wherein when the electronic device is in the landscape state, the sixth range comprises a range, on the display, within which a distance from the left edge or the right edge of the display is greater than the fourth distance value; or when the electronic device is in the portrait state, the sixth range comprises a range, on the display, within which a distance from the upper edge or the lower edge of the display is greater than the fourth distance value.

16. The electronic device according to claim 10, wherein the second image and the third image are displayed in the picture-in-picture mode on the third interface; and when the computer instructions are executed by the processor, the electronic device is enabled to further perform following operations:

after the displaying, a third interface in response to an end of the first drag-and-drop operation, displaying, a first window in a preset state on the third interface in response to a third operation performed by the user on the first window on the third interface, wherein the preset state is used for indicating that the first window is editable;

displaying, the first window at a third location on the third interface in response to a moving operation performed by the user on the first window, wherein the third location changes with a real-time touch location of the moving operation; and displaying, a sixth interface in response to an end of the moving operation if the third location at the end of the moving operation belongs to a seventh range, wherein the sixth interface is a viewfinder interface for video recording the sixth interface comprises the second window, a sixth image captured by the second camera is displayed in the second window, and the sixth image is displayed in a full-screen mode on the sixth interface, and the seventh range comprises a range, on the display of the electronic device, within which a distance from the upper edge, the lower edge, the left edge, or the right edge of the display is less than the fifth distance value.

17. The electronic device according to claim 16, wherein when the computer instructions are executed by the processor, the electronic device is enabled to further perform following operations:

after the displaying, a sixth interface, displaying, a seventh interface in response to a fourth operation performed by the user on the sixth interface, wherein the fourth operation is used for triggering the electronic device to add a preview window to the viewfinder interface, and the seventh interface is a viewfinder interface for video recording by the electronic device; and the seventh interface comprises the first window and the second window, the first window is the added preview window, a seventh image captured by the first camera is displayed in the first window, an eighth image captured by the second camera is displayed in the second window, and the seventh image and the eighth image are displayed in a picture-in-picture mode on the seventh interface.

18. The electronic device according to claim 10, wherein the second image and the third image are displayed in the picture-in-picture mode on the third interface; and when the computer instructions are executed by the processor, the electronic device is enabled to further perform following operations:

after the displaying, a third interface in response to an end of the first drag-and-drop operation, displaying, a first window in a preset state on the third interface in response to a third operation performed by the user on the first window on the third interface, wherein the preset state is used for indicating that the first window is editable;

displaying, the first window with an adjusted size on the third interface in response to a zoom operation performed by the user on the first window, wherein the size of the first window changes with a real-time touch location of the zoom operation, the zoom operation comprises a preset zoom gesture or a drag operation performed on an edge of the first window; and if the size of the first window reaches a first preset size, displaying, an eighth interface, wherein the eighth interface is a viewfinder interface for video recording the eighth interface comprises a ninth image captured by the first camera and a tenth image captured by the second camera, and the ninth image and the tenth image are displayed in a split-screen mode on the eighth interface.

19. The electronic device according to claim 10, wherein the viewfinder interface for video recording by the electronic device is a viewfinder interface for video recording that is displayed before the electronic device starts video recording, or the viewfinder interface for video recording by the electronic device is a viewfinder interface displayed during video recording by the electronic device.

20. A non-transitory computer-readable storage medium, wherein the computer-readable storage medium stores instructions, and when the instructions run on an electronic device, the electronic device is enabled to perform following operations:

displaying, a first interface, wherein the first interface is a viewfinder interface for video recording the first interface comprises a first window, a first image captured by a first camera is displayed in the first window, and the first image is displayed in a full-screen mode on the first interface;

displaying, a first control on the first interface in response to a first operation performed by a user on a first edge of the first interface, wherein the first control is configured to trigger the electronic device to adjust a size of the first window;

displaying, a second interface in response to a first drag-and-drop operation performed by the user on the first control, wherein on the second interface, a first location of the first control changes with a real-time touch location of the first drag-and-drop operation, and the size of the first window changes with the real-time touch location of the first drag-and-drop operation; and displaying, a third interface in response to an end of the first drag-and-drop operation, wherein the third interface is a viewfinder interface for video recording the third interface comprises the first window and a second window, a second image captured by the first camera is displayed in the first window, a third image captured by a second camera is displayed in the second window, and the second image and the third image are displayed in a split-screen or picture-in-picture mode on the third interface;

wherein when a touch location at the end of the first drag-and-drop operation is within a first range of a display of the electronic device, the second image and the third image are displayed in the split-screen mode on the third interface, and the first range comprises a range, on the display, within which a vertical distance from the first edge is greater than a first distance value and less than a second distance value; or when a touch location at the end of the first drag-and-drop operation is within a second range of the display, the second image and the third image are displayed in the picture-in-picture mode on the third interface, and the second range comprises a range, on the display, within which a vertical distance from the first edge is greater than the second distance value; or when a touch location at the end of the first drag-and-drop operation is within a third range of the display of the electronic device, displaying, the first interface, wherein the third range comprises a range, on the display, within which a vertical distance from the first edge is less than the first distance value.

* * * * *